(12) United States Patent
Ootsu

(10) Patent No.: US 9,849,544 B2
(45) Date of Patent: Dec. 26, 2017

(54) LASER PROCESSING METHOD AND LASER PROCESSING PROGRAM CREATION DEVICE

(71) Applicant: AMADA HOLDINGS CO., LTD., Kanagawa (JP)

(72) Inventor: Takaaki Ootsu, Kanagawa (JP)

(73) Assignee: AMADA HOLDINGS CO., LTD., Kanagawa (JP)

( * ) Notice: Subject to any disclaimer, the term of this patent is extended or adjusted under 35 U.S.C. 154(b) by 291 days.

(21) Appl. No.: 14/784,679

(22) PCT Filed: Jan. 22, 2014

(86) PCT No.: PCT/JP2014/051198
§ 371 (c)(1),
(2) Date: Oct. 15, 2015

(87) PCT Pub. No.: WO2014/185084
PCT Pub. Date: Nov. 20, 2014

(65) Prior Publication Data
US 2016/0059358 A1    Mar. 3, 2016

(30) Foreign Application Priority Data
May 15, 2013   (JP) ................................ 2013-102747

(51) Int. Cl.
*B23K 26/38*   (2014.01)
*G05B 19/4093*   (2006.01)
(Continued)

(52) U.S. Cl.
CPC .......... *B23K 26/38* (2013.01); *B23K 26/0057* (2013.01); *B23K 26/08* (2013.01);
(Continued)

(58) Field of Classification Search
CPC ............ B23K 2201/28; B23K 2203/04; B23K 26/0057; B23K 26/08; B23K 26/38;
(Continued)

(56) References Cited

FOREIGN PATENT DOCUMENTS

| JP | 2004-298956 | 10/2004 |
|---|---|---|
| JP | 2012-76142 | 4/2012 |

(Continued)

OTHER PUBLICATIONS

International Search Report in PCT/JP2014/051198, dated Apr. 15, 2014.

*Primary Examiner* — Thomas Lee
*Assistant Examiner* — Chad Erdman
(74) *Attorney, Agent, or Firm* — Greenblum & Bernstein, P.L.C.

(57) ABSTRACT

A laser processing program creation device sets an evaluation region in an adjacent plane to a target plane; calculates the position of the extremity of the product profile in the axial direction within the evaluation region; sets a first line segment passing through the position of the extremity and extending orthogonally to the axis in the target plane; locates a processing area in the range surrounded by the first line segment, a second line segment, and the product profile, the second line segment extending in the axial direction from an end of the first line segment to the product profile; allocates a trajectory for laser beam cutting to form a notch or a hole in the processing area; and allocates a trajectory for laser beam cutting to cut the material along the product profile.

20 Claims, 53 Drawing Sheets

(51) Int. Cl.
  *B23K 26/00* (2014.01)
  *B23K 26/70* (2014.01)
  *G05B 19/4097* (2006.01)
  *B23K 26/08* (2014.01)
  B23K 103/04 (2006.01)
  B23K 101/28 (2006.01)

(52) U.S. Cl.
  CPC ........ *B23K 26/702* (2015.10); *G05B 19/4093* (2013.01); *G05B 19/4097* (2013.01); *B23K 2201/28* (2013.01); *B23K 2203/04* (2013.01); *G05B 2219/40416* (2013.01); *G05B 2219/45041* (2013.01); *Y02P 90/265* (2015.11)

(58) Field of Classification Search
  CPC .............. B23K 26/702; G05B 19/4093; G05B 19/4097; G05B 2219/40416; G05B 2219/45041; Y02P 90/265
  See application file for complete search history.

(56) References Cited

FOREIGN PATENT DOCUMENTS

| | | |
|---|---|---|
| JP | 2012-86243 | 5/2012 |
| JP | 2013-232141 | 11/2013 |
| WO | 2013/073215 | 5/2013 |

FIG. 6
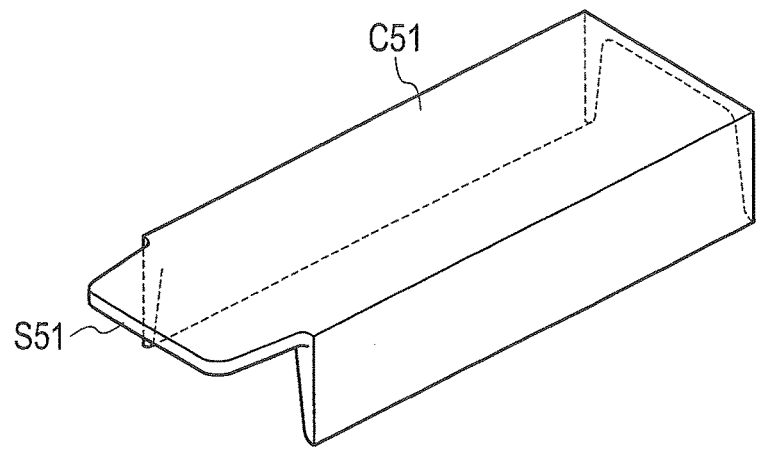
(a)
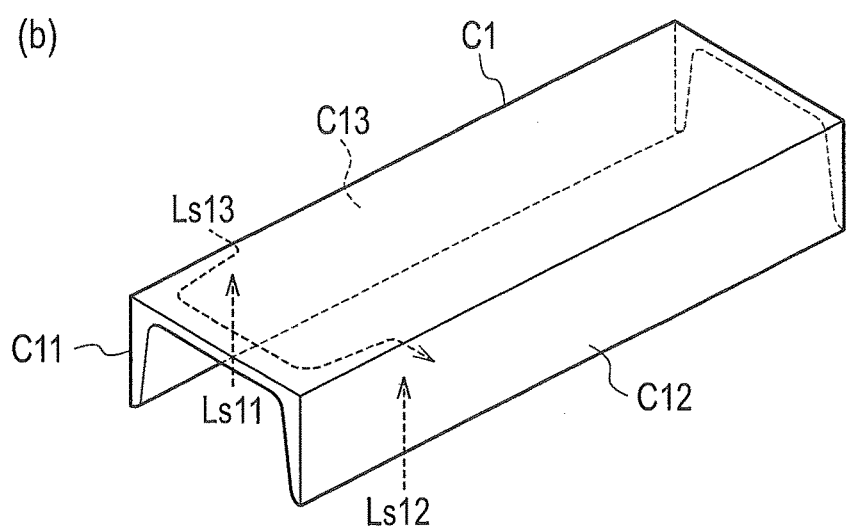
(b)
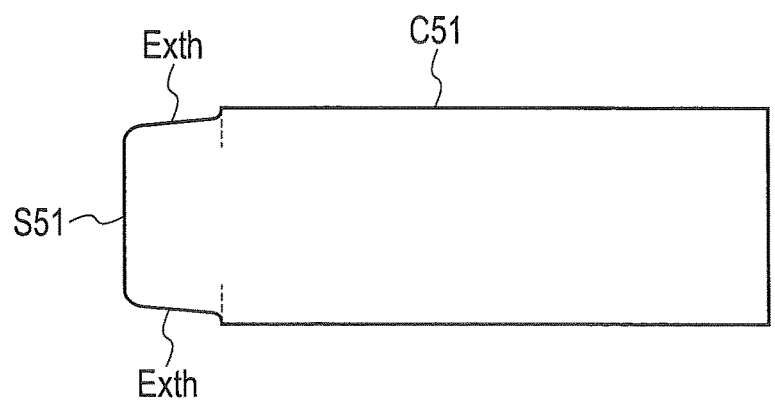
(c)

FIG. 7
(a)
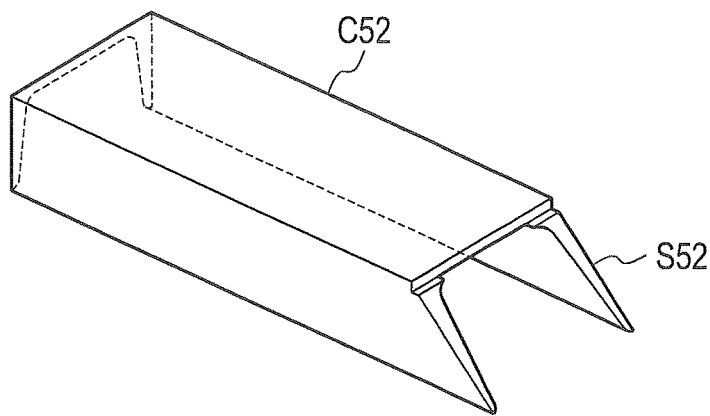
(b)
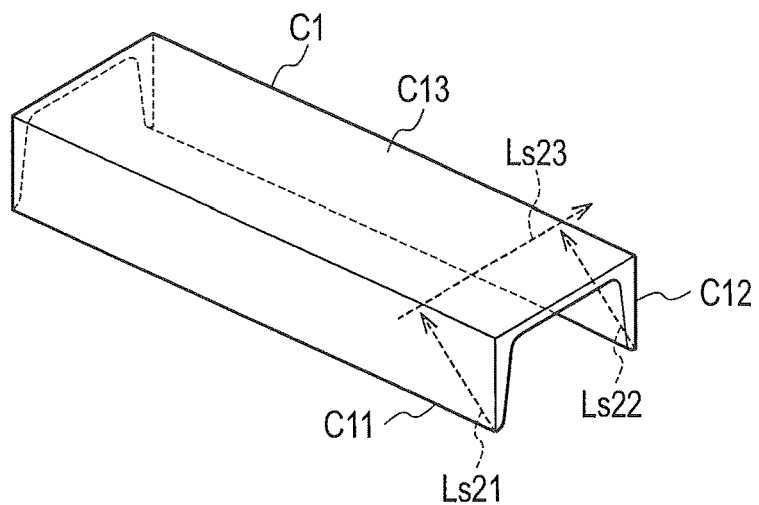
(c)
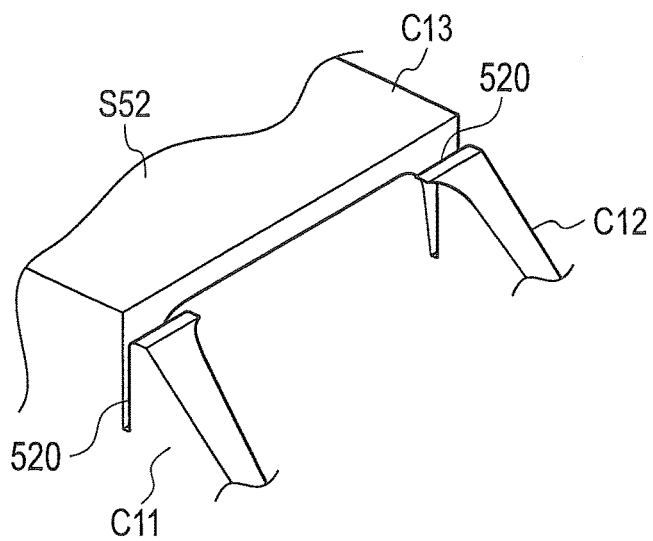

FIG. 8
(a)
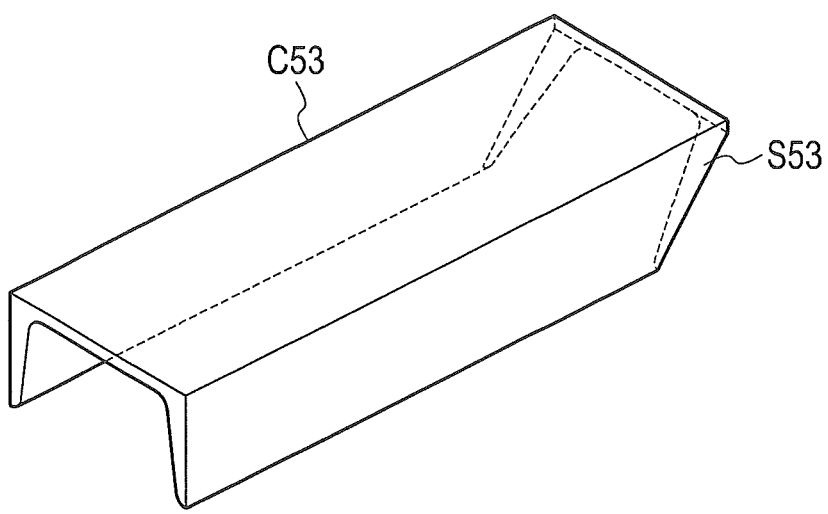
(b)
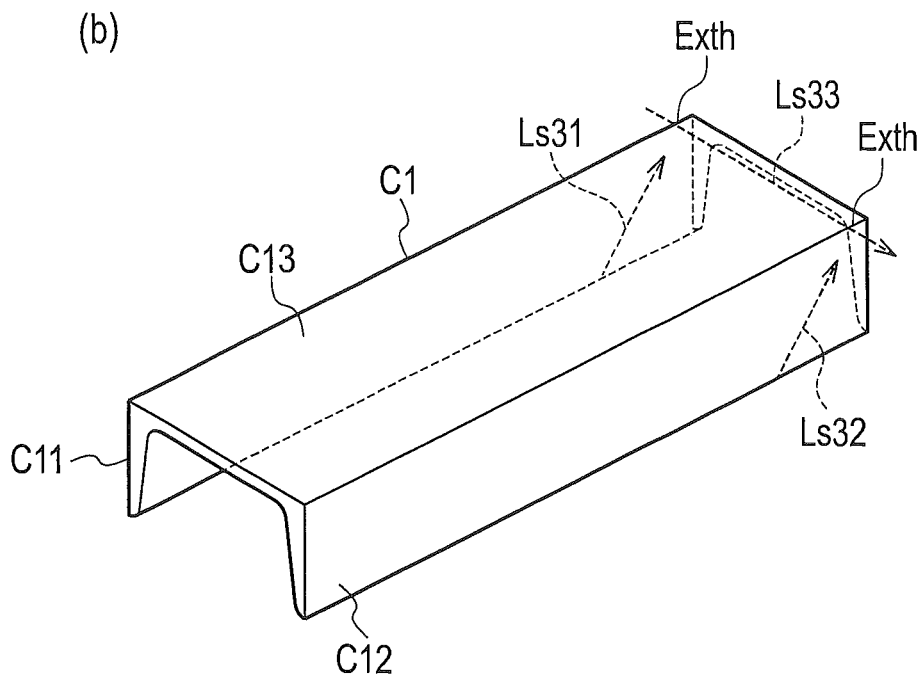

FIG. 9
(a)
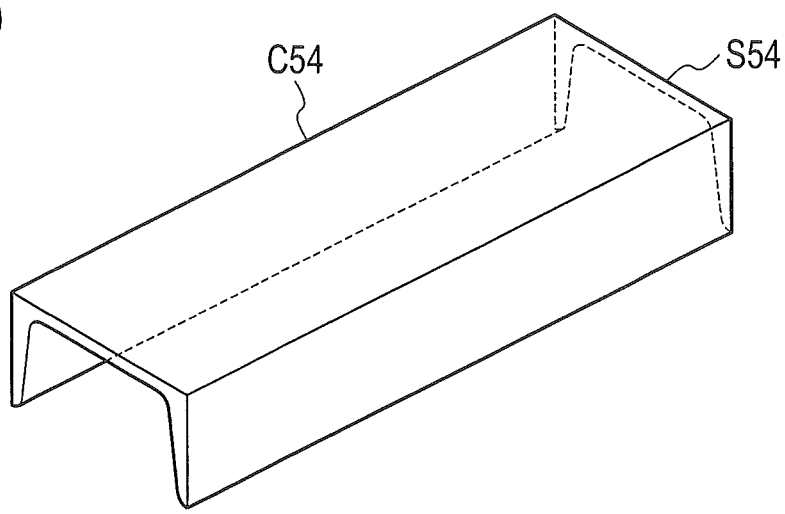
(b)
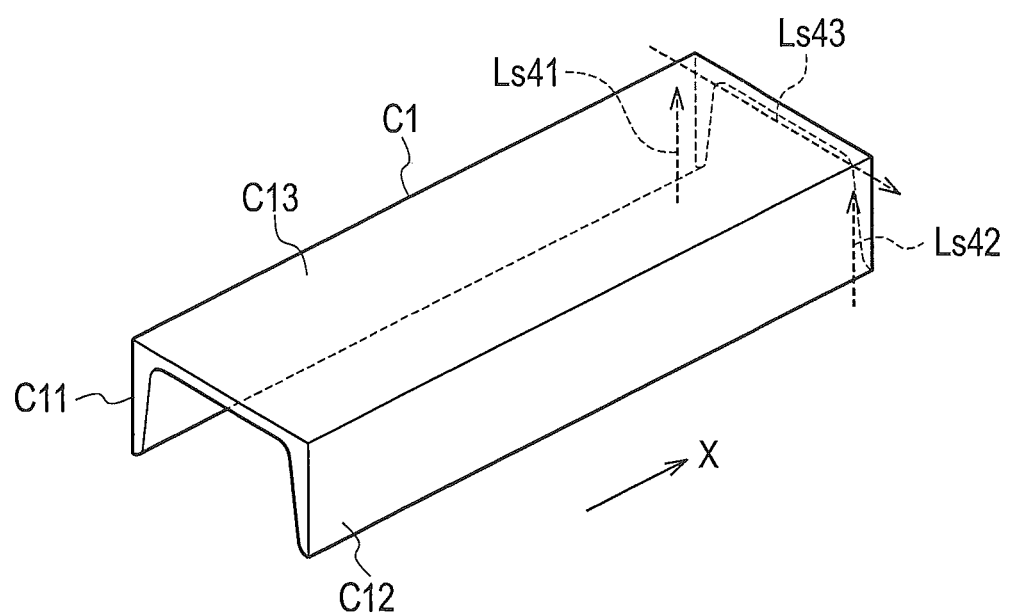

FIG. 10
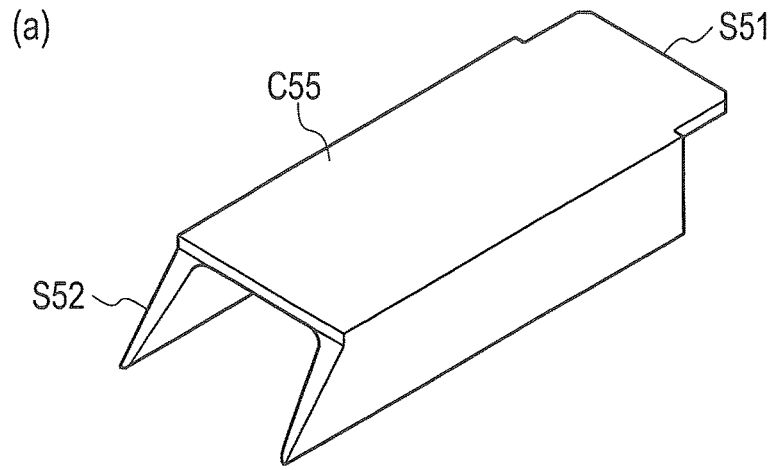
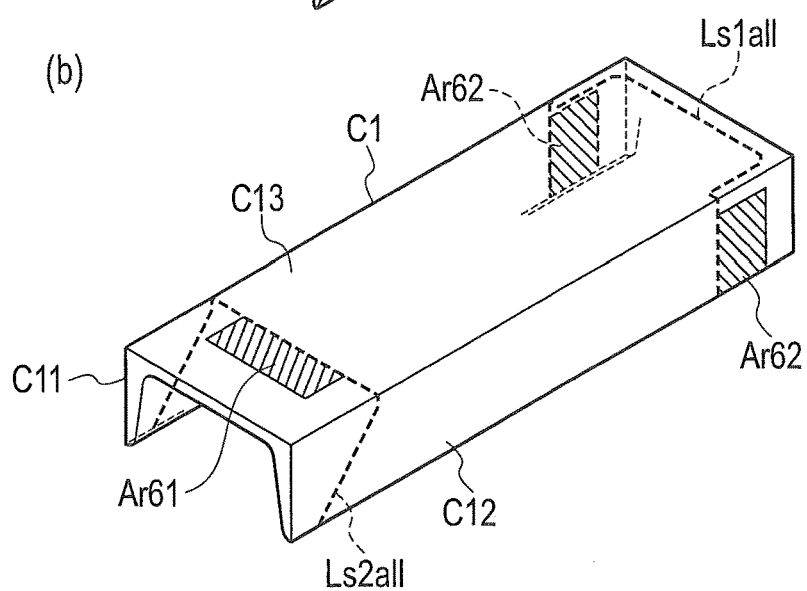
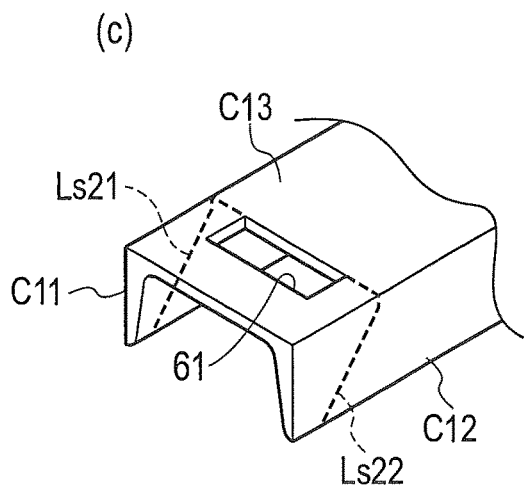
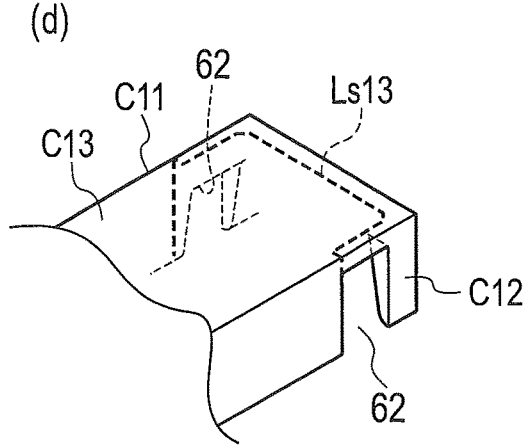

FIG. 12
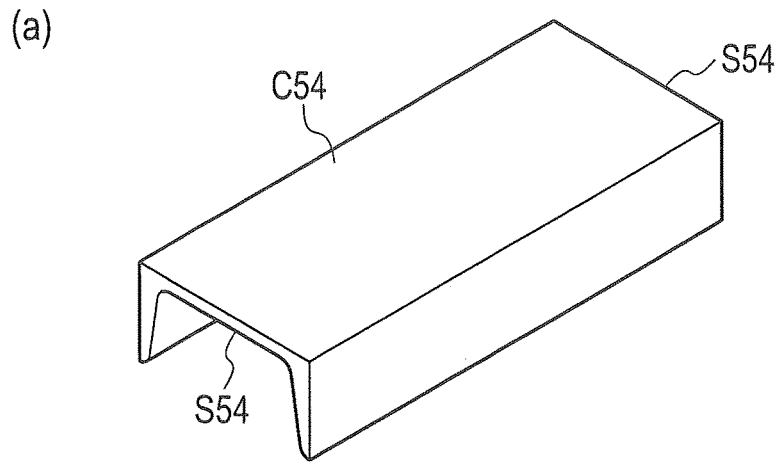
(a)
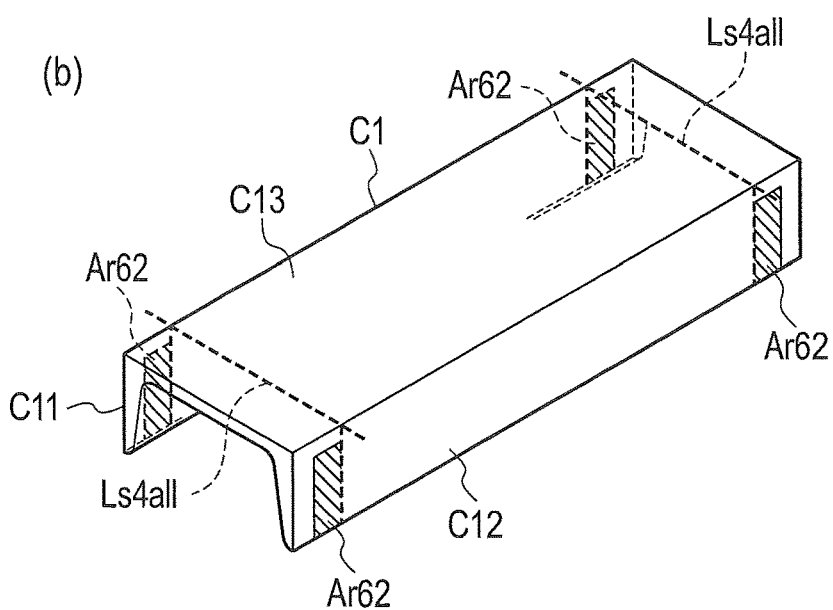
(b)
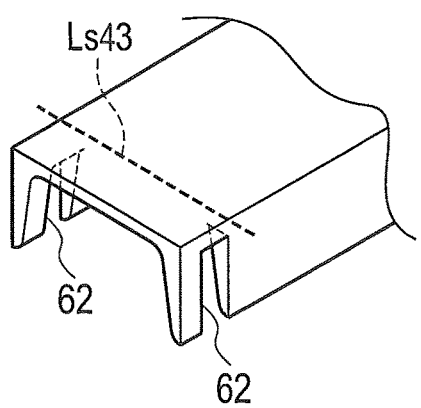
(c)
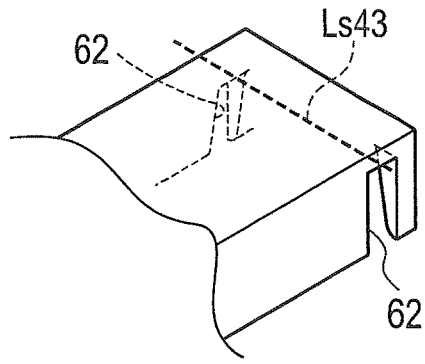
(d)

FIG. 13
(a)
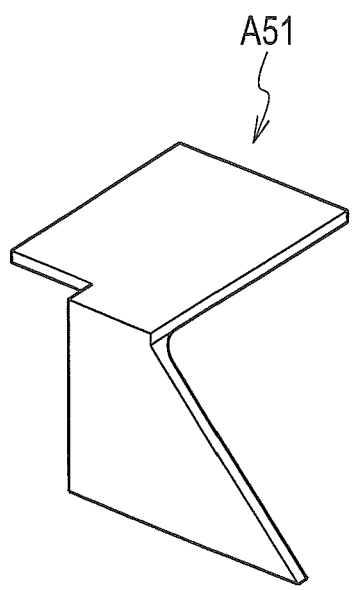
(b)
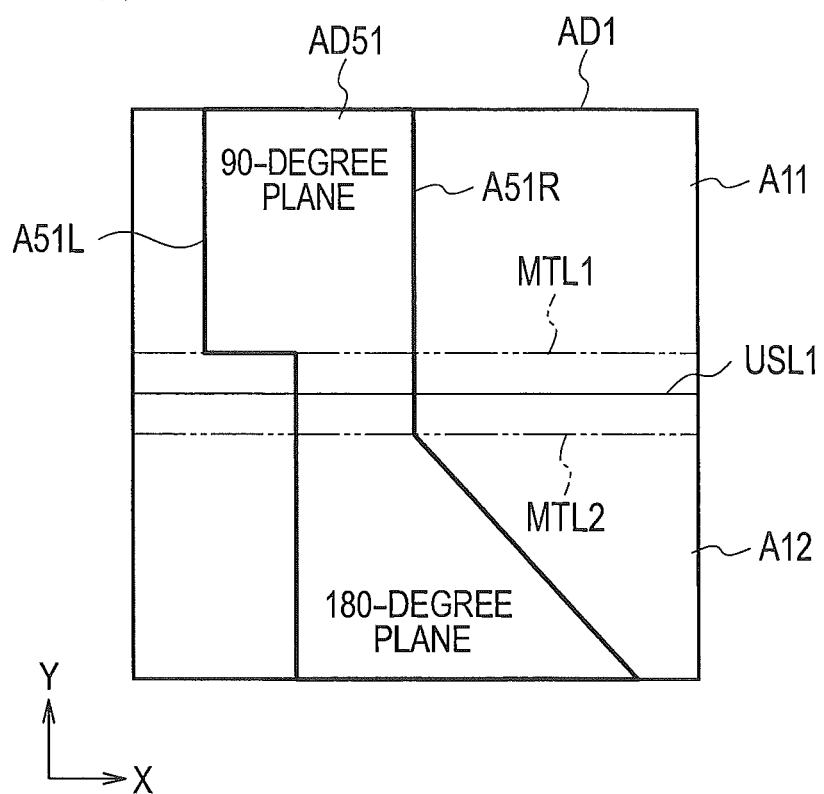

FIG. 14
(a)
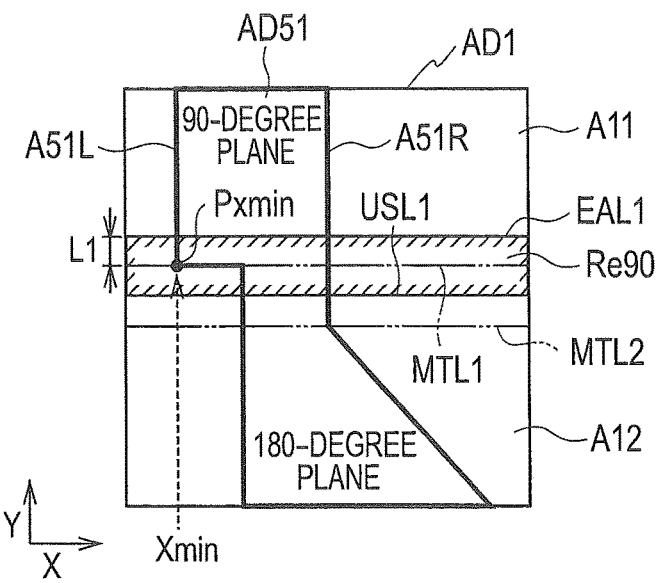
(b)
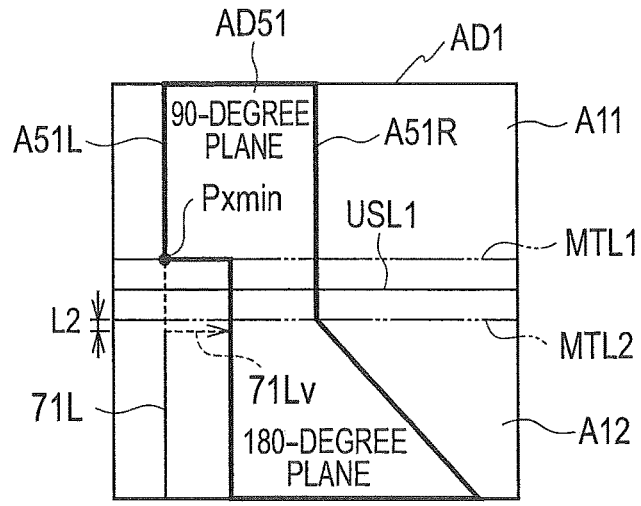
(c)
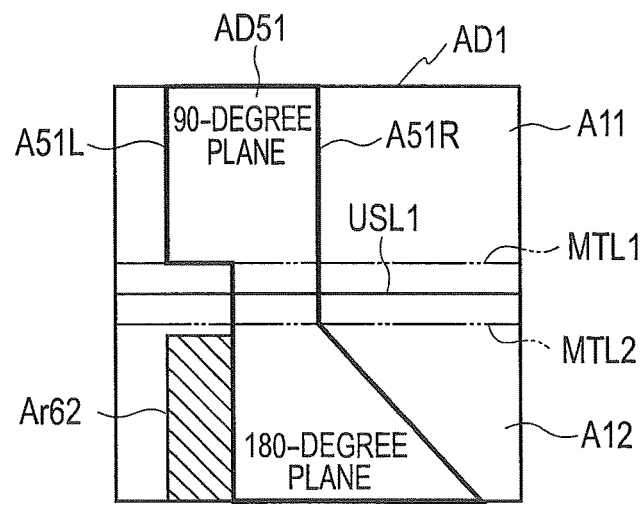

FIG. 16
(a)
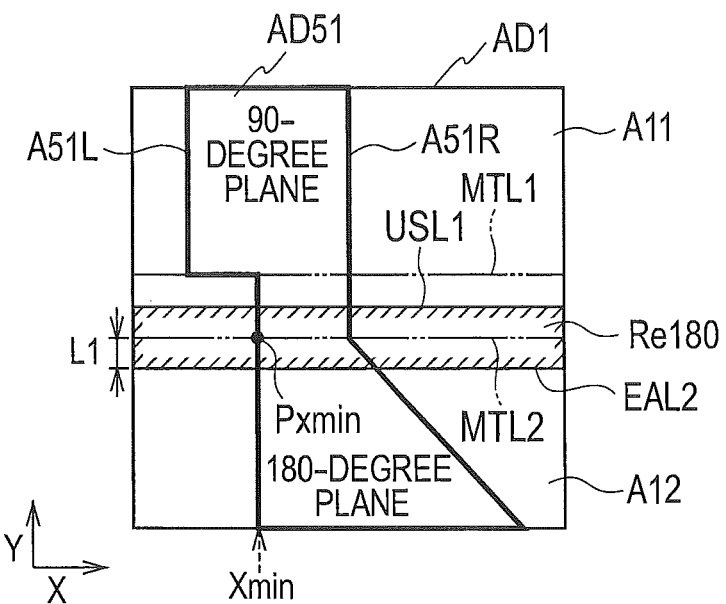
(b)
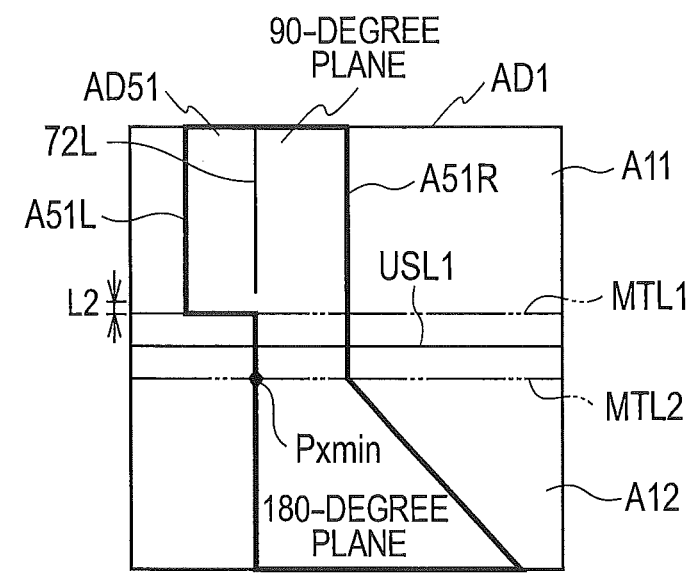

FIG. 17
(a)
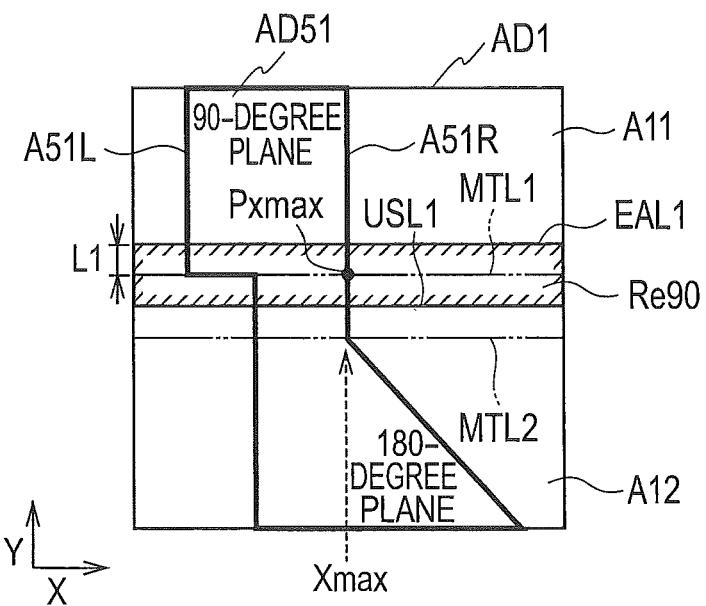
(b)
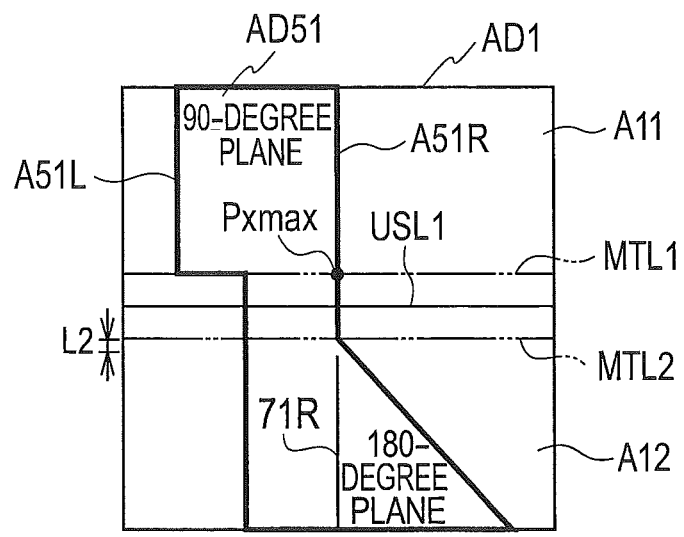

FIG. 18 (a)
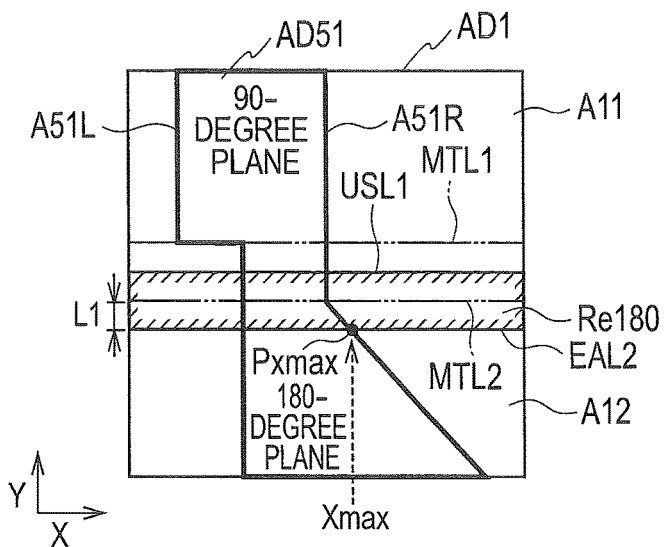
(b)
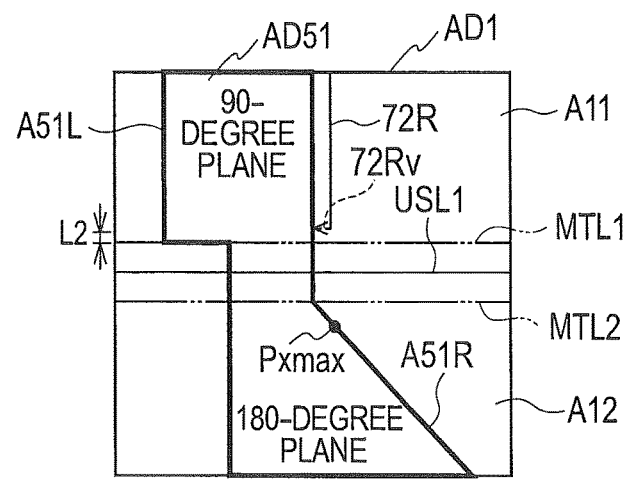
(c)
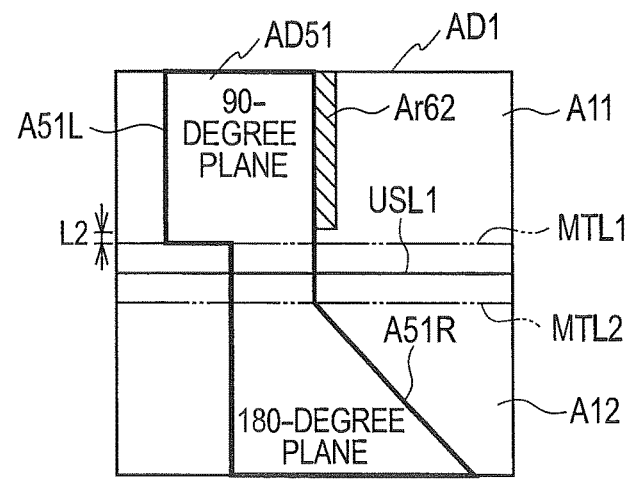

FIG. 20
(a)
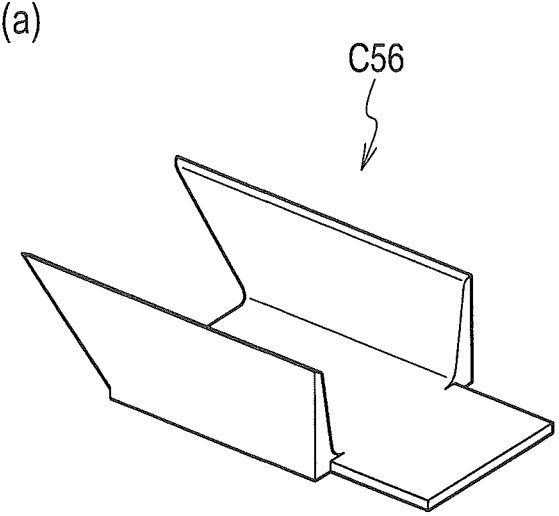
(b)
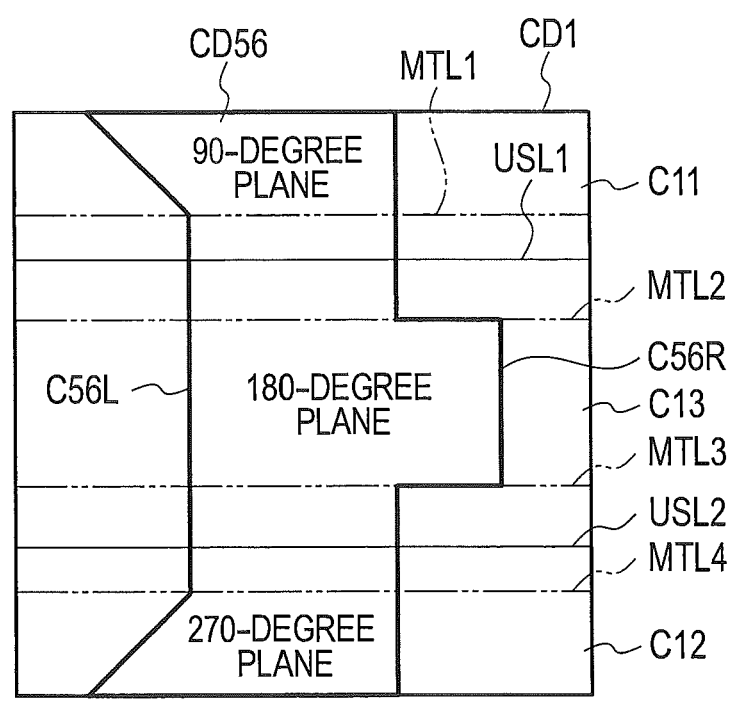

FIG. 21
(a) 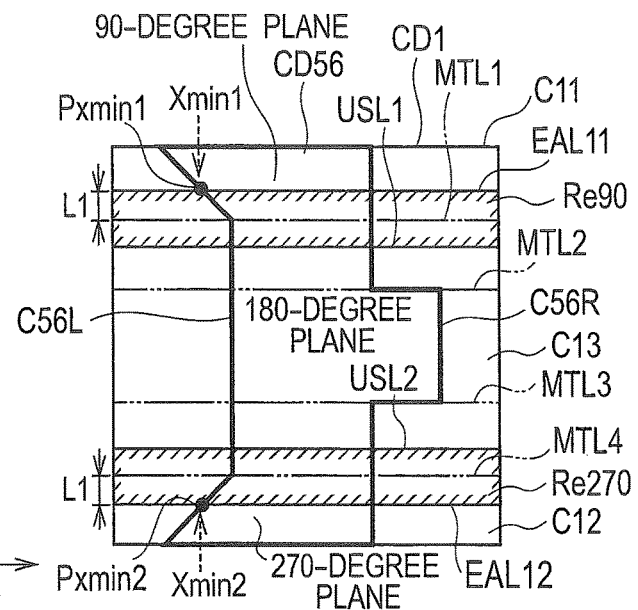
(b) 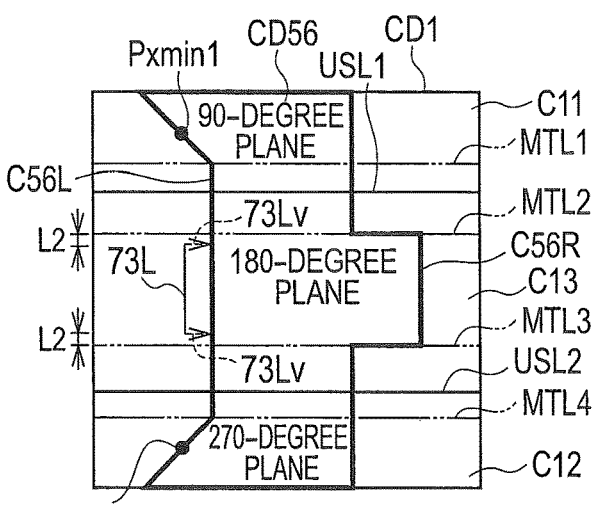
(c) 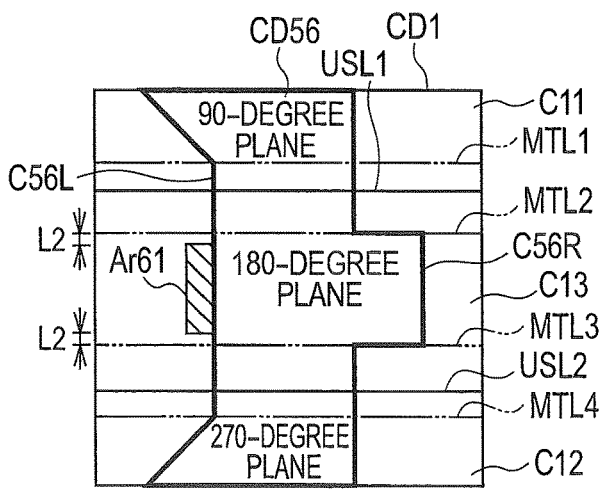

FIG. 22
(a)
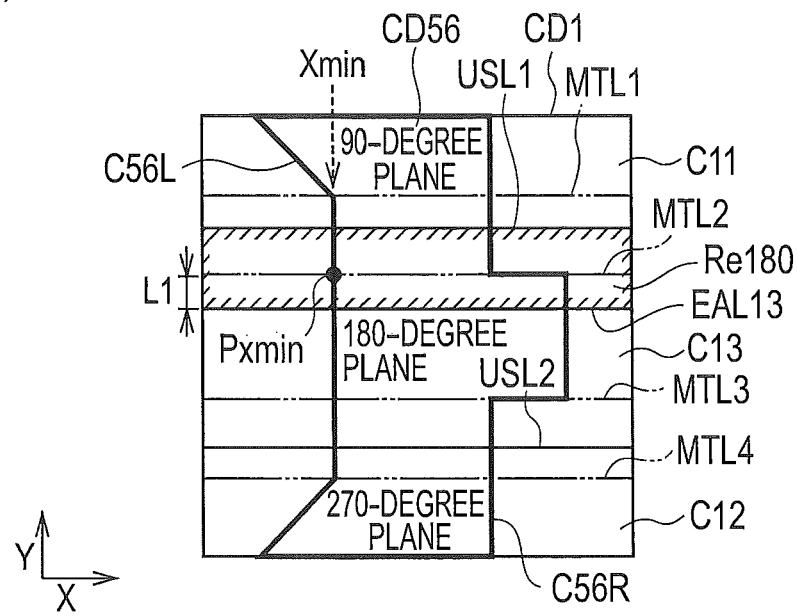
(b)
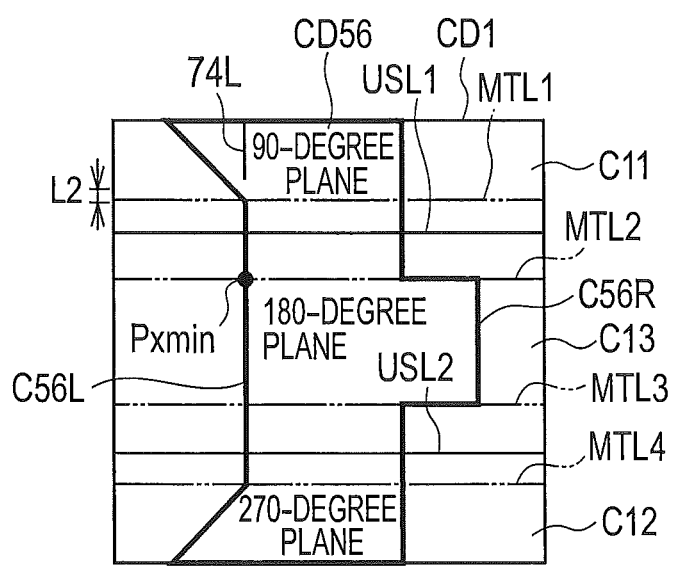

FIG. 23
(a)
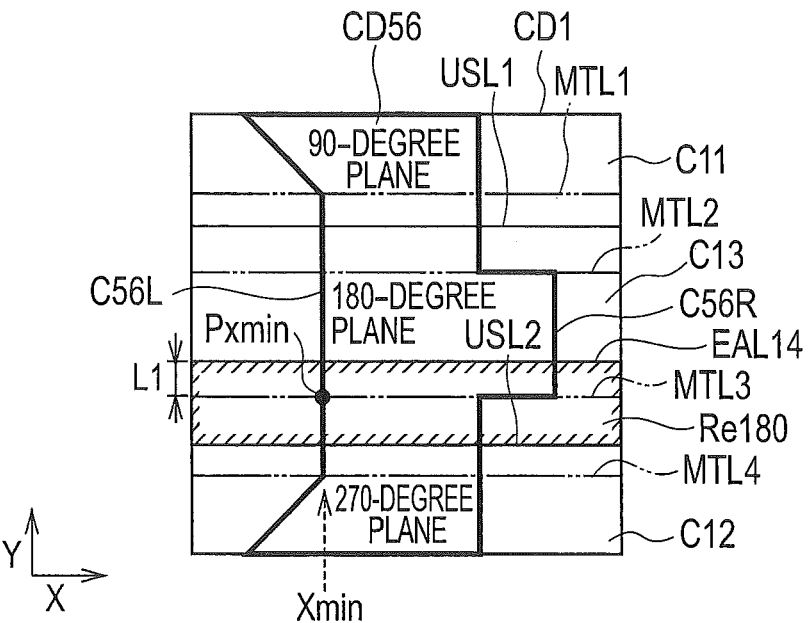
(b)
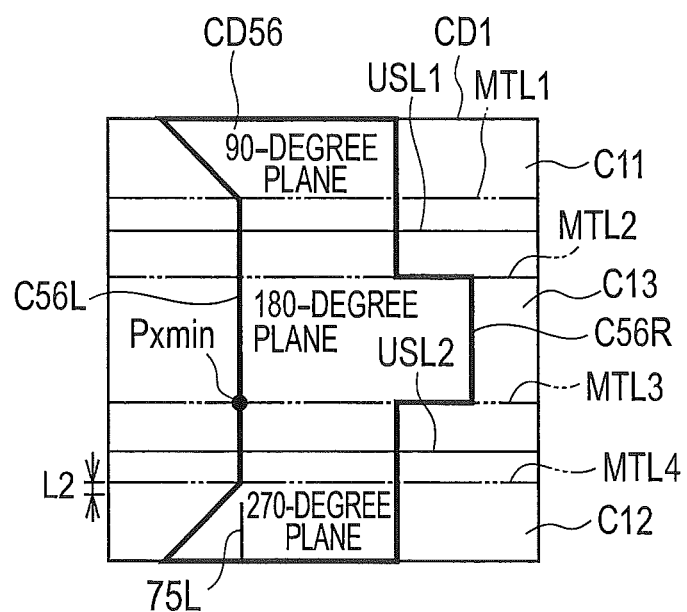

FIG. 24
(a)
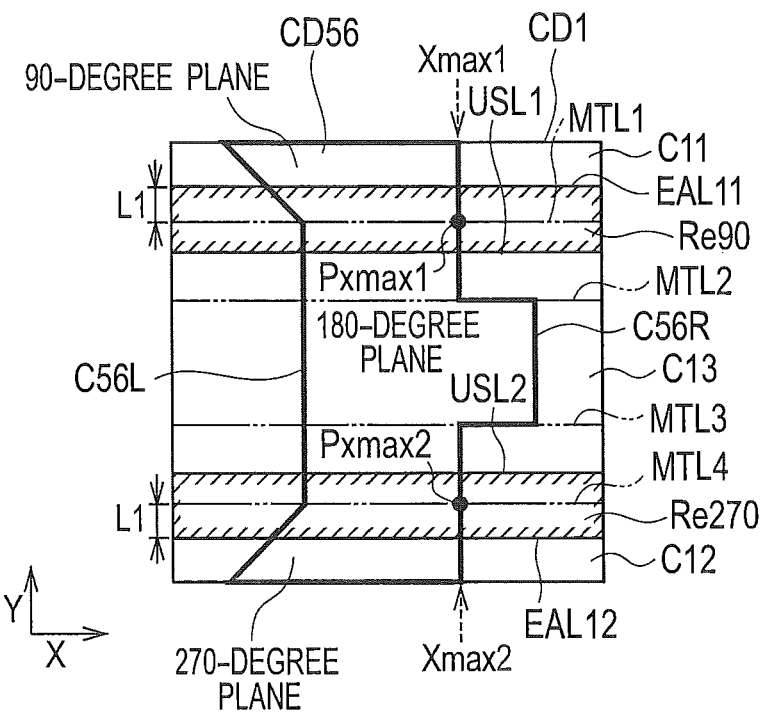
(b)
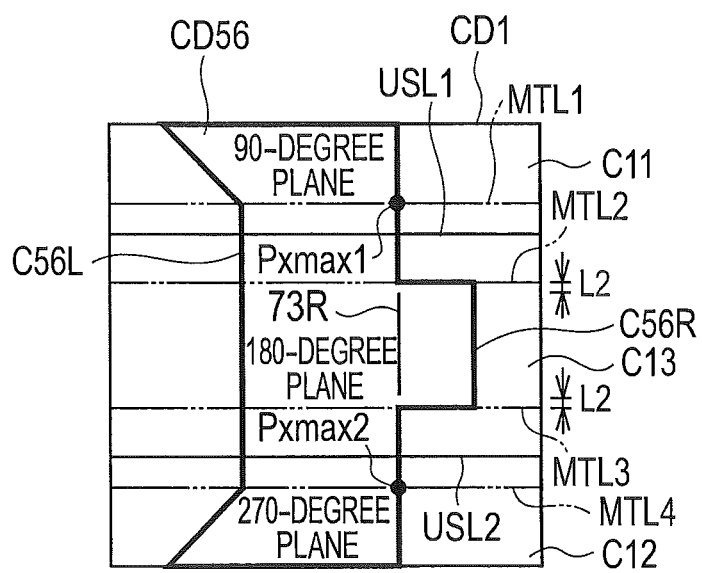

FIG. 25 (a)
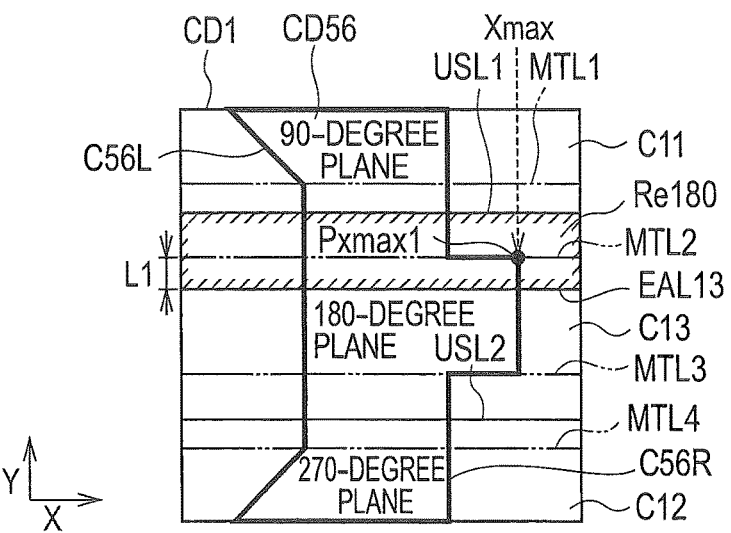
(b)
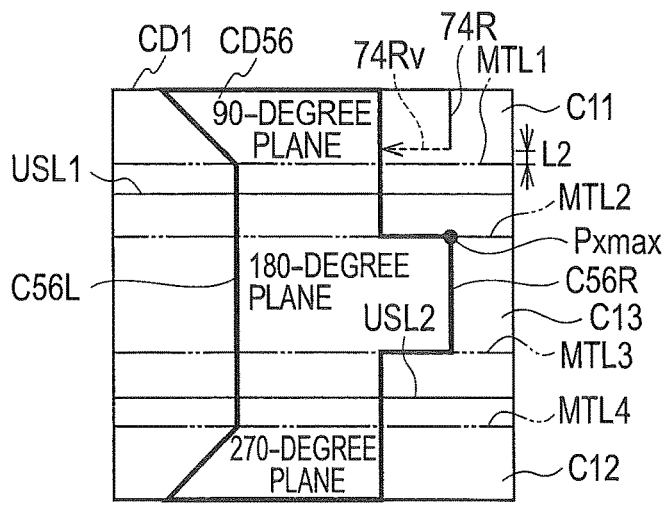
(c)
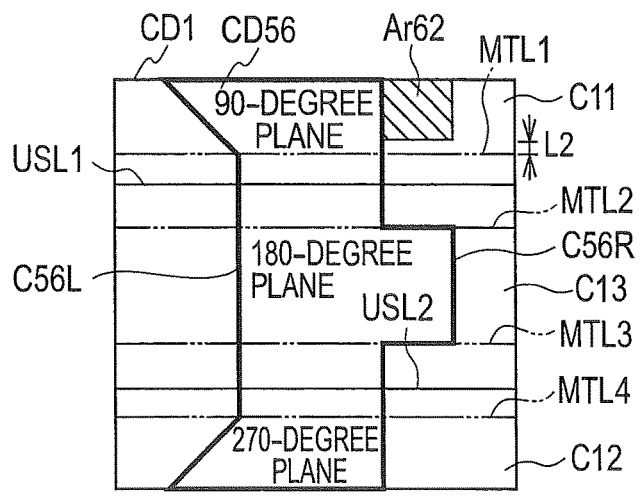

FIG. 26 (a)
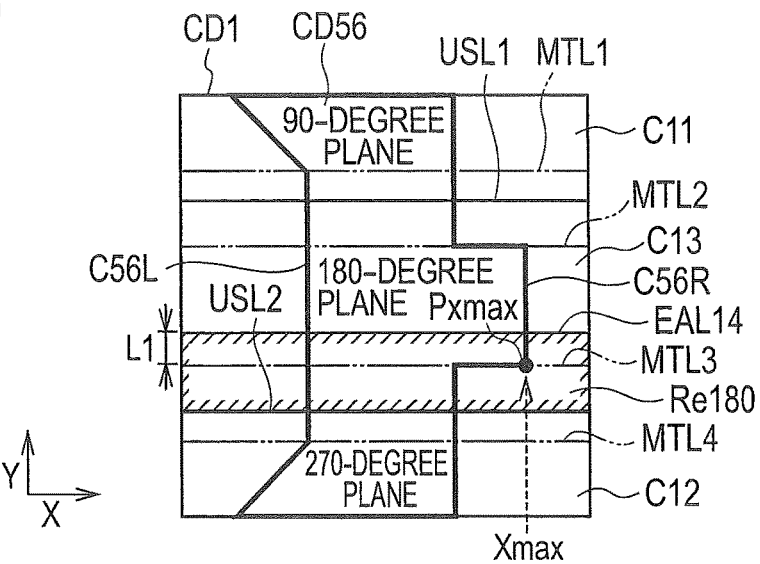
(b)
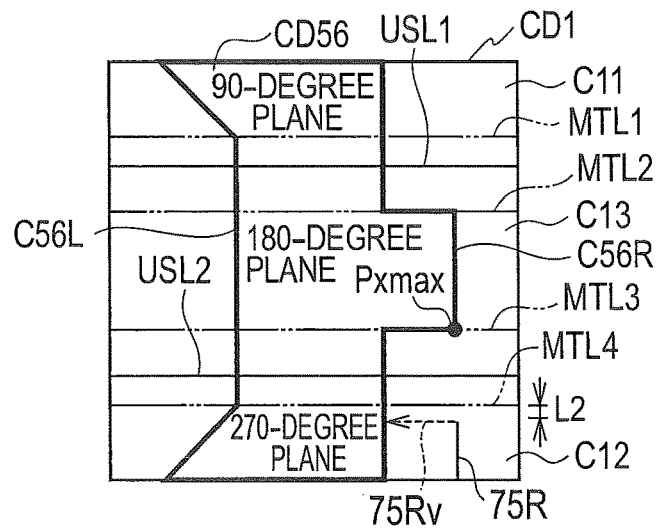
(c)
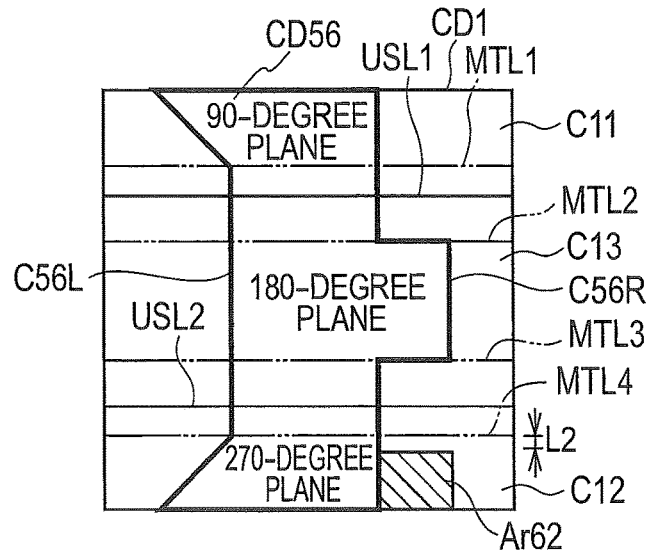

FIG. 28
(a)
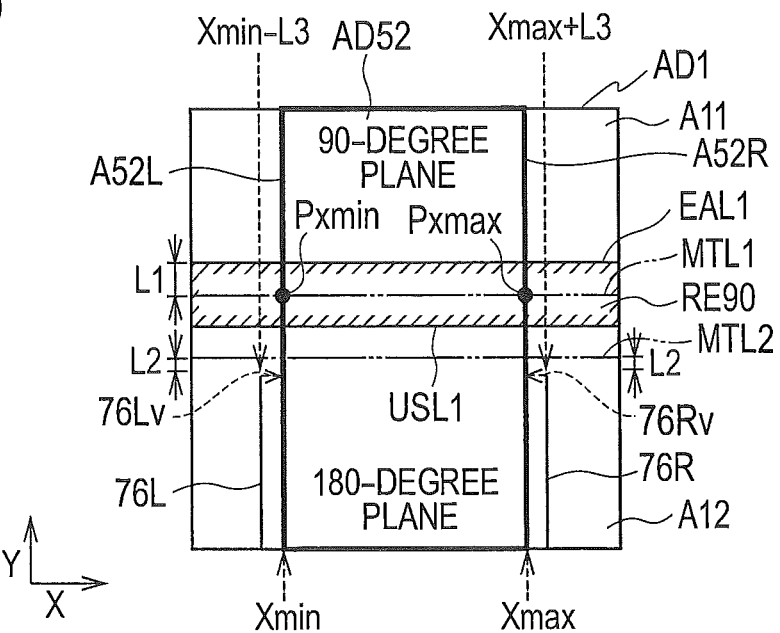
(b)
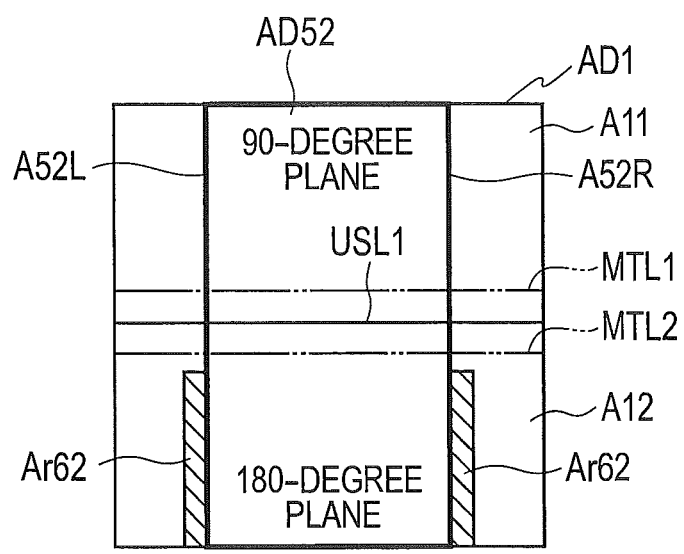

FIG. 29
(a)
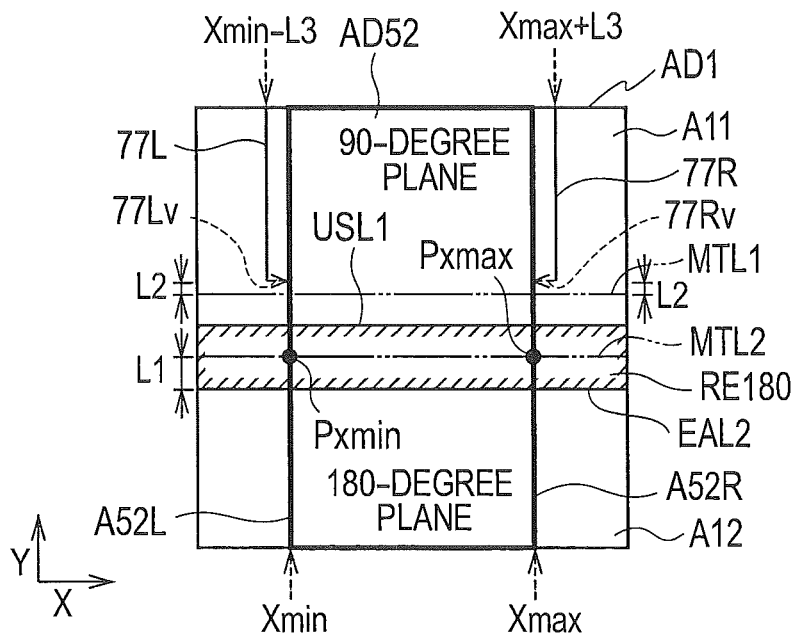
(b)
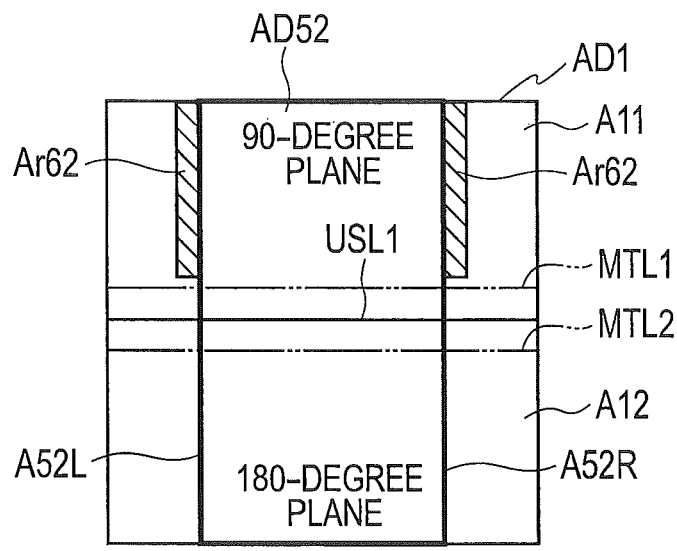

FIG. 31
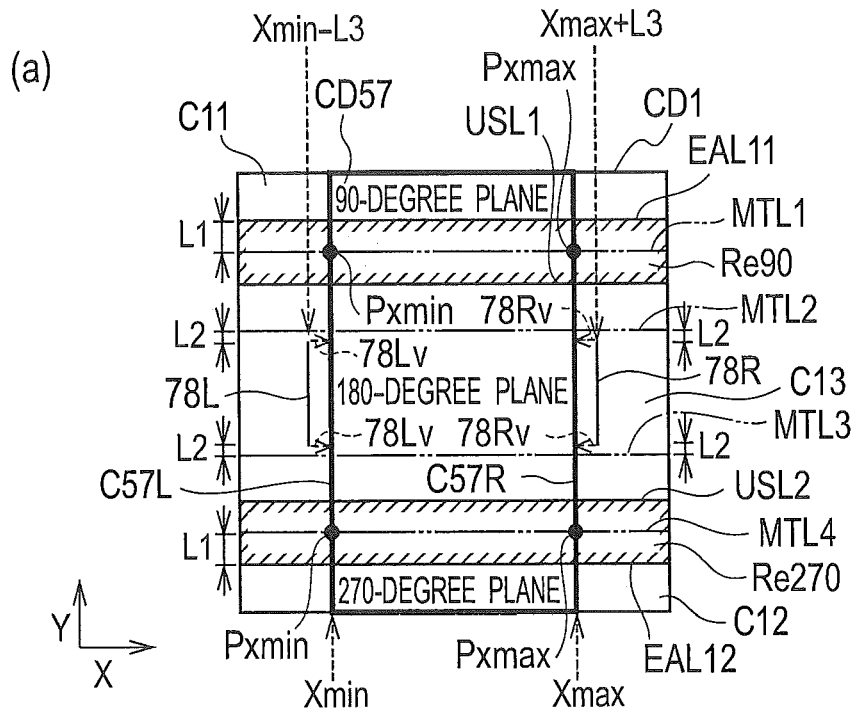
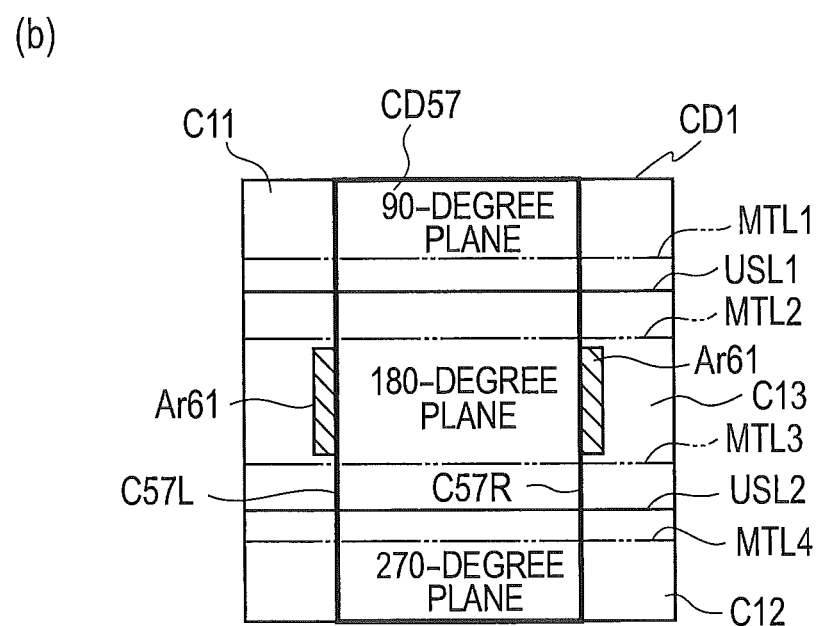

FIG. 32
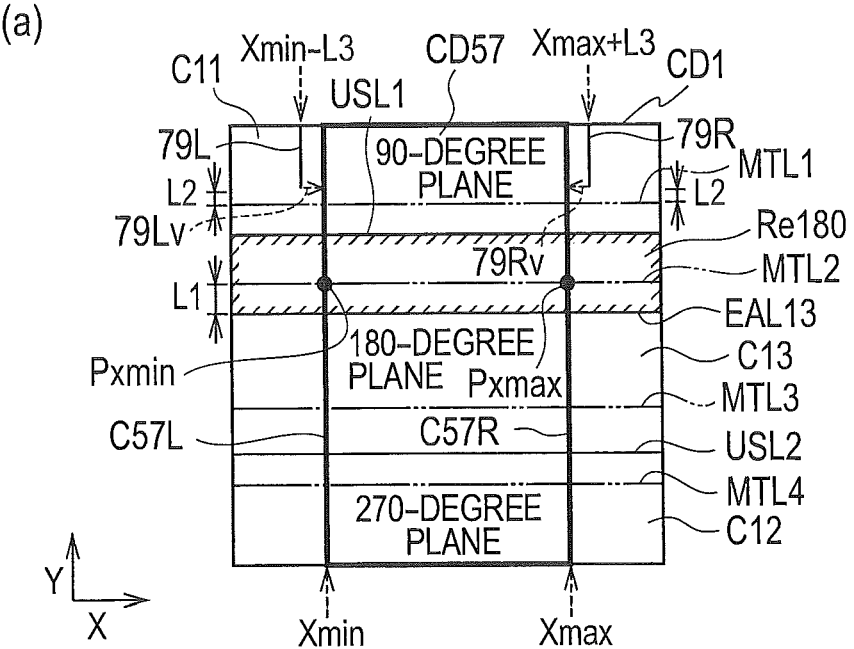
(a)
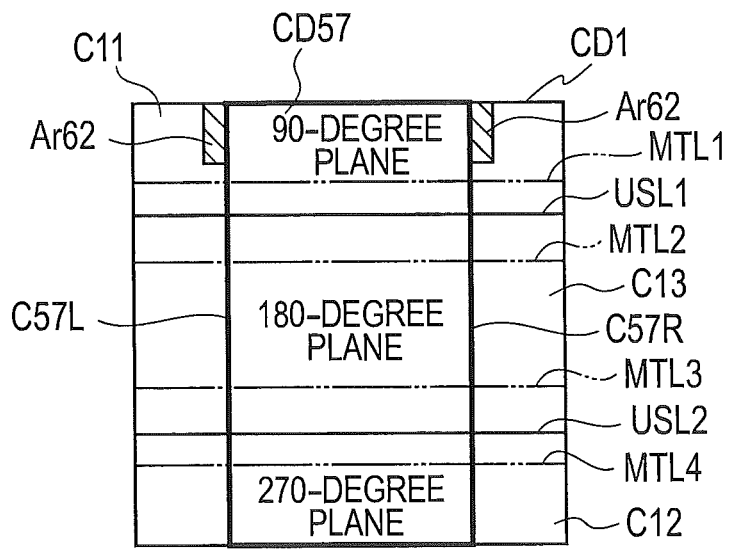
(b)

FIG. 33
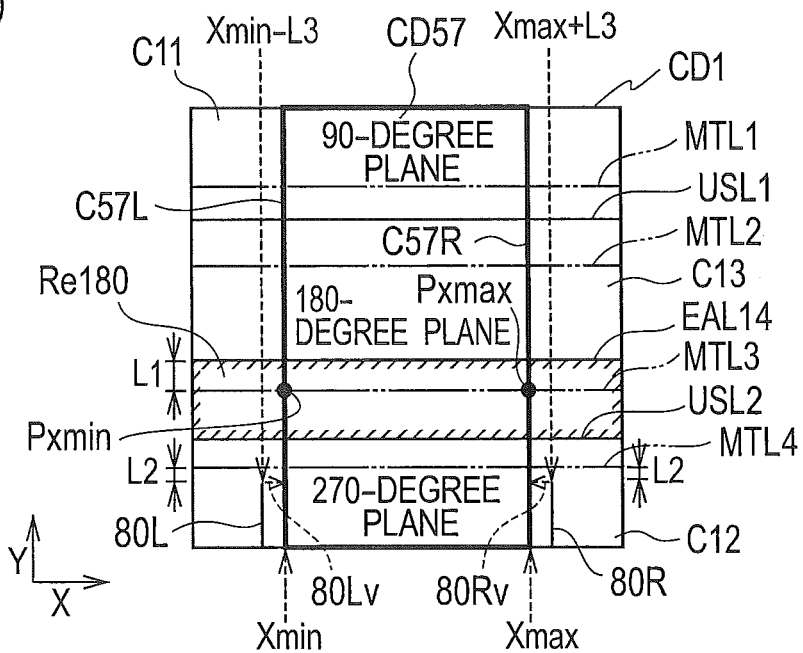
(a)
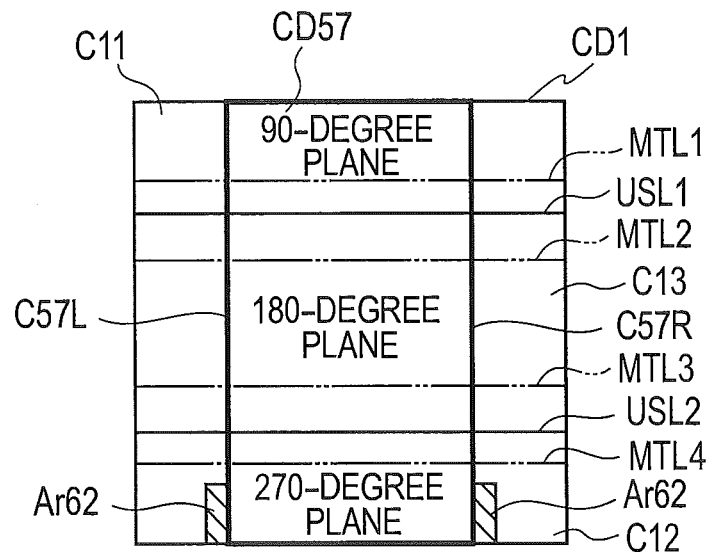
(b)

FIG. 35
(a)
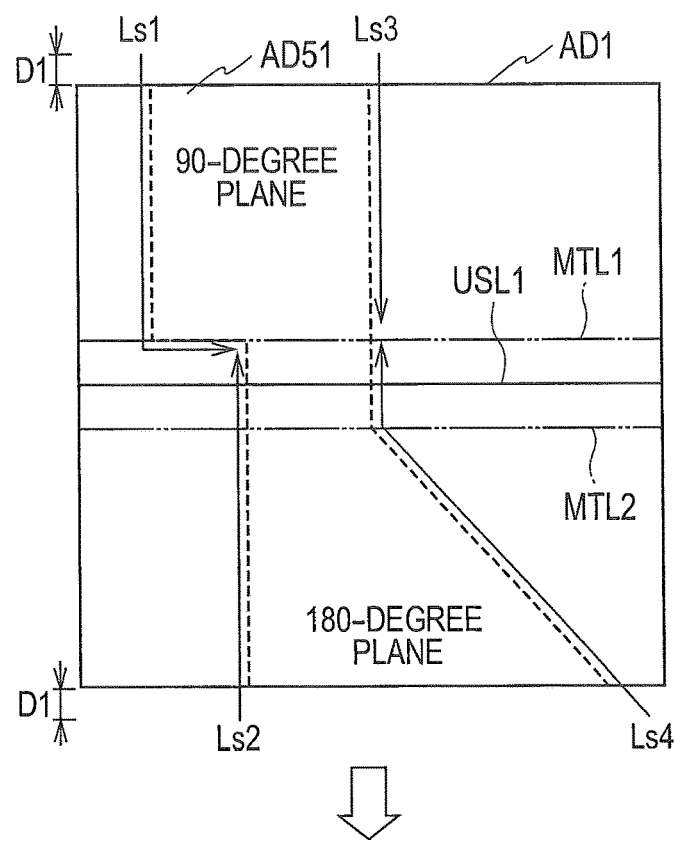
(b)
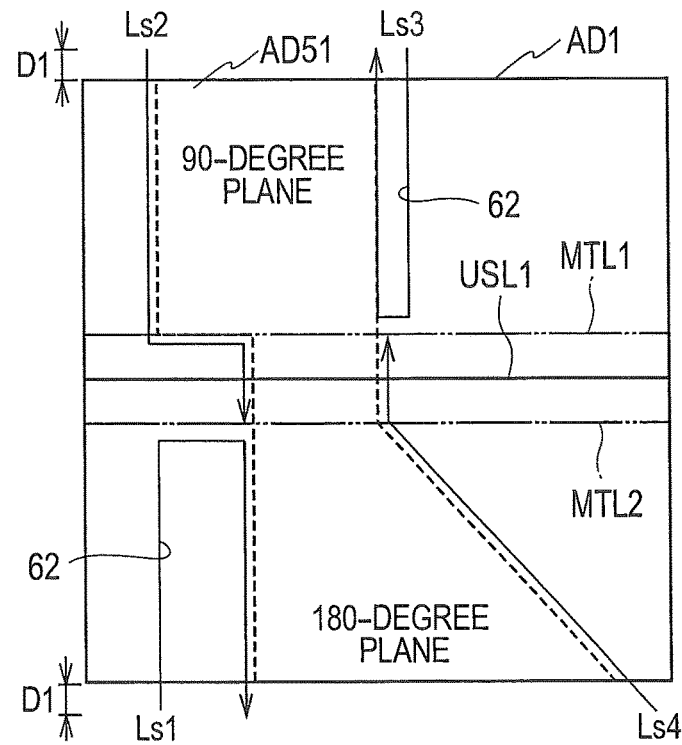

FIG. 36 (a)
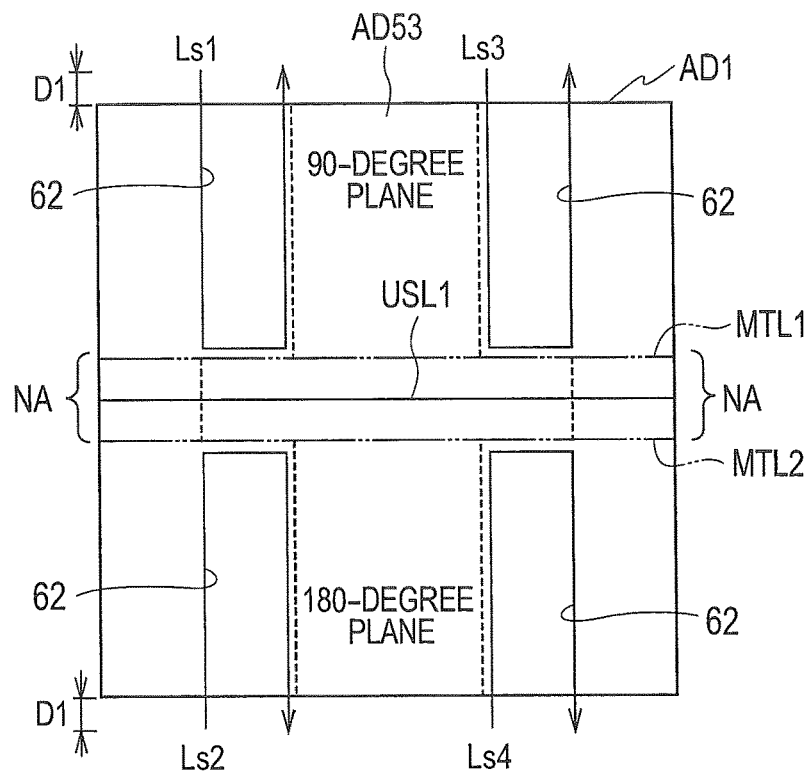
(b)
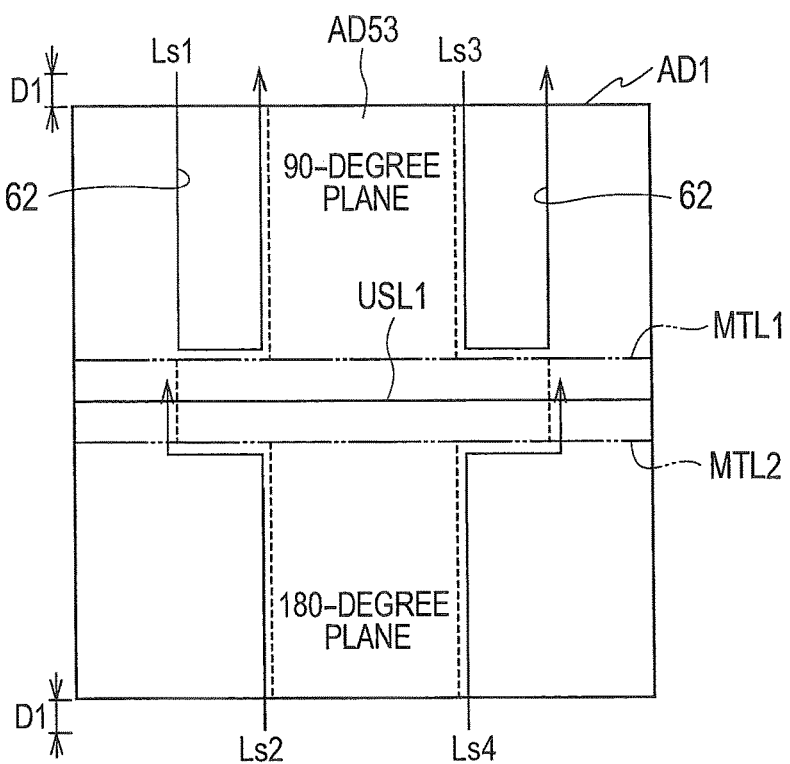

FIG. 37
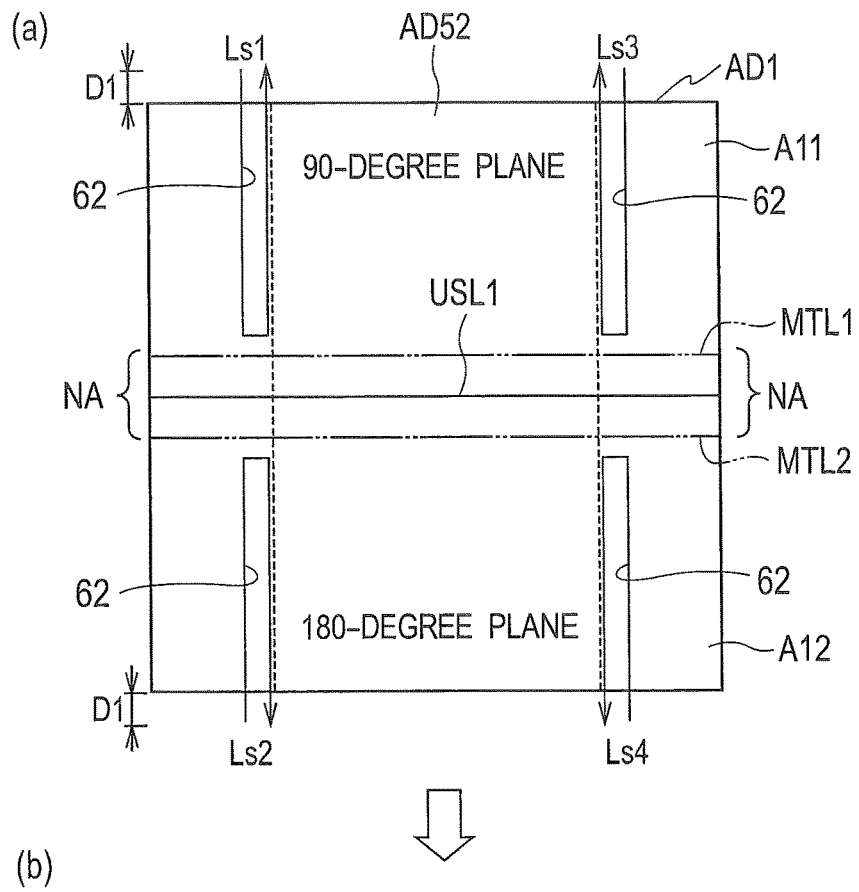
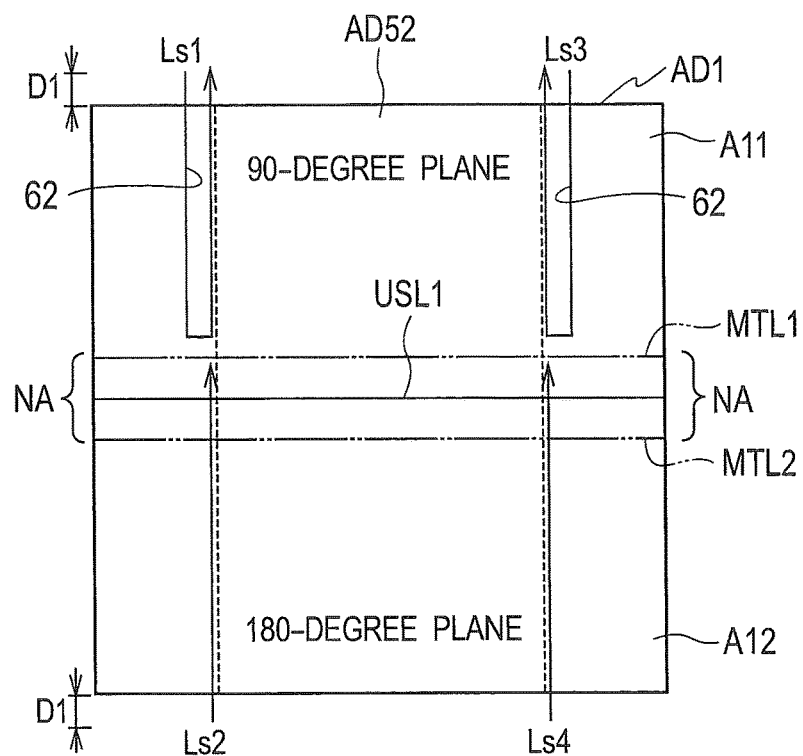

FIG. 38
(a)
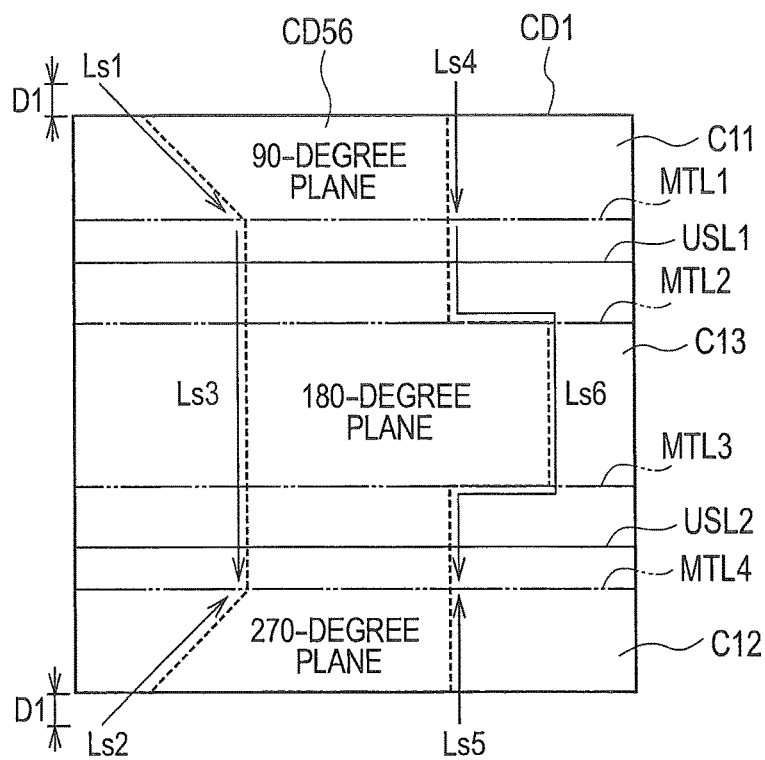
(b)
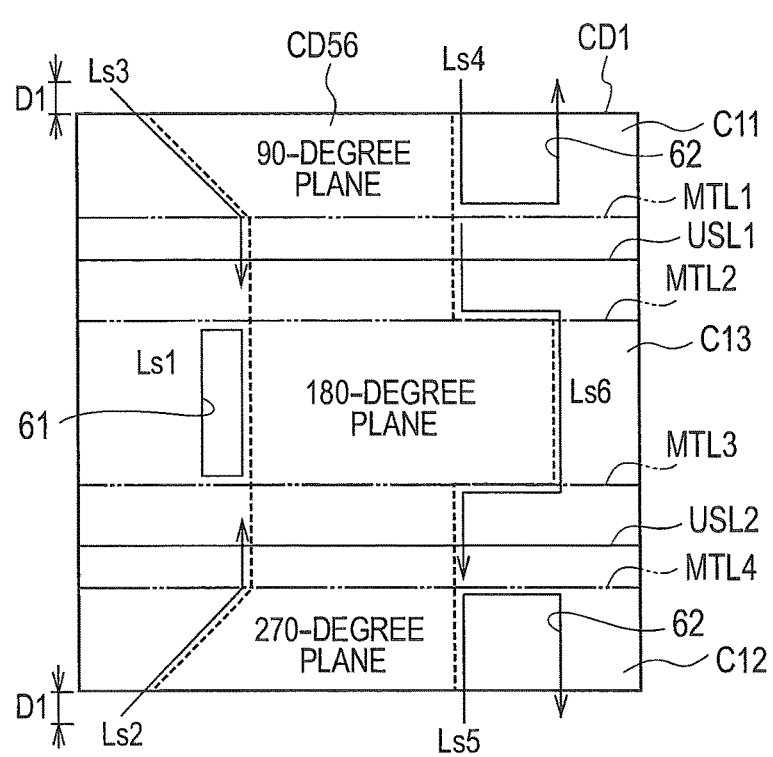

FIG. 39 (a)
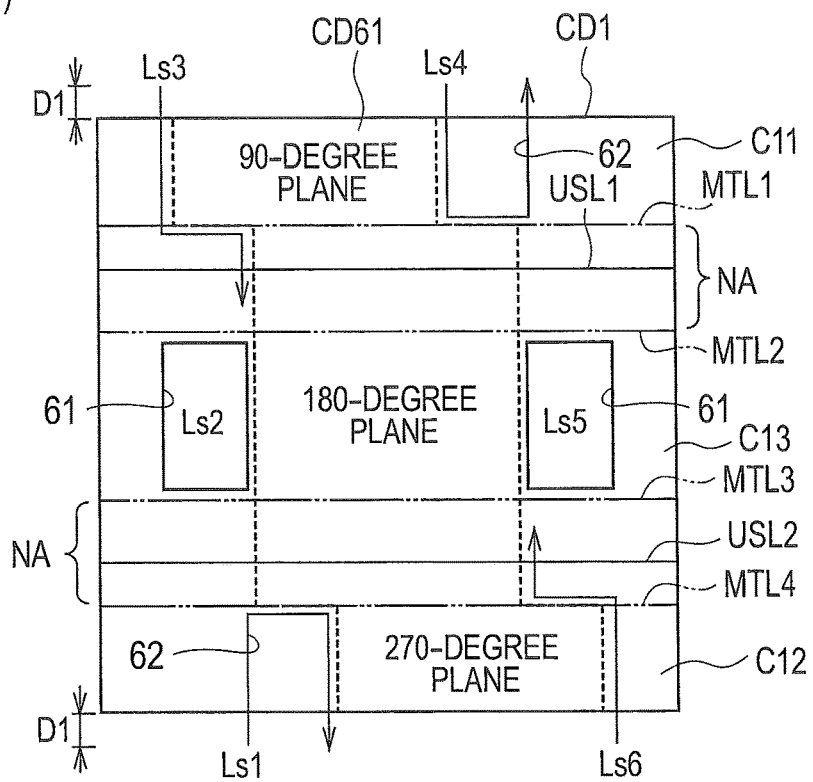
(b)
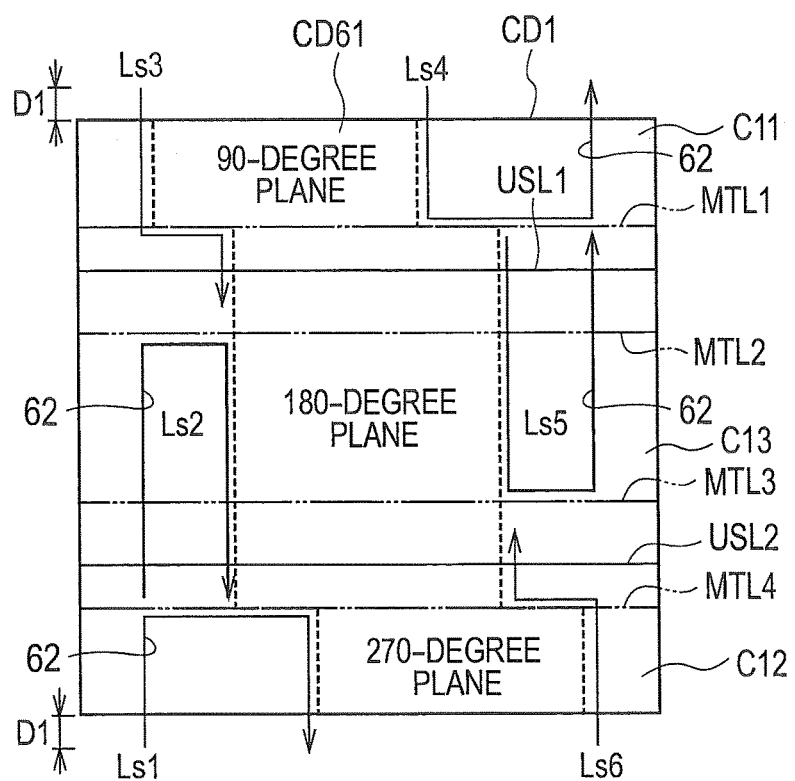

FIG. 40
(a)
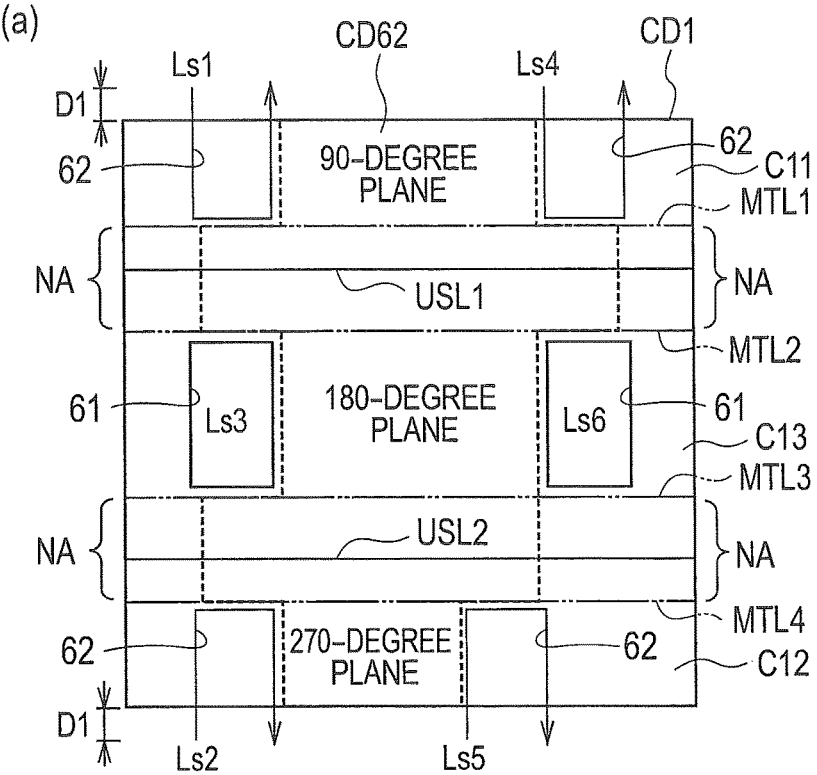
(b)
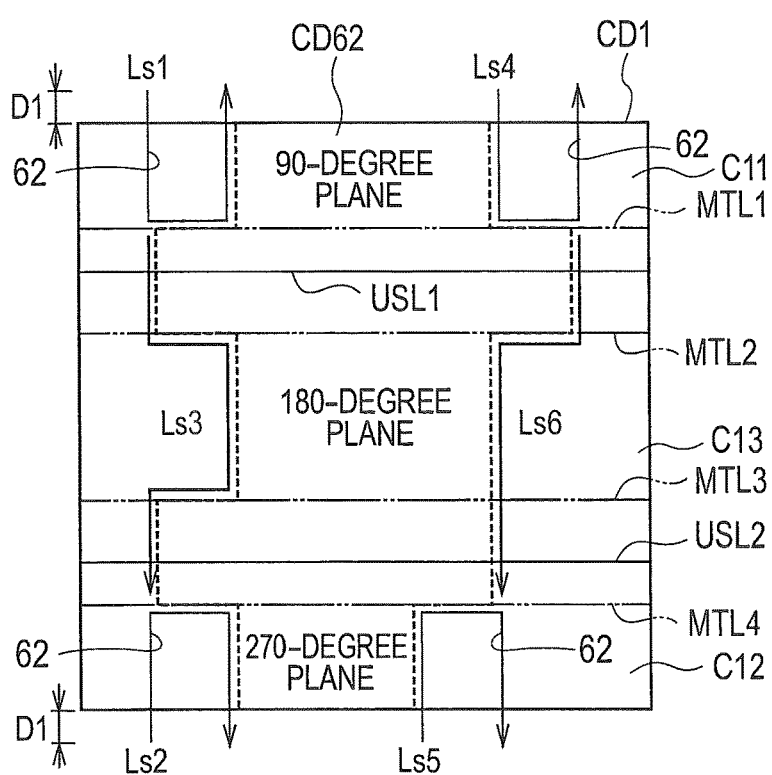

FIG. 41
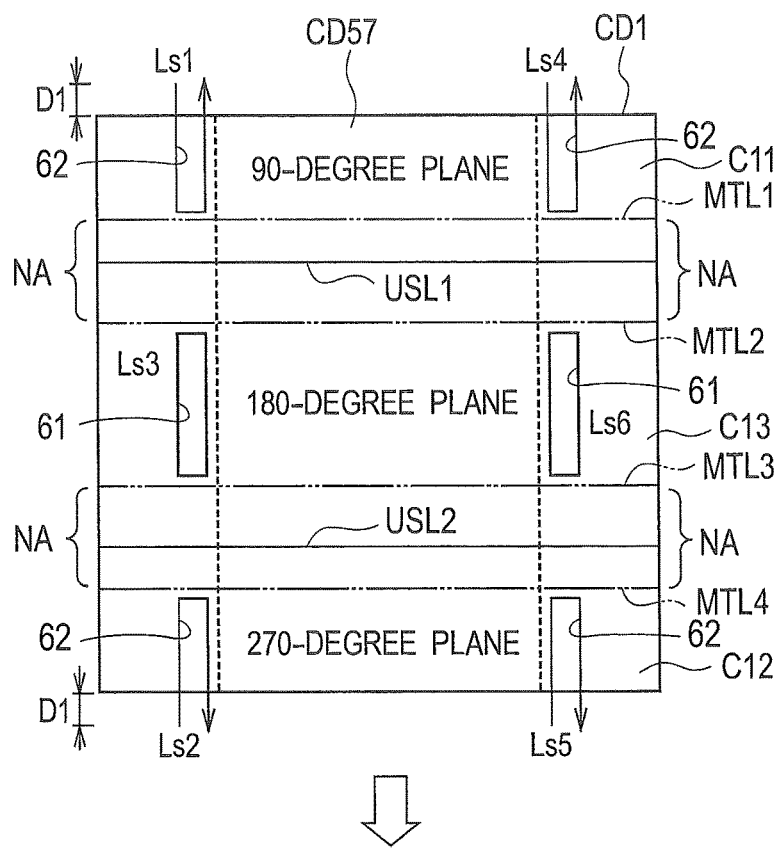
(a)
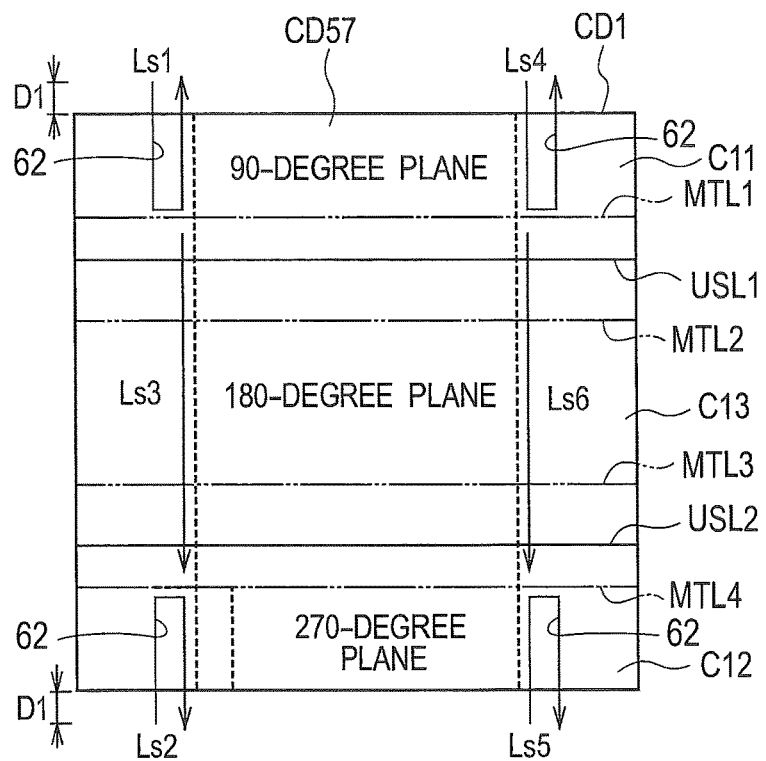
(b)

FIG. 42
(a)
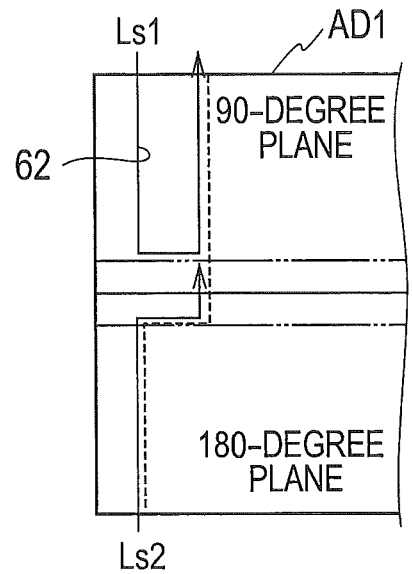
(b)
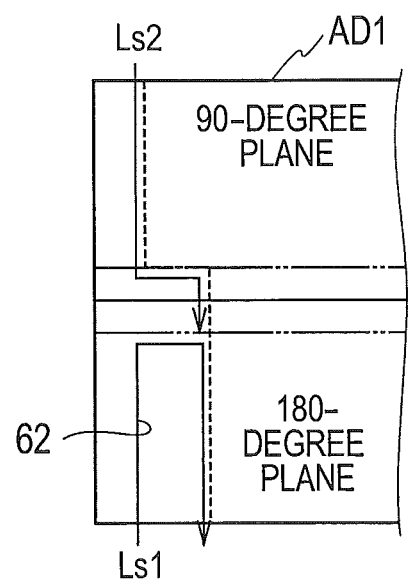

CONTINUED TO FIG. 47B

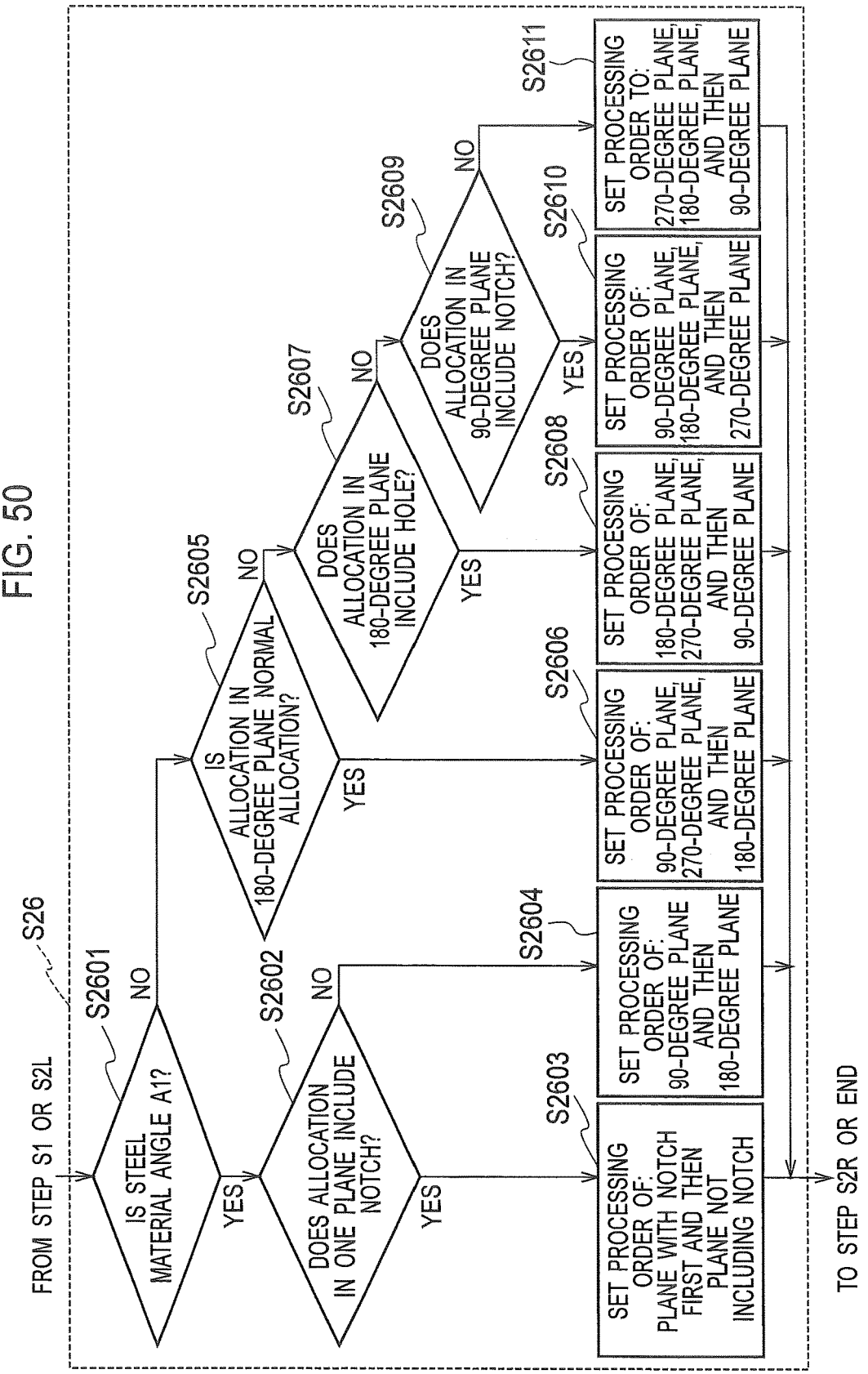

FIG. 51

| DETERMINATION RESULT | | CASE 1 | CASE 2 | CASE 3 | CASE 4 |
|---|---|---|---|---|---|
| | 90-DEGREE PLANE (STEP S22(90)) | AFFIRMATIVE (NOTCH) | AFFIRMATIVE (NOTCH) | NEGATIVE (NORMAL ALLOCATION) | NEGATIVE (NORMAL ALLOCATION) |
| | 180-DEGREE PLANE (STEP S22(180)) | AFFIRMATIVE (NOTCH) | NEGATIVE (NORMAL ALLOCATION) | AFFIRMATIVE (NOTCH) | NEGATIVE (NORMAL ALLOCATION) |
| ALLOCATION | 90-DEGREE PLANE | NOTCH | NOTCH | NORMAL ALLOCATION | NORMAL ALLOCATION |
| | 180-DEGREE PLANE | REPLACE NOTCH WITH NORMAL ALLOCATION | NORMAL ALLOCATION | NOTCH | NORMAL ALLOCATION |

FIG. 52

| | PLANE | CASE 1 | CASE 2 | CASE 3 | CASE 4 |
|---|---|---|---|---|---|
| DETERMINATION RESULT | 90-DEGREE PLANE (STEP S24(90)) | AFFIRMATIVE (NOTCH) | AFFIRMATIVE (NOTCH) | NEGATIVE (NORMAL ALLOCATION) | AFFIRMATIVE (NOTCH) |
| | 180-DEGREE PLANE (STEP S24(180)) | AFFIRMATIVE (HOLE) | AFFIRMATIVE (HOLE) | AFFIRMATIVE (HOLE) | NEGATIVE (NORMAL ALLOCATION) |
| | 270-DEGREE PLANE (STEP S24(270)) | AFFIRMATIVE (NOTCH) | NEGATIVE (NORMAL ALLOCATION) | AFFIRMATIVE (NOTCH) | AFFIRMATIVE (NOTCH) |
| ALLOCATION | 90-DEGREE PLANE | NOTCH | NOTCH (MODIFY WIDTH) | NORMAL ALLOCATION | NOTCH |
| | 180-DEGREE PLANE | REPLACE HOLE WITH NORMAL ALLOCATION | REPLACE HOLE WITH NOTCH | REPLACE HOLE WITH NOTCH | NORMAL ALLOCATION |
| | 270-DEGREE PLANE | NOTCH | NORMAL ALLOCATION | NOTCH (MODIFY WIDTH) | NOTCH |
| | PLANE | CASE 5 | CASE 6 | CASE 7 | CASE 8 |
| DETERMINATION RESULT | 90-DEGREE PLANE (STEP S24(90)) | AFFIRMATIVE (NOTCH) | NEGATIVE (NORMAL ALLOCATION) | NEGATIVE (NORMAL ALLOCATION) | NEGATIVE (NORMAL ALLOCATION) |
| | 180-DEGREE PLANE (STEP S24(180)) | NEGATIVE (NORMAL ALLOCATION) | NEGATIVE (NORMAL ALLOCATION) | AFFIRMATIVE (HOLE) | NEGATIVE (NORMAL ALLOCATION) |
| | 270-DEGREE PLANE (STEP S24(270)) | NEGATIVE (NORMAL ALLOCATION) | AFFIRMATIVE (NOTCH) | NEGATIVE (NORMAL ALLOCATION) | NEGATIVE (NORMAL ALLOCATION) |
| ALLOCATION | 90-DEGREE PLANE | NOTCH | NORMAL ALLOCATION | NORMAL ALLOCATION | NORMAL ALLOCATION |
| | 180-DEGREE PLANE | NORMAL ALLOCATION | NORMAL ALLOCATION | HOLE | NORMAL ALLOCATION |
| | 270-DEGREE PLANE | NORMAL ALLOCATION | NOTCH | NORMAL ALLOCATION | NORMAL ALLOCATION |

# LASER PROCESSING METHOD AND LASER PROCESSING PROGRAM CREATION DEVICE

TECHNICAL FIELD

The present disclosure relates to a laser processing method and a laser processing program creation device used to process an angle or a channel into a predetermined shape by using a laser beam machine.

BACKGROUND ART

A laser beam machine processes steel materials using laser beams. Steel materials are a type of metallic material. Examples of the steel materials are angles having an approximate L-shaped cross-section and channels having an approximate U-shaped cross-section.

One of the two planes of an angle is referred to as a 90-degree plane, and the other is referred to as a 180-degree plane. One of the two side planes of a channel is referred to as a 90-degree plane, and the other plane is referred to as a 270-degree plane. The plane between the 90 and 270-degree planes is referred to as a 180-degree plane.

The angle is processed in the following order: the 90-degree plane is processed first, and the 180-degree plane is then processed, for example. The channel is processed in the following order: the 90-degree plane is processed first, the 270-degree plane is then processed, and the 180-degree plane is processed last, for example.

CITATION LIST

Patent Literature

[PTL 1] Japanese Patent Laid-open Publication No. 2012-86243

SUMMARY OF THE INVENTION

Problem to be Solved by the Invention

When projecting a laser beam onto the 90, 180, and 270-degree planes of steel material in the direction of the thickest part, which is orthogonal to the respective planes, the laser beam machine is capable of normally processing each plane.

However, the laser beam machine cannot normally process the steel material when performing cut-off processing, which cuts off an end of the body of the steel material in the direction crossing the X axis. Herein, the X axis is extended in the direction of an axis about which the steel material is rotated.

The maximum thickness of steel materials that can be cut by a laser beam is about 20 mm. In the process of cut-off processing of steel material by the laser beam machine, it is sometimes necessary to project the laser beam so that the laser beam travels in a plane parallel to each plane of steel material.

When the laser beam is projected so as to travel in the plane parallel to the surface, the thickness of the steel material in the direction that the laser beam cuts the material is excessively thick, larger than the maximum thickness that can be cut. Accordingly, the steel material cannot be processed normally.

In one variation of cut-off processing, so-called cross-sectional cutting, which cuts all the planes of a steel material in the direction orthogonal to the X axis, the steel material cannot have an excessive thickness larger than the maximum thickness that can be cut unlike the above description. However, it is difficult to normally process the steel material having a plate thickness larger than a certain thickness.

Accordingly, there is a demand for a laser processing method and a laser processing program creation device which can implement normal cut-off processing of materials.

An object of the embodiments is to provide a laser processing method and a laser processing program creation device which can implement normal cut-off processing of materials.

Means for Solving the Problem

According to the first aspect, a laser processing method is provided using an angle or a channel as a material to be processed, the angle or channel being composed of a plurality of planes and having a predetermined plate thickness, and cutting the material with a laser beam in a direction intersecting an axis about which the material is rotated to form a product having a predetermined shape.

The method includes the steps of: for a development view representing the plurality of planes developed into a plane, setting an outer corner between the planes adjacent to each other as a development auxiliary line and setting ranges corresponding to plate thicknesses in the planes of the material as plate thickness regions between the development auxiliary line and a pair of plate thickness lines sandwiching the development auxiliary line; sequentially selecting each of the plurality of planes as a target plane and setting a region in an adjacent plane adjacent to the target plane as an evaluation region, the region in the adjacent plane including at least a range surrounded by the development auxiliary line and the plate thickness line located in the adjacent plane; calculating the position of the extremity of a profile of the product in the axial direction in the evaluation region; setting a first line segment in the target plane, the first line segment passing through the calculated position of the extremity and extending in the direction orthogonal to the axis; determining whether the first line segment interferes with the product; in one of the plurality of target planes where the first line segment does not interfere with the product, locating a processing area to form a notch or a hole in a region between the first line segment and the profile of the product; in the target plane where the processing area is located, allocating a trajectory for laser beam cutting to form a notch or a hole in the processing area and forming a notch or a hole in the material; and in the target plane where the processing area is not located, allocating a trajectory for laser beam cutting to cut the material along the profile of the product and cutting the material along the profile of the product.

According to the second aspect, a laser processing program creation device is provided, which creates allocation data as a laser processing program to form a product having a predetermined shape by using an angle or a channel as a material to be processed, the angle or channel being composed of a plurality of planes and having a predetermined plate thickness, and cutting the material with a laser beam in a direction intersecting an axis about which the material is rotated.

The device includes: a plate thickness region setting means configured to set an outer corner between the planes adjacent to each other as a development auxiliary line and set ranges corresponding to plate thicknesses in the planes of the material as plate thickness regions between the development auxiliary line and a pair of plate thickness lines sandwiching the development auxiliary line for a development view representing the plurality of planes developed in a plane; an evaluation region setting means configured to sequentially select each of the plurality of planes as a target plane and set a region in an adjacent plane adjacent to the target plane as an evaluation region, the region in the adjacent plane including at least a range surrounded by the development auxiliary line and the plate thickness line located in the adjacent plane; a position calculation means configured to calculate the position of the extremity of the profile of the product in the axial direction in the evaluation region; a line segment setting means configured to set a first line segment in the target plane, the first line segment passing through the calculated position of the extremity and extending in the direction orthogonal to the axis; a determination means configured to determine whether the first line segment interferes with the product; a processing area setting means configured to locate a processing area to forma notch or a hole in a region between the first line segment and the profile of the product in one of the plurality of target planes where the first line segment does not interfere with the product; and an allocation data creation means configured to create allocation data to, in the target plane where the processing area is located, allocate a trajectory for laser beam cutting to form a notch or a hole in the processing area and to, in the target plane where the processing area is not located, allocate a trajectory for laser beam cutting to cut the material along the profile of the product.

Effect of the Invention

According to the laser processing method and laser processing program creation device of the embodiments, it is possible to normally perform even cut-off processing of materials.

BRIEF DESCRIPTION OF THE DRAWINGS

FIG. 6 is a diagram for explaining a first example of channel product shapes that cannot be normally formed by the conventional method.

FIG. 7 is a diagram for explaining a second example of channel product shapes that cannot be normally formed by the conventional method.

FIG. 8 is a diagram for explaining a third example of channel product shapes that cannot be normally formed by the conventional method.

FIG. 9 is a diagram for explaining an example of channel product shapes that are difficult to form by the conventional method.

FIG. 10 is a diagram for schematically explaining a solution to the conventional problems.

FIG. 12 is a diagram for schematically explaining a solution to the conventional problems.

FIG. 13 is a diagram illustrating an angle product having a predetermined shape and showing a conceptual development view thereof.

FIG. 14 is a diagram for explaining a method of, to produce the product illustrated in FIG. 13, setting a notch region in the 180-degree plane for the left profile line of a development view of the product.

FIG. 15 is a diagram for explaining a preferable way of setting a length L1 in FIG. 14 and the like.

FIG. 16 is a diagram for explaining a method of, to produce the product illustrated in FIG. 13, determining whether to set a notch region in the 90-degree plane for the right profile line of the development view of the product.

FIG. 17 is a diagram for explaining a method of, to produce the product illustrated in FIG. 13, determining whether to set a notch region in the 180-degree plane for the right profile line of the development view of the product.

FIG. 18 is a diagram for explaining a method of, to produce the product illustrated in FIG. 13, determining whether to set a notch region in the 90-degree plane for the right profile line of the development view of the product.

FIG. 20 is a view illustrating a channel product having a certain shape and showing the conceptual development view thereof.

FIG. 21 is a view for explaining a method of, to produce the product illustrated in FIG. 20, determining whether to set a hole region in the 180-degree plane for the left profile line of the development view of the product.

FIG. 22 is a diagram for explaining a method of, to produce the product illustrated in FIG. 20, determining whether to set a notch region in the 90-degree plane for the left profile line of the development view of the product.

FIG. 23 is a diagram for explaining a method of, to produce the product illustrated in FIG. 20, determining whether to set a notch region in the 270-degree plane for the left profile line of the development view of the product.

FIG. 24 is a diagram for explaining a method of, to produce the product illustrated in FIG. 20, determining whether to set a hole region in the 180-degree plane for the right profile line of the development view of the product.

FIG. 25 is a diagram for explaining a method of, to produce the product illustrated in FIG. 20, determining whether to set a notch region in the 90-degree plane for the right profile line in the development view of the product.

FIG. 26 is a diagram for explaining a method of, to produce the product illustrated in FIG. 20, determining whether to set a notch region in the 270-degree plane for the right profile line of the development view of the product.

FIG. 28 is a diagram for explaining a method of, to cross-sectionally cut an angle into a product, setting notch regions in the 180-degree plane for the right and left profile lines.

FIG. 29 is a diagram for explaining a method of, to cross-sectionally cut an angle into a product, setting notch regions in the 90-degree plane for the right and left profile lines.

FIG. 31 is a diagram for explaining a method of, to cross-sectionally cut an angle into a product, setting hole regions in the 180-degree plane for the right and left profile lines in the development view of the product.

FIG. 32 is a diagram for explaining a method of, to cross-sectionally cut an angle into a product, setting notch regions in the 90-degree plane for the right and left profile lines in the development view of the product.

FIG. 33 is a diagram for explaining a method of, to cross-sectionally cut an angle into a product, setting notch regions in the 270-degree plane for the right and left profile lines of the development view of the product.

FIG. 35 shows development views of a product obtained by processing an angle, illustrating a processing order in the case where a notch is allocated in one of the 90- and 180-degree planes and a cut along the product profile is allocated in the other plane.

FIG. 36 shows development views of a product obtained by processing an angle, illustrating change of allocation and processing order in the case where notches are allocated in the 90 and 180-degree planes and any allocation is not provided in the plate-thickness region.

FIG. 37 shows development views of a product obtained by cross-sectionally cutting an angle, illustrating change of allocation and processing order in the case where notches are allocated in the 90 and 180-degree planes and any allocation is not provided in the plate-thickness region.

FIG. 38 shows development views of a product obtained by processing a channel, illustrating a processing order in the case where a hole is allocated along one of the profiles in the 180-degree plane and a notch is allocated along the other outline in each of the 90 and 270-degree planes.

FIG. 39 shows development views of a product obtained by processing a channel, illustrating change and modification of allocation and processing order in the case where holes are allocated in the 180-degree plane, a notch is allocated in each of the 90 and 180-degree planes, and any allocation is not provided in the plate thickness region between the holes and corresponding notches.

FIG. 40 shows development views of a product obtained by processing a channel, illustrating change of allocation and processing order in the case where holes are allocated in the 180-degree plane, a notch is allocated in each of the 90 and 270-degree planes, and any allocation is not provided in the plate thickness regions between the holes and corresponding notches.

FIG. 41 shows development views of a product obtained by cross-sectionally cutting a channel, illustrating change of allocation and processing order in the case where holes are allocated in the 180-degree plane, a notch is allocated in each of the 90 and 270-degree planes, and any allocation is not provided in the plate thickness regions between the holes and corresponding notches.

FIG. 42 is a diagram illustrating some patterns of the allocation and processing order when the steel material is an angle.

FIG. 50 is a flowchart showing a specific process of step S27 of FIG. 45.

FIG. 51 is a table showing classification of the cases where the steel material is an angle.

FIG. 52 is a table showing classification of the cases where the steel material is a channel.

MODES FOR CARRYING OUT THE INVENTION

Hereinafter, a description is given of a laser processing method and a laser processing program creation device in at least one embodiment with reference to the accompanying drawings. A steel material to be processed in at least one embodiment is an angle or a channel. The angle may be either an equal angle or unequal angle.

Figure 1:
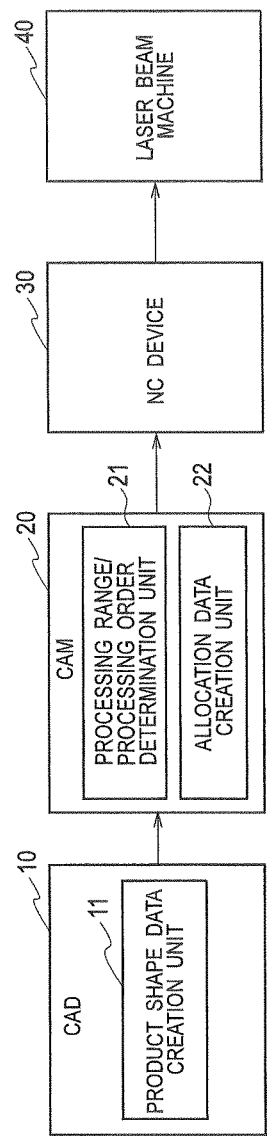
FIG. 1 is a block diagram illustrating the entire configuration of a laser processing system.

First, using a laser processing system illustrated in FIG. 1, a description is given of the entire flow to process steel material into a product having a predetermined shape. A CAD 10 creates shape data of a product which is to be produced by processing steel material and holds the same in a recording medium. That is, the CAD 10 includes a product shape data creation unit 11.

The CAD 10 is capable of creating the product shape data as a three-dimensional (3D) CAD model. The CAD 10 executes a computer program to implement the function of the product shape data creation unit 11.

The product shape data created by the CAD 10 (product shape data creation unit 11) is inputted to a CAM 20. Based on the product shape data, the CAM 20 creates development view data representing an angle or channel developed into a plane. The development view data is described later. Based on the development view data, the CAM 20 determines a processing range and a processing order to process the steel material into a product shape represented by the product shape data.

That is, the CAM 20 includes a processing range/processing order determination unit 21. The CAM 20 executes a computer program to implement the function of the processing range/processing order determination unit 21.

When determining the processing range and processing order for the steel material, the CAM 20 creates allocation data representing allocations showing how to process the steel material with a laser beam. The processing allocations include trajectories of laser beam processing. The allocation data includes information about the order of a plurality of allocations.

That is, the CAM 20 includes an allocation data creation unit 22. Similarly, the CAM 20 executes a computer program to implement the function of the allocation data creation unit 22.

The CAD 10 and CAM 20 may be either separately configured as illustrated in FIG. 1 or integrally configured.

The CAM 20 creates a processing program to process the steel material based on the allocation data. The processing program is NC data as a code for controlling a machine. The CAM 20 constitutes the laser processing program creation device of at least one embodiment. The CAM 20 transfers the created processing program to an NC device 30. The NC device 30 controls processing of the steel material by a laser beam machine 40 based on the processing program.

Figure 2:
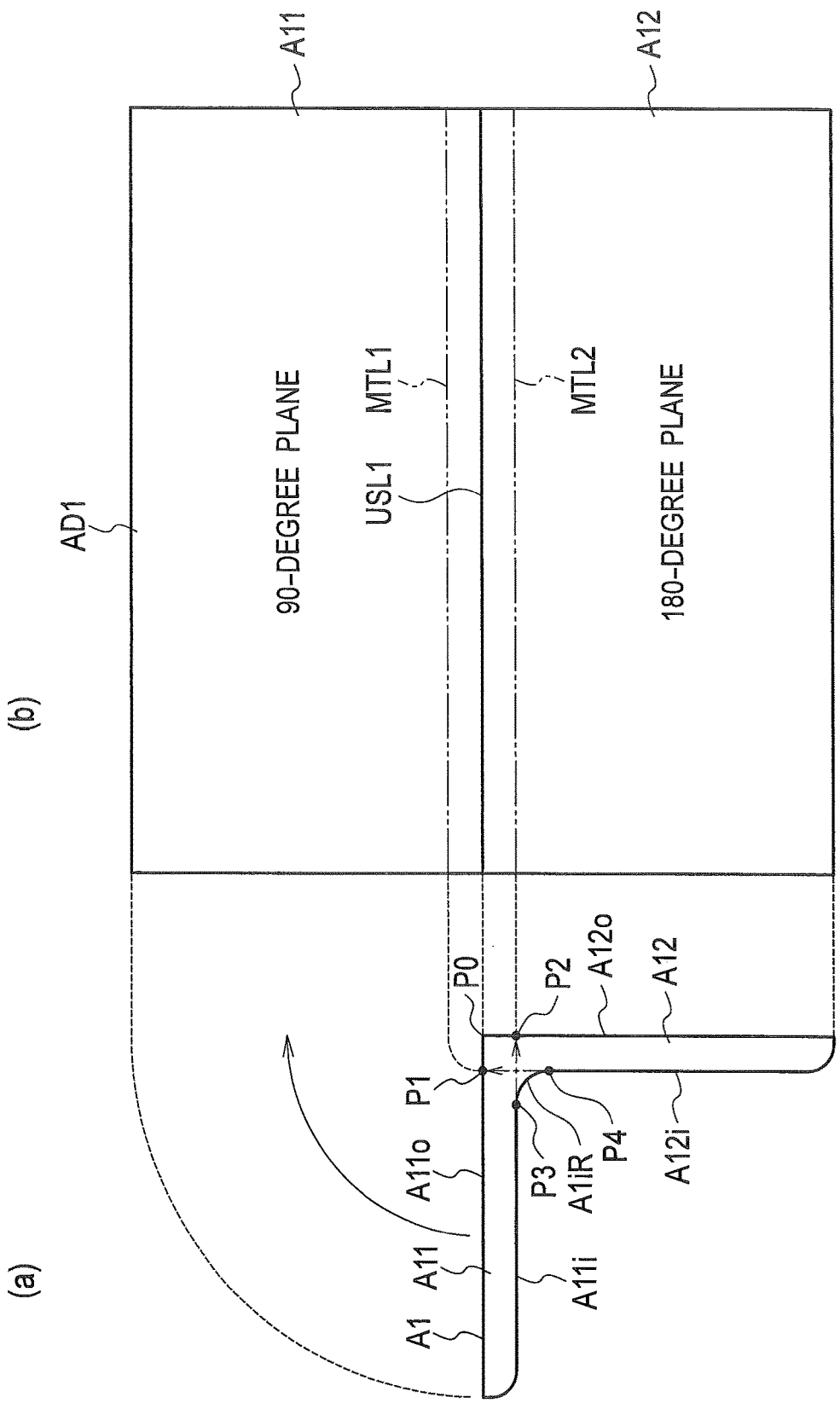
FIG. 2 illustrates an end-face plan view and a development view of an angle used in at least one embodiment.

The development view data created by the CAM 20 is described below using FIGS. 2 and 3. In FIG. 2, (a) shows an end-face plan view of an angle A1, and (b) shows a development view AD1 of the angle A1. The angle A1 includes a flange A11 extending horizontally in (a) of FIG. 2, and a web A12 extending vertically in (a) of FIG. 2, which are joined at approximate right angles to form an approximate L shape. In such a manner, one plane of the angle A1 is referred to as a web, and the other plane is referred to as a flange.

The inner corner of the angle A1 forms a curve section A1iR called an inner R. An outer corner P0 of the angle A1 is referred to as a development auxiliary line USL1 in the development view AD1. The perpendicular to an outer surface A11o of the flange A11 from a connecting portion P4, which connects an inner surface A12i of the web A12 and the curve section A1iR, intersects with the outer surface A11o in an intersection P1. The intersection P1 is referred to as a plate thickness line MTL1 in the development view AD1.

The perpendicular to an outer surface A12o of the web A12 from a connecting portion P3, which connects an inner surface A11i of the flange A11 and the curve section A1iR, intersects with the outer surface A12o in an intersection P2. The intersection P2 is referred to as a plate thickness line MTL2 in the development view AD1.

The sections between the development auxiliary line USL1 and plate thickness line MTL1 and between the development auxiliary line USL1 and plate thickness line MTL2 constitute a plate thickness region of the angle A1. The distance between the development auxiliary line USL1 and plate thickness line MTL1 is determined by the thickness of the web A12. The distance between the development auxiliary line USL1 and plate thickness line MTL2 is determined by the thickness of the flange A11.

The section corresponding to the flange A11 in the development view AD1 is referred to as a 90-degree plane (a first plane), and the section corresponding to the web A12 is referred to as a 180-degree plane (a second plane). The plate thickness region between the plate thickness lines MTL1 and MTL2 extends across the 90 and 180-degree planes.

Figure 3:
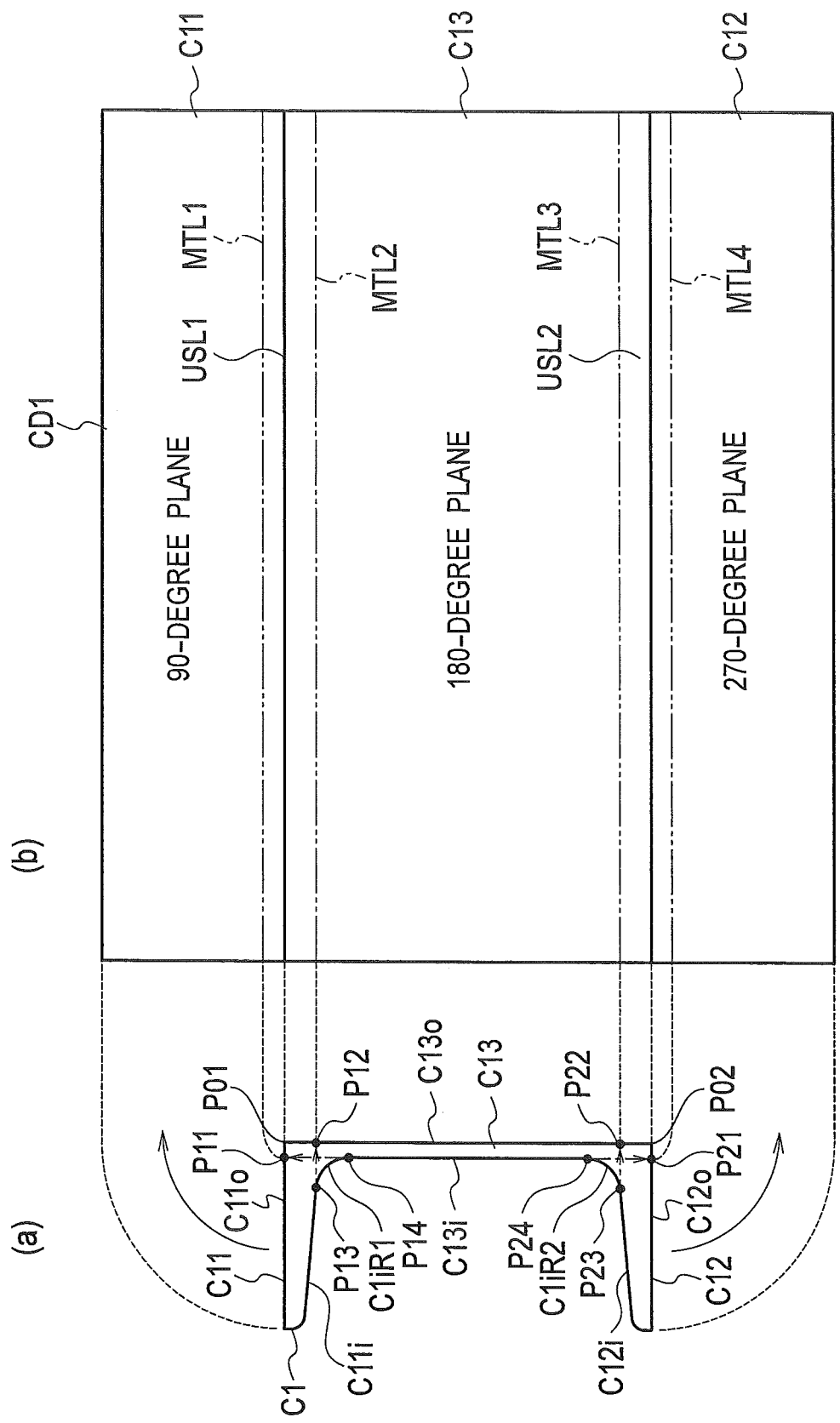
FIG. 3 illustrates an end-face plan view and a development view of a channel used in at least one embodiment.

In FIG. 3, (a) shows an end-face plan view of a channel C1, and (b) shows a development view CD1 of the channel C1. The channel C1 includes flanges C11 and C12 extending horizontally in (a) of FIG. 3, and a web C13 which are joined to form an approximate U-shape. Each of the inner surfaces C11i and C12i of the flanges C11 and C12 has a predetermined taper angle to the surface of the web C13.

The inner corner between the inner surface C11i of the flange C11 and an inner surface C13i of the web C13 forms a curve section C1iR1 of the inner R. The inner corner between inner surface C12i of the flange C12 and the inner surface C13i of the web C13 forms a curve section C1iR2 of the inner R.

One outer corner P01 of the channel C1 is referred to as a development auxiliary line USL1 in the development view CD1. The other outer corner P02 of the channel C1 is referred to as a development auxiliary line USL2 in the development view CD1.

The perpendicular to the outer surface C11o of the flange C11 from a connecting portion P14, which connects the inner surface C13i of the web C13 and the curve section C1iR1, intersects with the outer surface C11o in an intersection P11. The intersection P11 is referred to as a plate thickness line MTL1 in the development view CD1.

The perpendicular to an outer surface C13o of the web C13 from a connecting portion P13, which connects the inner surface C11i of the flange C11 and the curve section C1iR1, intersects with the outer surface C13o in intersection P12. The intersection P12 is referred to as a plate thickness line MTL2 in the development view CD1.

The perpendicular to an outer surface C12o of the flange C12 from a connecting portion P24, which connects the inner surface C13i of the web C13 and the curve section C1iR2, intersects with the outer surface C12o in an intersection P21. The intersection P21 is referred to as a plate thickness line MTL4 in the development view CD1.

The perpendicular to the outer surface C13o of the web C13 from a connecting portion P23, which connects the inner surface C12i of the flange C12 and the curve section C1iR2, intersects with the outer surface C13o in an intersection P22. The intersection P22 is referred to as a plate thickness line MTL3 in the development view CD1.

The section between the development auxiliary line USL1 and plate thickness line MTL1, the section between the development auxiliary line USL2 and plate thickness line MTL3, the section between the development auxiliary line USL2 and plate thickness line MTL3, and the section between the development auxiliary line USL2 and plate thickness line MTL4 constitute plate thickness regions of the channel C1.

The distance between the development auxiliary line USL1 and plate thickness line MTL1 and the distance between the development auxiliary line USL2 and plate thickness line MTL4 are determined by the plate thickness of the web C13. The distance between the development auxiliary line USL1 and plate thickness line MTL2 is determined by the plate thickness of the flange C11, and the distance between the development auxiliary line USL2 and plate thickness line MTL3 is determined by the plate thickness of the flange C12.

The portions corresponding to the flange C11, web C13, and flange C12 in the development view CD1 are referred to as a 90-degree plane (a first plane), a 180-degree plane (a second plane), and a 270-degree plane (a third plane), respectively. The plate thickness region between the plate thickness lines MTL1 and MTL2 extends across the 90 and 180-degree planes. The plate thickness region between the plate thickness lines MTL3 and MTL4 extends across the 180 and 270-degree planes.

Figure 4:
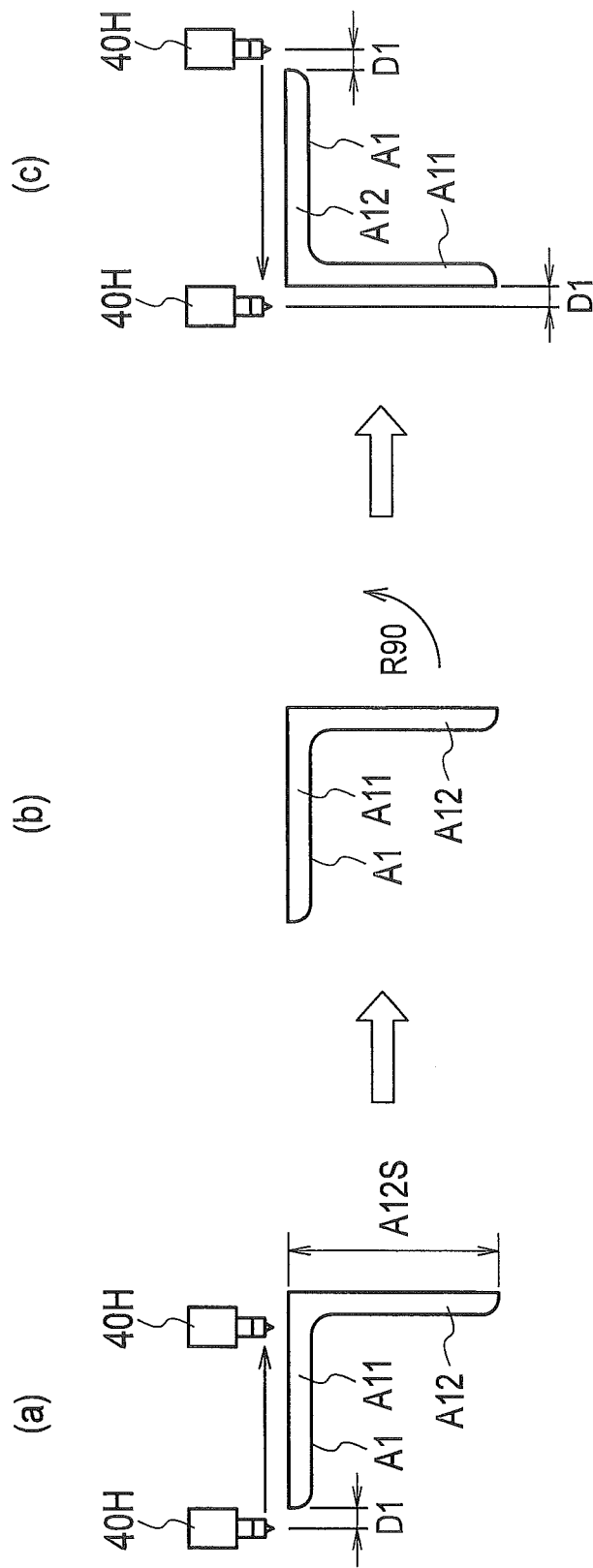
FIG. 4 is a diagram illustrating a normal order of angle processing on a plane-by-plane basis.

FIG. 4 illustrates a normal processing order of the planes of the angle A1. The processing order illustrated in FIG. 4 is a basic order at processing the angle A1.

The laser beam machine 40 processes the flange A11 corresponding to the 90-degree plane as illustrated in (a) of FIG. 4. In this process, the laser beam machine 40 locates a head 40H a predetermined margin D1 short of the flange A11 (in the left side of FIG. 4) to start projecting a laser beam.

The laser beam machine 40 then moves the head 40H toward the web A12 as indicated by an arrow. The laser beam machine 40 processes the 90-degree plane, leaving a section corresponding to a plate thickness of the web A12 (the 180-degree plane).

If the head 40H moves over the web 12 as projecting a laser beam in parallel to the surface of the web A12 so that the laser beam travels in a plane, a range A12S indicated by a double-headed arrow cannot be processed normally because the range A12S has an excessive thickness larger than the maximum thickness that can be cut by the laser.

As illustrated in (b) of FIG. 4, the laser beam machine 40 once retracts the head 40H and rotates the angle A1 by 90 degrees as indicated by an arrow R90. The angle A1 rotated by 90 degrees is illustrated in (c) of FIG. 4.

As illustrated in (c) of FIG. 4, the laser beam machine 40 processes the 180-degree plane. In this process, the laser beam machine 40 locates the head 40H the predetermined margin D1 short of the web A12 (in the right side of FIG. 4) to start projecting a laser beam. The laser beam machine 40H then moves the head 40 toward the flange A11 as indicated by an arrow. The laser beam machine 40 causes the head 40H to project the laser beam as the head 40H moves to the margin D1 beyond the flange 11.

The margin D1 which is provided short of the web A12 (on the right side of FIG. 4) does not need to be equal to the margin D1 on the other side that the head 40H moves after passing over the flange A11 (on the left side of FIG. 4).

In the basic processing order of the planes for processing the angle A1 with the laser beam machine 40, the 90-degree plane is processed first, followed by the 180-degree plane.

Figure 5:
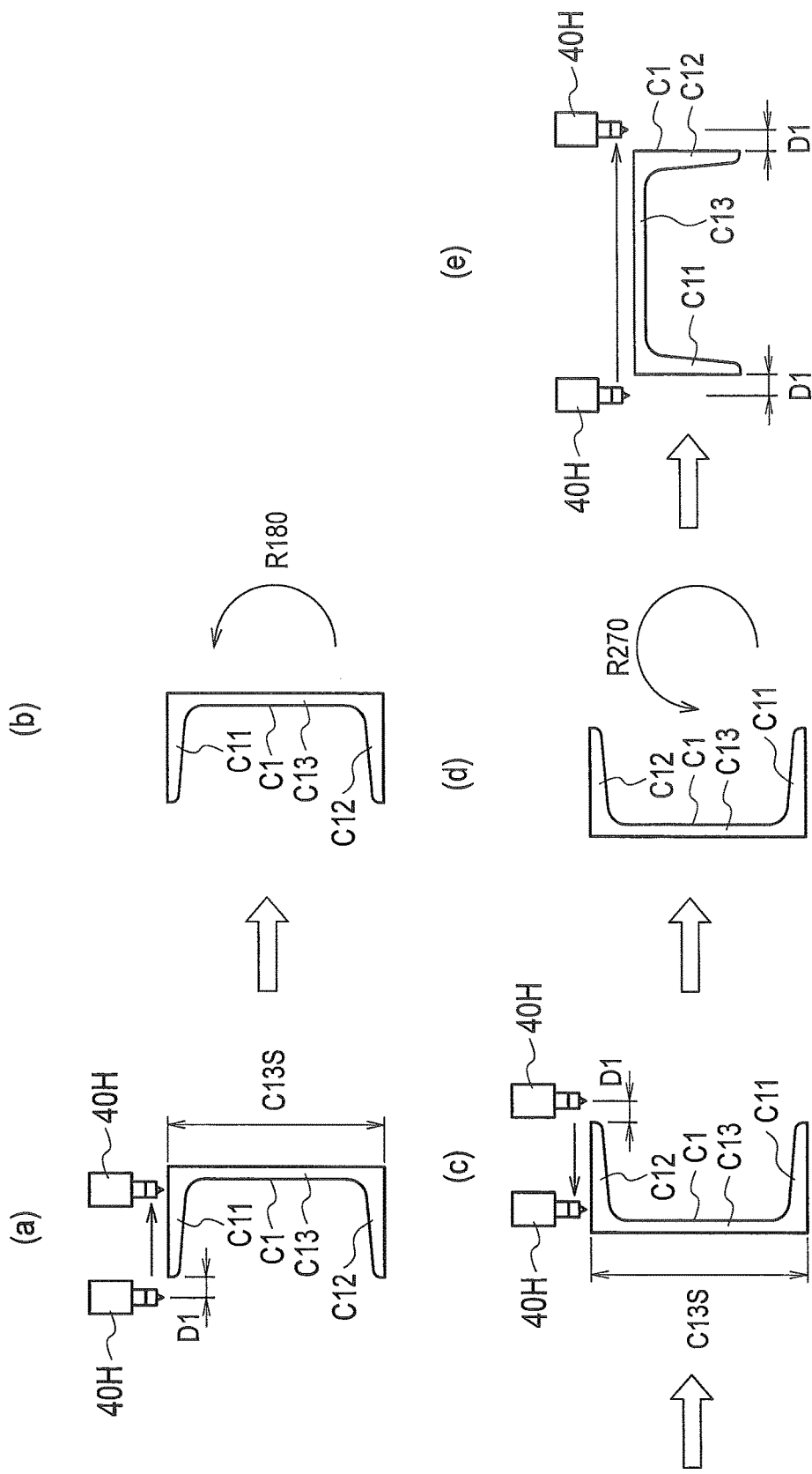
FIG. 5 is a diagram illustrating a normal order of channel processing on a plane-by-plane basis.

FIG. 5 illustrates a processing order of the planes of the channel C1. As illustrated in (a) of FIG. 5, the laser beam machine 40 first processes the flange C11 corresponding to the 90-degree plane. In this process, the laser beam machine 40 locates the head 40H the predetermined margin D1 short of the flange C11 (on the left side in FIG. 5) to start projecting a laser beam. The laser beam machine 40 then moves the head 40H toward the web C13 as indicated by an arrow. The laser beam machine 40 processes the 90-degree plane, leaving a section corresponding to a plate thickness of the web C13 (the 180-degree plane).

If the head 40H moves over the web C13 as projecting a laser beam in parallel to the surface of the web C13 so that the laser beam travels along a plane, a range C13S indicated by a double-headed arrow cannot be normally processed because the range C13S has an excessive thickness larger than the maximum thickness that can be cut by the laser beam.

As illustrated in (b) of FIG. 5, the laser beam machine 40 once retracts the head 40H and rotates the channel C1 by 180 degrees as indicated by an arrow R180. The channel C1 rotated by 180 degrees is illustrated in (c) of FIG. 5.

As illustrated in (c) of FIG. 5, the laser beam machine 40 processes the flange C12 corresponding to the 270-degree plane. In this process, the laser beam machine 40 locates the head 40H the predetermined margin D1 short of the flange C12 (on the right side of FIG. 5) to start projecting a laser beam. The laser beam machine 40 then moves the head 40 toward the web C13 as indicated by an arrow. The laser beam machine 40 processes the 270-degree plane, leaving a section corresponding to the plate thickness of the 180-degree plane.

If the head 40H moves over the web C13 as projecting a laser beam in parallel to the surface of the web 013 so that the laser beam travels along a plane, similarly to (a) of FIG. 5, a range C13S indicated by a double-headed arrow cannot be processed normally because the range C13S has an excessive thickness larger than the maximum thickness that can be cut by the laser beam.

As illustrated in (d) of FIG. 5, the laser beam machine 40 once retracts the head 40H and rotates the channel C1 by 270 degrees as indicated by an arrow R270. The channel C1 rotated by 270 degrees is illustrated in (e) of FIG. 5.

As illustrated in (e) of FIG. 5, the laser beam machine 40 processes the 180-degree plane. In this process, the laser beam machine 40 locates the head 40H the predetermined margin D1 short (on the left side of FIG. 5) of the edge of the web C13 on the flange C11 side to start projecting a laser beam. The laser beam machine 40 then moves the head 40H toward the flange C12 as indicated by an arrow. The laser beam machine 40 causes the head 40H to project the laser beam as the head 40H moves the margin D1 beyond the flange 11.

The margin D1 provided short of the edge of the web C13 on the flange C11 side (on the left side in FIG. 5) does not need to be equal to the margin D1 on the other side that the head 40H moves after passing over the flange A11 (on the right side in FIG. 5).

The basic processing order of the planes for processing the channel C1 by the laser beam machine 40 is as follows: the 90-degree plane, the 270-degree plane, and then the 180-degree plane.

A description is given of examples of cut-off processing using FIGS. 6 to 9. At cut-off processing of a steel material into a product having a certain shape by the laser beam machine 40, some portions are thicker than the maximum thickness that can be cut by the laser beam. The steel material therefore cannot be processed normally with the conventional method. FIGS. 6 to 9 illustrate examples of products obtained by processing the channel C1.

To produce a product C51 having a cutting shape S51 illustrated in (a) of FIG. 6, as illustrated in (b) of FIG. 6, a trajectory Ls11 for laser beam processing is allocated in the flange C11 of the channel C1, and then a trajectory Ls12 for laser beam processing is allocated in the flange C12. Eventually, a trajectory Ls13 for laser beam processing is allocated in the web C13.

However, as illustrated in (c) of FIG. 6, the sections indicated by Exth are included in the plate thickness regions between the development auxiliary line USL1 and plate thickness line MTL2 and between the development auxiliary line USL2 and plate thickness line MTL3. The sections indicated by Exth have excessive thickness larger than the maximum thickness that can be cut by the laser beam. Accordingly, the channel C1 cannot be normally processed.

To produce a product C52 having a cutting shape S52 illustrated in (a) of FIG. 7, as illustrated in (b) of FIG. 7, a trajectory Ls21 for laser beam processing is allocated in the flange C11 of the channel C1, and then a trajectory Ls22 for laser beam processing is allocated in the flange C12. Eventually, a trajectory Ls23 for laser beam processing is allocated in the web C13.

Also in (b) of FIG. 7, it is necessary to process the plate thickness regions. If the channel C1 is processed as illustrated in (b) of FIG. 7, slits are formed in the flanges C11 and C12 as illustrated in (c) of FIG. 7, and the channel C1 cannot be normally processed.

To produce a product C53 having a cutting shape S53 illustrated in (a) of FIG. 8, as illustrated in (b) of FIG. 8, a trajectory Ls31 for laser beam processing is allocated in the flange C11 of the channel C1, and then a trajectory Ls32 for laser beam processing is allocated in the flange C12. Eventually, a trajectory Ls33 for laser beam processing is allocated in the web C13. The sections indicated by Exth have excessive thickness larger than the maximum thickness that can be cut by the laser beam and cannot be processed normally.

FIG. 9 illustrates an example of cross-sectional cutting that cuts the channel C1 in the direction orthogonal to the X axis. It is difficult for cross-sectional cutting to normally process steel materials having a plate thickness larger than a predetermine thickness even when the steel materials do not have portions of excessive thickness larger than the maximum thickness that can be cut by the laser beam. To cut the channel C1 into a product C54 having a cutting shape S54 (illustrated in (a) of FIG. 9), the channel C1 is cross-sectionally cut in the direction orthogonal to the X axis as illustrated in (b) of FIG. 9.

To be specific, to produce the product C54, as illustrated in (b) of FIG. 9, a trajectory Ls41 for laser beam processing is allocated in the flange C11, and then a trajectory Ls42 for laser beam processing is allocated in the flange C12. Eventually, a trajectory Ls43 for laser beam processing is allocated in the web C13. When the plate thickness of the flange C11 or 012 or web C13 is thicker than a predetermined thickness, dross of the material cut by the laser beam makes it difficult to implement normal processing.

In FIGS. 6 to 9, the examples of the cases where normal processing is not performed or difficult are described using the channel C1. Similarly, normal processing is not performed or difficult sometimes at processing the angle A1.

Figure 11:
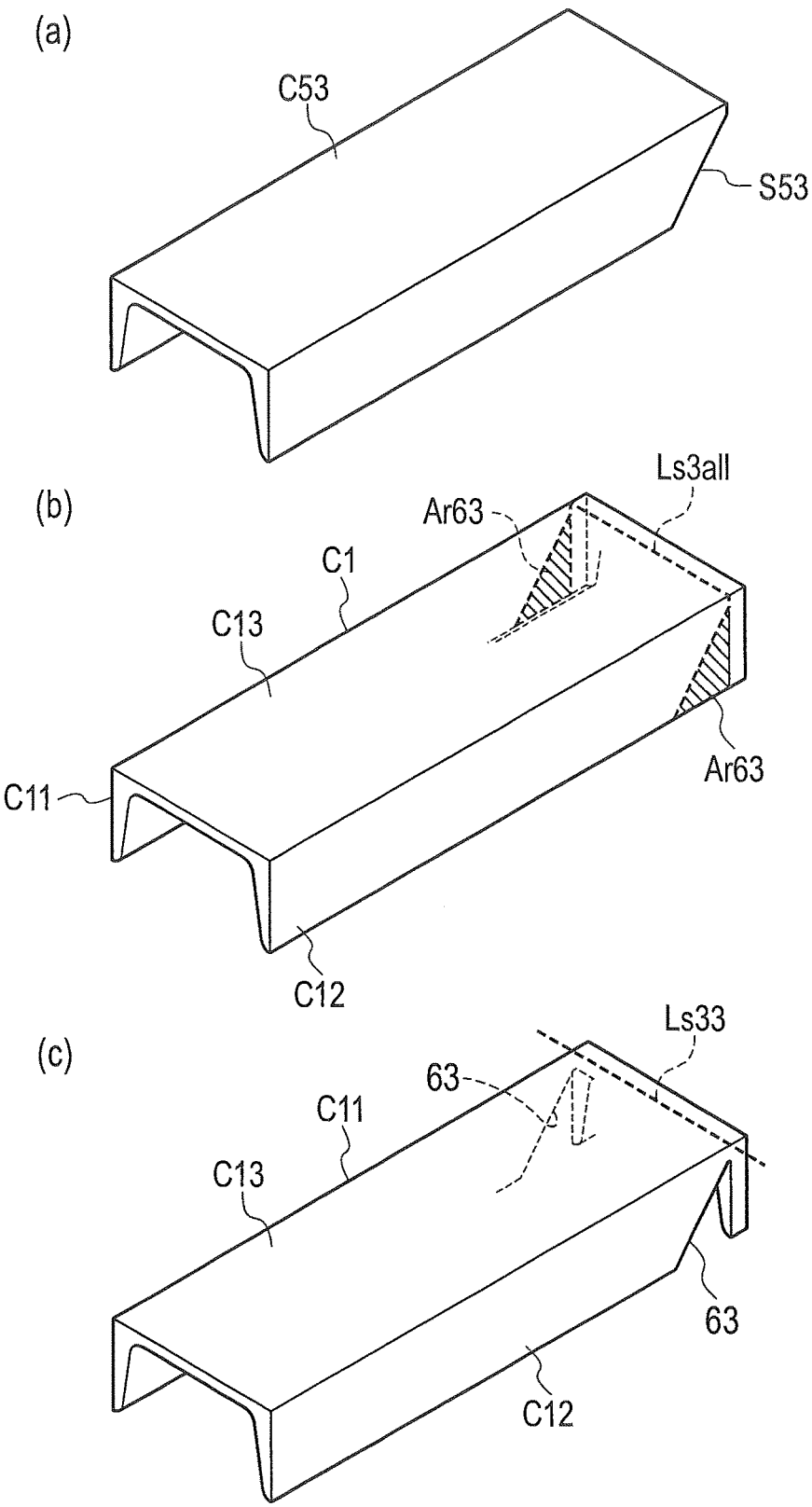
FIG. 11 is a diagram for schematically explaining a solution to the conventional problems.

Using FIGS. 10 to 12, a description is given of a schematic solution to the problem of normal processing not being performed or difficult with the conventional method described in FIGS. 6 to 9. FIGS. 10 to 12 also show examples of processing of the channel C1.

A product C55 illustrated in (a) of FIG. 10 has such a shape that the front end thereof has the same cutting shape S52 as the product C52 illustrated in FIG. 7 and the rear end has the same cutting shape S51 as the product C51 of FIG. 6.

To produce the product C55, as illustrated in (b) of FIG. 10, the front end of the channel C1 is cut along the trajectory Ls2a11, and the rear end is cut along a trajectory Ls1a11. The trajectory Ls1a11 corresponds to the trajectories Ls11 to Ls13 of FIG. 6 joined to each other, and the trajectory Ls2a11 corresponds to the trajectories Ls21 to Ls23 of FIG. 7 joined to each other. However, the channel C1 cannot be directly processed normally.

To implement normal processing, as illustrated in (b) of FIG. 10, for the cutting shape S52, the laser beam machine 40 previously forms a hole connected to the trajectory Ls2a11 in a processing area Ar61 indicated by hatching in the web C13. For the cutting shape S51, the laser beam machine 40 previously forms notches connected to the trajectory Ls1a11 in processing areas Ar62 indicated by hatching in the respective flanges C11 and C12.

The CAM 20 creates allocation data so that the laser beam machine 40 forms holes and notches first.

(c) of FIG. 10 shows a state where a hole 61 is formed in the processing area Ar61 by the laser beam machine 40. When the hole 61 is formed first, the laser beam machine 40 can normally produce the cutting shape S52 by allocating the trajectory Ls21 for laser beam processing in the flange C11 and allocating the trajectory Ls22 for laser beam processing in the flange C12.

(d) of FIG. 10 shows a state where notches 62 are formed in the processing areas Ar62 by the laser beam machine 40. When the notches 62 are formed first, the laser beam machine 40 can normally produce the cutting shape S51 by allocating the trajectory Ls13 for laser beam processing in the web C13.

The product C53 having a cutting shape S53 illustrated in (a) of FIG. 11 is the same as the product C53 illustrated in (a) of FIG. 8. To produce the product C53, the rear end of the channel C1 is cut along a trajectory Ls3a11 as illustrated in (b) of FIG. 11. The trajectory Ls3a11 corresponds to the trajectories Ls31 to Ls33 of FIG. 8 joined to each other. However, the channel C1 cannot be directly processed normally.

To implement normal processing, as illustrated in (b) of FIG. 11, the laser beam machine 40 previously forms notches connected to the trajectory Ls3a11 in triangular processing areas Ar63 indicated by hatching in the flanges C11 and C12. The CAM 20 generates allocation data so that the laser beam machine 40 first forms the notches.

(c) of FIG. 11 illustrates a state where the notches 63 are formed in the triangular processing areas Ar63 by the laser beam machine 40. When the notches 63 are formed first, the laser beam machine 40 can normally produce the cutting shape 53 by allocating the trajectory Ls33 for laser beam processing in the web C13.

The product C54 having the cutting shape S54 illustrated in (a) of FIG. 12 is the same as the product C54 illustrated in (a) of FIG. 9. However, in the product C54 illustrated in (a) of FIG. 12, both of the front and rear ends have the cutting shape S54.

To produce the product C54, each of the front and rear ends of the channel C1 is cut along a trajectory Ls4a11 as illustrated in (b) of FIG. 12. The trajectory Ls4a11 corresponds to the trajectories Ls41 to Ls43 of FIG. 9 joined to each other. However, it is sometimes difficult to normally process the channel C1 depending on the plate thickness thereof.

To facilitate normal processing, as illustrated in (b) of FIG. 12, the laser beam machine 40 first forms notches connected to the trajectory Ls4a11 in processing areas Ar62 indicated by hatching in the flanges C11 and C12.

(c) of FIG. 12 illustrates a state where the notches 62 are formed in the processing areas Ar62 at the front end by the laser beam machine 40. (d) of FIG. 12 illustrates a state where the notches 62 are formed in the processing areas Ar62 at the rear end. When the notches 62 are formed first, the laser beam machine 40 can easily produce the cutting shapes S54 by allocating the trajectories Ls43 for laser beam processing in the web C13.

As apparent from the above description, the CAM 20 modifies the basic processing order described in FIG. 5 before the laser beam machine 40 processes each plane of the angle A1 or channel C1. To realize normal processing, the processing range/processing order determination unit 21 determines the processing order so that normal allocation along the product outline and allocation for forming the hole 61 or notches 62, 63 are performed in a proper order.

The allocation data creation unit 22 creates allocation data based on the processing range and processing order determined by the processing range/processing order determination unit 21. The laser beam machine 40 processes the angle A1 or the channel C1 based on the allocation data created by the allocation data creation unit 22.

Next, a description is given of specific methods of forming the holes 61 and notches 62, 63. First, the method of forming the notches 62 (or 63) in the angle A1 is described by using the case of producing the product A51 having the shape illustrated in (a) of FIG. 13 as an example.

The angle A1 is composed of two planes including the 90 and 180-degree planes. Accordingly, the hole 61 is not formed, and only the notches 62 and 63 are formed. Whether to form the rectangular notches 62 or triangular notches 63 depends on the product shape. For the product A51 having the shape illustrated in (a) of FIG. 13, the rectangular notches 62 are formed.

(b) of FIG. 13 shows a conceptual development view represented by development view data created based on the product A51 by the CAM 20. In (b) of FIG. 13, the development view AD51 of the product A51 is allocated in the development view AD1 of the angle Al unprocessed. The right side of the angle A1 on the X axis is chucked by the laser beam machine 40, and the left side corresponds to the top of the angle A1. The direction orthogonal to the X axis is referred to as the Y axis. The left profile line of the development view AD51 is indicated by A51L, and the right profile line is indicated by A51 R.

As illustrated in (a) of FIG. 14, the CAM 20 (the processing range/processing order determination unit 21) sets an extended auxiliary line EAL1 in the 90-degree plane. The extended auxiliary line EAL1 extends at a predetermined distance L1 from the plate thickness line MTL1 toward the side edge (the upper edge of (a) of FIG. 14) of the 90-degree plane. The CAM 20 sets the region between the development auxiliary line USL1 and extended auxiliary line EAL1 as an evaluation region Re90 of the 90-degree plane.

The CAM 20 calculates a point Pxmin at which the left profile line A51L has a minimum value Xmin on the X axis within the evaluation region Re90. The value of the X axis decreases to the left in FIG. 14 and increases to the right. The direction to the left on the X axis is referred to as an −X direction and the direction to the right is referred to as a +X direction.

Subsequently, as illustrated in (b) of FIG. 14, the CAM 20 sets a line segment 71L at the same position as the point Pxmin on the X axis in the 180-degree plane. The line segment 71L extends from the side edge (the lower edge of (b) of FIG. 14) of the 180-degree plane to a predetermined distance L2 away from the plate thickness line MTL2. The CAM 20 determines whether the line segment 71L interferes with the development view AD51.

The CAM 20 determines that the line segment 71L does not interfere with the development view AD51, which means that the notch 62 can be formed in the 180-degree plane. The CAM 20 sets a line segment 71Lv extending in the +X direction from the end of the line segment 71L on the plate thickness line MTL2 side to the left profile line A51L as indicated by a dashed arrow.

The CAM 20 sets the processing area Ar62 (indicated by hatching) surrounded by the line segments 71L and 71Lv set in (b) of FIG. 14 and the left profile line A51L as a notch region to forma notch from the side edge of the 180-degree plane toward the 90-degree plane as illustrated in (c) of FIG. 14.

It is therefore understood that the CAM 20 sets the evaluation region Re90 of the 90-degree plane illustrated in (a) of FIG. 14 for the purpose of determining whether to set the processing area Ar62 as the notch region in the 180-degree plane. In FIG. 14, the 180-degree plane is the target plane in which it is determined whether to set the processing area Ar62. When the 180-degree plane is the target plane, the evaluation region is set in the 90-degree plane, which is adjacent to the target plane.

Preferably, the distance L1 is set in accordance with the radius of the curve section A1iR of the inner corner of the angle A1. It is preferable that the larger the radius of the curve section A1iR, the longer the distance L1. The distance L2 is just set to a predetermined distance like 2 mm, for example.

Figure 15:
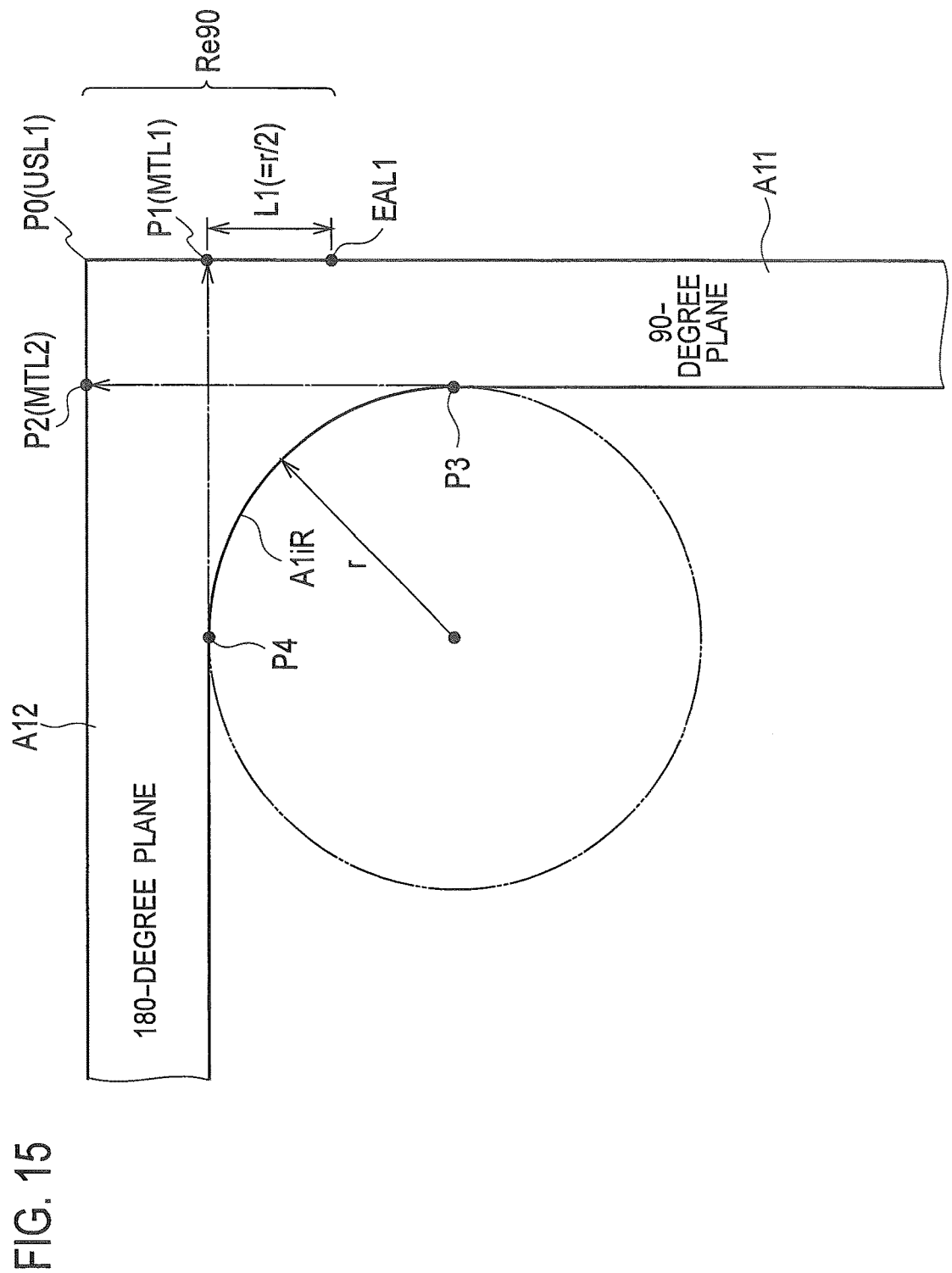

The preferable way of setting the distance L1 is described using FIG. 15. FIG. 15 is an enlarged view of a part around the curve section A1iR, where the web A12 (the 180-degree plane) extends in the horizontal direction while the flange A11 (the 90-degree plane) extends in the vertical direction. The curve section A1iR is assumed to be a quarter arcs having a radius r.

As described above, the section between the development auxiliary line USL1 and plate thickness line MTL1 and the section between the development auxiliary line USL1 and the plate thickness line MTL2 are the plate thickness regions. However, because of the curve section A1iR, certain portions outside the plate thickness lines MTL1 and MTL2 are thicker than the plate thicknesses of the flange A11 and web A12, respectively.

Accordingly, the CAM 20 sets the extended auxiliary line EAL1 at the distance L1 from the plate thickness line MTL1 toward the side edge of the 90-degree plane (downward in FIG. 15). The region between the development auxiliary line USL1 and extended auxiliary line EAL1 is set as the evaluation region Re90. The distance L1 is preferably set to a half of the radius r of the curve section A1iR, for example.

When the curve section A1iR of the angle A1 is negligible, the distance L1 is set to 0 or a small value close to 0. When the distance L1 is set to 0, the evaluation region Re90 is equal to the plate thickness region between the development auxiliary line USL1 and plate thickness line MTL1. The distance L1 is a predetermined value equal to or greater than 0. Typically, the inner corner of the angle A1 includes the curve section A1iR of a predetermined radius r, and the distance L1 is therefore set to greater than 0.

Subsequently, in the 180-degree plane, the CAM 20 sets an extended auxiliary line EAL2 at the distance L1 away from the plate thickness line MTL2 toward the side edge of the 180-degree plane as illustrated in (a) of FIG. 16. The CAM 20 then sets the region between the development auxiliary line USL1 and extended auxiliary line EAL2 as the evaluation region Re180 of the 180-degree plane.

The CAM 20 calculates the point Pxmin at which the left profile line A51L has a minimum value Xmin on the X axis within the evaluation region Re180.

Next, as illustrated in (b) of FIG. 16, the CAM 20 sets a line segment 72L at the same position on the X axis as the Pxmin in the 90-degree plane. The line segment 72L extends from the position the distance L2 away from the plate thickness line MTL1 to the side edge of the 90-degree plane. The CAM 20 determines whether the line segment 72L interferes with the development view AD51.

Herein, the CAM 20 determines that the line segment 72L interferes with the development view AD51, which means that the notch 62 cannot be formed in the 90-degree plane. The CAM 20 terminates the process to set the notch region along the left profile line A51L.

It is therefore understood that the CAM 20 sets the evaluation region Re180 of the 180-degree plane illustrated in (a) of FIG. 16 for the purpose of determining whether to set the processing area Ar62 as the notch region in the 90-degree plane.

In FIG. 16, the 90-degree plane is the target plane in which it is determined whether to set the processing area. When the 90-degree plane is the target plane, the evaluation region is set in the 180-degree plane, which is adjacent to the target plane.

In a similar manner, the CAM 20 calculates the point Pxmax at which the right profile line A51R has a maximum value Xmax on the X axis within the evaluation region Re90 as illustrated in (a) of FIG. 17. As illustrated in (b) of FIG. 17, the CAM 20 sets a line segment 71R at the same position on the X axis as the point Pxmax in the 180-degree plane as the target plane. The line segment 71R extends from the positions the distance L2 away from the plate thickness line MTL2 to the side edge of the 180-degree plane. The CAM 20 determines whether the line segment 71R interferes with the development view AD51.

The CAM 20 determines that the line segment 71R interferes with the development view AD51. Since the line segment 71R interferes with the development view AD51, the CAM 20 does not set a notch region in the 180-degree plane.

Next, as illustrated in (a) of FIG. 18, the CAM 20 calculates the point Pxmax at which the right profile line A51R has the maximum value Xmax on the X axis within the evaluation region Re180. As illustrated in (b) of FIG. 18, the CAM 20 sets a line segment 72R at the same position on the X axis as the point Pxmax in the 90-degree plane as the target plane. The line segment 72R extends from the position the distance L2 away from the plate thickness line MTL1 to the side edge of the 90-degree plane. The CAM 20 determines whether the line segment 72R interferes with the development view AD51.

Herein, the CAM 20 determines that the line segment 72R does not interfere with the development view AD51. As indicated by a dashed arrow, the CAM 20 sets a line segment 72Rv extending in the −X-direction from the end of the line segment 72R on the plate thickness line MTL1 side to the right profile line A51R.

As illustrated in (c) of FIG. 18, the CAM 20 sets the processing area Ar62 (indicated by hatching) surrounded by the line segments 72R and 72Rv set in (b) of FIG. 18 and the right profile line A51R as the notch region to form a notch from the side edge of the 90-degree plane toward the 180-degree plane.

Figure 19:
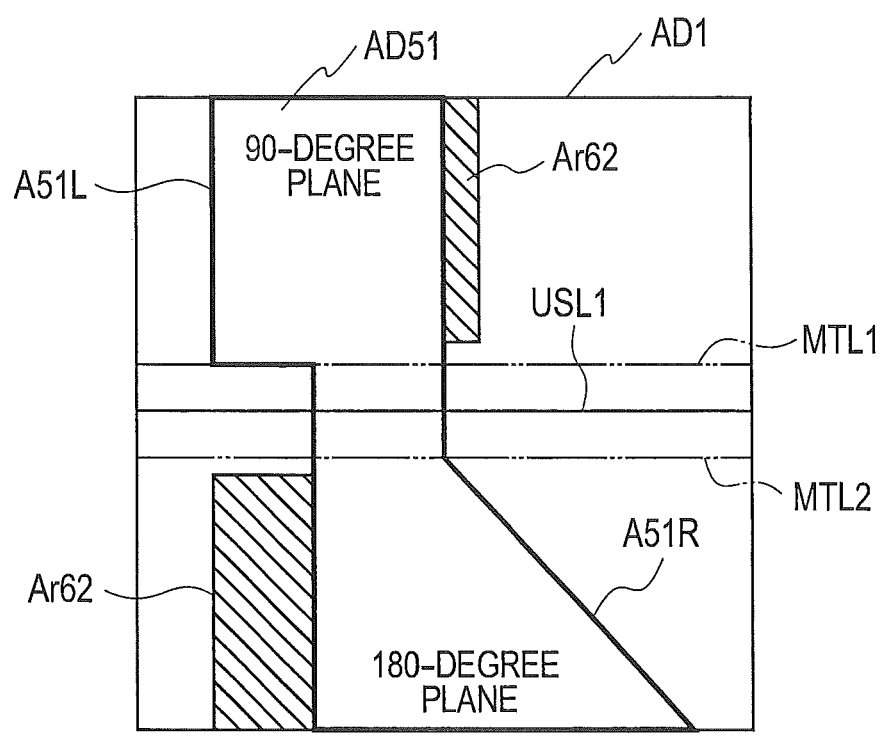
FIG. 19 is a diagram collectively illustrating the notch regions set in the development view of the product illustrated in FIG. 13, by the determination and setting methods described in FIGS. 14 and 16 to 18.

To summarize the aforementioned processes, as illustrated in FIG. 19, for the development view AD51, the CAM 20 sets the processing area Ar62 adjacent to the left profile line A51L in the 180-degree plane and sets the processing area Ar62 adjacent to the right profile line A51R in the 90-degree plane. The CAM 20 sets allocations to form the notches 62 in the respective processing areas Ar62 and sets normal allocation along the profile for the remaining sections of the left and right profile lines A51L and A51R.

The determination whether to set the processing area Ar62 along the left profile line A51L in each plane and the determination whether to set the processing area Ar62 along the right profile line A51R in each plane are sequentially described using FIGS. 14 and 16 to 18. However, these determination processes may be performed in any order. The processing areas Ar62 may be set by simultaneously determining whether to set the processing areas Ar62 along the right and left profile lines A51R and A51L in each plane.

Next, the method of forming the holes 61 and notches 62 (or 63) in the channel C1 is described by using the case of producing the product C56 having the shape illustrated in (a) of FIG. 20 as an example. Since the channel C1 is composed of three planes including 90, 180, and 270-degree planes, the holes 61 are formed in the 180-degree plane in some cases.

(b) of FIG. 20 is a conceptual development view represented by development view data created based on the product C56 by the CAM 20. In (b) of FIG. 20, the development view CD56 of the product C56 is allocated in the development view CD1 of the channel C1 unprocessed. The left profile line in the development view CD56 is indicated by C56L, and the right profile line is indicated by C56R.

As illustrated in (a) of FIG. 21, in the 90-degree plane, the CAM 20 sets an extended auxiliary line EAL11 at the distance L1 away from the plate thickness line MTL1 toward the side edge of the 90-degree plane. The CAM 20 sets the region between the development auxiliary line USL1 and extended auxiliary line EAL11 as the evaluation region Re90 of the 90-degree plane.

In the 270-degree plane, the CAM 20 sets an extended auxiliary line EAL12 at the distance L1 away from the plate thickness line MTL4 toward the side edge of the 270-degree plane. The CAM 20 sets the region between the development auxiliary line USL2 and extended auxiliary line EAL12 as the evaluation region Re270 of the 270-degree plane.

The CAM 20 calculates a point Pxmin1 at which the left profile line C56L has the minimum value Xmin1 on the X axis within the evaluation region Re90. The CAM 20 calculates the point Pxmin2 at which the left profile line C56L has the minimum value Xmin2 on the X axis within the evaluation region Re270.

Subsequently, as illustrated in (b) of FIG. 21, the CAM 20 sets a line segment 73L in the 180-degree plane. The line segment 73L connects the positions the distance L2 away from the plate thickness lines MTL2 and MTL3 at the position on the X axis where one of the points Pxmin1 or Pxmin2 having a smaller value on the X axis are located. Herein, the values of the points Pxmin1 and Pxmin2 on the X axis are equal to each other. The cam 20 determines whether the line segment 73L interferes with the development view CD56.

Herein, the CAM 20 determines that the line segment 73L does not interfere with the development view CD56, which means that the hole 61 can be formed in the 180-degree plane. The CAM 20 sets line segments 73Lv extending from both ends of the line segment 73L to the left profile line C56L in the +X direction as indicated by a dashed arrow.

As illustrated in (c) of FIG. 21, the CAM 20 sets the processing area Ar61 (indicated by hatching) surrounded by the line segments 73L and 73Lv set in (b) of FIG. 21 and the left profile line C56L as the hole region formed in the 180-degree plane.

It is therefore understood that the CAM 20 sets the evaluation regions Re90 and Re270 of the 90 and 270-degree planes illustrated in (a) of FIG. 21 for the purpose of determining whether to set the processing area Ar61 as the hole region in the 180-degree plane.

In FIG. 21, the 180-degree plane is the target plane in which it is determined whether to set the processing area Ar61. When the 180-degree plane is the target plane, the evaluation region is set in each of the 90 and 270-degree planes, which are adjacent to the target plane.

Subsequently, as illustrated in (a) of FIG. 22, the CAM 20 sets an extended auxiliary line EAL13 at the distance L1 away from the plate thickness line MTL2 toward the 270-degree plane in the 180-degree plane. The CAM 20 sets the region between the development auxiliary line USL1 and extended auxiliary line EAL13 as a first evaluation region Re180 of the 180-degree plane.

The CAM 20 calculates a point Pxmin at which the left profile line C56L has the minimum value Xmin on the X axis within the first evaluation region Re180.

Subsequently, as illustrated in (b) of FIG. 22, the CAM 20 sets a line segment 74L in the 90-degree plane. The line segment 74L extends at the same position on the X axis as the point Pxmin from the positions the distance L2 away from the plate thickness line MTL1 to the side edge of the 90-degree plane. The CAM 20 determines whether the line segment 74L interferes with the development view CD56.

Herein, the CAM 20 determines that the line segment 74L interferes with the development view CD56. Since the line segment 74L interferes with the development view CD56, the processing area Ar62 to form the notch 62 is not set along the left profile line C56L in the 90-degree plane.

It is therefore understood that the CAM 20 sets the first evaluation region Re180 of the 180-degree plane illustrated in (a) of FIG. 22 for the purpose of determining whether to set the processing area Ar62 as the notch region in the 90-degree plane.

In FIG. 22, the 90-degree plane is the target plane in which it is determined whether to set the processing area. When the 90-degree plane is the target plane, the evaluation region is set in the 180-degree plane, which is adjacent to the target plane.

As illustrated in (a) of FIG. 23, in the 180-degree plane, the CAM 20 sets an extended auxiliary line EAL14 at the distance L1 from the plate thickness line MTL3 toward the 90-degree plane. The CAM 20 sets the region between the development auxiliary line USL2 and extended auxiliary line EAL14 as a second evaluation region Re180 of the 180-degree plane.

The CAM 20 calculates the point Pxmin at which the left profile line C56L has the minimum value Xmin on the X axis within the second evaluation region Re180.

Subsequently, as illustrated in (b) of FIG. 23, the CAM 20 sets a line segment 75L at the same position on the X axis as the point Pxmin in the 270-degree plane. The line segment 75L extends from the position the distance L2 away from the plate thickness line MTL4 to the side edge of the 270-degree plane. The CAM 20 determines whether the line segment 75L interferes with the development view CD56.

Herein, the CAM 20 determines that the line segment 75L interferes with the development view CD56. Since the line segment 75L interferes with the development view CD56, the processing area Ar62 to form the notch 62 is not set along the left profile line C56L in the 270-degree plane.

It is therefore understood that the CAM 20 sets the second evaluation region Re180 of the 180-degree plane illustrated in (a) of FIG. 23 for the purpose of determining whether to set the processing area Ar62 as the notch region in the 270-degree plane.

In FIG. 23, the 270-degree plane is the target plane in which it is determined whether to set the processing area. When the 270-degree plane is the target plane, the evaluation region is set in the 180-degree plane, which is adjacent to the target plane.

In a similar manner, the CAM 20 calculates the point Pxmax1 at which the right profile line C56R has the maximum value Xmax1 on the X axis within the evaluation region Re90 and calculates the point Pxmax2 at which the right profile line C56R has the maximum value Xmax2 on the X axis within the evaluation region Re270.

Subsequently, as illustrated in (b) of FIG. 24, the CAM 20 sets a line segment 73R in the 180-degree plane. The line segment 73R connects the positions the distance L2 away from the plate thickness lines MTL2 and MTL3 at the position on the X axis where one of the points Pxmax1 or Pxmax2 having a larger value on the X axis are located. Herein, the values of the points Pxmax1 and Pxmax2 on the X axis are equal to each other. The cam 20 determines whether the line segment 73R interferes with the development view CD56.

The CAM 20 determines that the line segment 73R interferes with the development view CD56. Since the line segment 73R interferes with the development view CD56, the CAM 20 does not set a hole region in the 180-degree plane.

Subsequently, as illustrated in (a) of FIG. 25, the CAM 20 calculates the point Pxmax at which the right profile line C56R has the maximum value Xmax on the X axis within the first evaluation region Re180.

As illustrated in (b) of FIG. 25, in the 90-degree plane as the target plane, the CAM 20 sets a line segment 74R at the same position on the X axis as the point Pxmax. The line segment 74R extends from the position the distance L2 away from the plate thickness line MTL1 to the side edge of the 90-degree plane. The CAM 20 determines whether the line segment 74R interferes with the development view CD56.

Herein, the CAM 20 determines that the line segment 74R does not interfere with the development view CD56. The CAM 20 sets a line segment 74Rv extending from the end of the line segment 74R on the plate thickness line MTL1 side to the right profile line C56R in the −X direction as indicated by a dashed arrow.

As illustrated in (c) of FIG. 25, the CAM 20 sets the processing area Ar62 (indicated by hatching) surrounded by the line segments 74R and 74Rv set in (b) of FIG. 25 and the right profile line C56R as the notch region to form a notch from the side edge of the 90-degree plane toward the 180-degree plane.

As illustrated in (a) of FIG. 26, the CAM 20 calculates the point Pxmax at which the right profile line C56R has the maximum value Xmax on the X axis within the second evaluation region Re180.

As illustrated in (b) of FIG. 26, in the 270-degree plane as the target plane, the CAM 20 sets a line segment 75R at the same position on the X axis as the point Pxmax. The line segment 75R extends from the position the distance L2 away from the plate thickness line MTL4 to the side edge of the 270-degree plane. The CAM 20 determines whether the line segment 75R interferes with the development view CD56.

Herein, the CAM 20 determines that the line segment 75R does not interfere with the development view CD56. The CAM 20 sets a line segment 75Rv extending from the end of the line segment 75R on the plate thickness line MTL4 side to the right profile line C56R in the −X direction as indicated by a dashed arrow.

As illustrated in (c) of FIG. 26, the CAM 20 sets the processing area Ar62 (indicated by hatching) surrounded by the line segments 75R and 75Rv set in (b) of FIG. 26 and the right profile line C56R as the notch region to form a notch from the side edge of the 270-degree plane toward the 180-degree plane.

Figure 27:
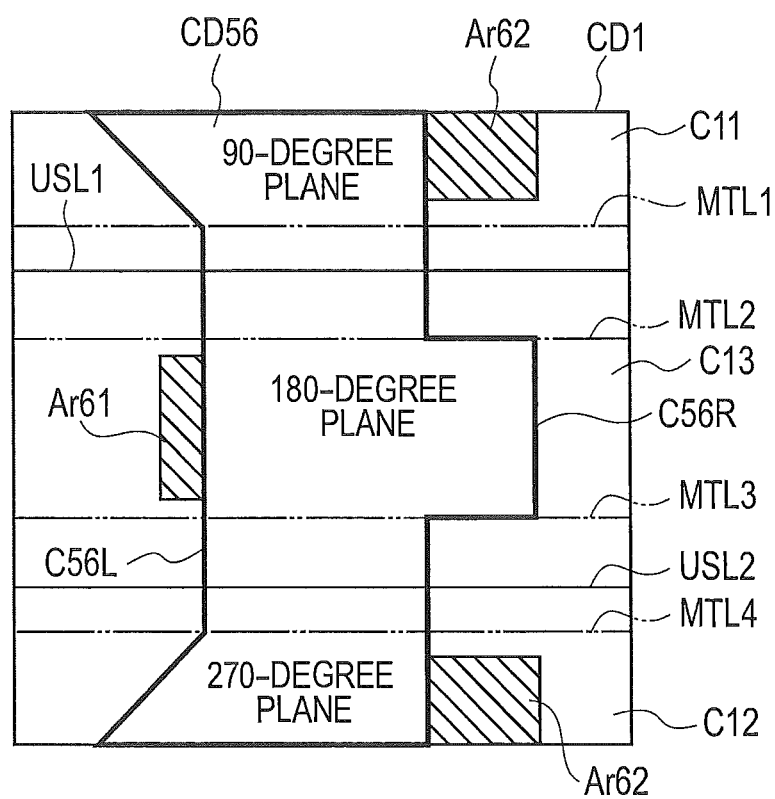
FIG. 27 is a diagram collectively illustrating the hole and notch regions set in the development view of the product illustrated in FIG. 20, by the determination and setting methods described in FIGS. 21 to 26.

To summarize the aforementioned processes, as illustrated in FIG. 27, for the development view CD56, the CAM 20 sets the processing area Ar61 as the hole region adjacent to the left profile line C56L in the 180-degree plane and sets the processing areas Ar62 as the notch regions adjacent to the right profile line C56R in the 90 and 270-degree planes.

The CAM 20 sets the allocation to form the hole in the processing area Ar61 and the allocation to form the notches 62 in the respective processing areas Ar62 and sets normal allocation to cut along the profile in the remaining part of the right and left profile lines A51R and A51L.

The determination whether to set the processing areas Ar61 and Ar62 along the left profile line C56L in each plane and the determination whether to set the processing areas Ar61 and Ar62 along the right profile line C56R in each plane are sequentially described using FIGS. 20 to 26. However, these determination processes may be performed in any order. The processing areas Ar61 and Ar62 may be set by simultaneously determining whether to set the processing areas Ar61 and Ar62 along the right and left profile lines C56R and C56L in each plane.

To produce the product C53 having the cutting shape S53 as illustrated in (a) of FIG. 11, as illustrated in (b) and (c) of FIG. 11, the CAM 20 sets as the processing area Ar63, a triangular range surrounded by a line segment set in the target plane (the 90 or 270-degree plane), the product profile, and the side edge of the target plane, and the laser beam machine 40 thus forms the triangular notches 62.

In the process of setting each triangular processing area Ar63, it is unnecessary to set a line segment extending from the end of the line segment set in the target plane to the product profile in the X-axis direction.

The CAM 20 sets a first line segment in the target plane based on the position of the extremity (the minimum or maximum value Xmin or Xmax) of the product profile in the X-axis direction within the evaluation region in the adjacent plane. When the first line segment does not interfere with the product, the region between the first line segment and the product profile is set as a processing area to form a notch or a hole.

To set a notch region as the processing area, the CAM 20 sets a second line segment extending from an end of the first line segment to the product profile if necessary. To set a hole region as the processing area, the CAM 20 set two second line segments extending from both ends of the first line segment to the product profile.

When cross-sectional cutting as illustrated in FIG. 9 is selected as the processing method in the embodiments, the notch or hole regions are formed as follows. A description is given of the case of cross-sectionally cutting the angle A1 by using FIGS. 28 to 30, and a description is given of the case of cross-sectionally cutting the channel C1 by using FIGS. 31 to 34.

In (a) of FIG. 28, a development view AD52 of a product formed by cross-sectionally cutting the angle A1 is allocated in the development view AD1 of the angle A1 unprocessed. The left profile line of the development view AD52 is indicated by A52L, and the right profile line is indicated by A52R.

As illustrated in (a) of FIG. 28, the CAM 20 calculates the point Pxmin at which the left profile line A52L has the minimum value Xmin on the X axis within the evaluation region Re90 and calculates the point Pxmax at which the right profile line A52R has the maximum Xmax on the X axis.

Next, in the 180-degree plane, the CAM 20 sets a new minimum value Xmin to the position of (Xmin−L3), which is a predetermined distance L3 away in the −X direction from the position of the point Pxmin on the X axis. This means that the position the distance L3 outward in the −X direction from the position of the point Pxmin on the X axis is considered as the edge of the left profile line in the axial direction. The distance L3 is 5 mm, for example.

The CAM 20 sets a line segment 76L at the position of the new minimum value Xmin. The line segment 76L extends from the position the distance L2 away from the plate thickness line MTL2 to the side edge of the 180-degree plane. The line segment 76L does not interfere with the development view AD52. The CAM 20 sets a line segment 76Lv extending from the end of the line segment 76L on the plate thickness line MTL2 side to the left profile line A52L in the +X direction as indicated by a dashed arrow.

In the 180-degree plane, the CAM 20 sets a new maximum value Xmax to the position of (Xmax−L3), which is the predetermined distance L3 away in the +X direction from the position of the point Pxmax on the X axis. This means that the position the distance L3 outward in the +X direction from the same position on the X axis as the point Pxmax is considered as the edge in the axial direction.

The CAM 20 sets a line segment 76R at the position of the new minimum value Xmax. The line segment 76R extends from the position the distance L2 away from the plate thickness line MTL2 to the side edge of the 180-degree plane. The line segment 76R does not interfere with the development view AD52. The CAM 20 sets a line segment 76Rv extending from the end of the line segment 76R on the plate thickness line MTL2 side to the right profile line A52R in the −X direction as indicated by a dashed arrow.

As illustrated in (b) of FIG. 28, the CAM 20 sets the processing area Ar62 (indicated by hatching) surrounded by the line segments 76L and 76Lv set in (a) of FIG. 28 and the left profile line A52L and the processing area Ar62 (indicated by hatching) surrounded by the line segments 76R and 76Rv and the right profile line A52R as notch regions to form notches from the side edge of the 180-degree plane toward the 90-degree plane.

As illustrated in (a) of FIG. 29, the CAM 20 calculates the point Pxmin at which the left profile line A52L has the minimum value Xmin on the X axis within the evaluation region Re180 and calculates the point Pxmax at which the right profile line A52R has the maximum Xmax on the X axis.

Next, in the 90-degree plane, the CAM 20 sets a new minimum value Xmin to the position of (Xmin−L3), which is a predetermined distance L3 away in the −X direction from the position of the point Pxmin on the X axis.

The CAM 20 sets a line segment 77L at the position of the new minimum value Xmin. The line segment 77L extends from the position the distance L2 away from the plate thickness line MTL1 to the side edge of the 90-degree plane. The line segment 77L does not interfere with the development view AD52. The CAM 20 sets a line segment 77Lv extending from the end of the line segment 77L on the plate thickness line MTL1 side to the left profile line A52L in the +X direction as indicated by a dashed arrow.

In the 90-degree plane, the CAM 20 sets a new maximum value Xmax to the position of (Xmax+L3), which is the predetermined distance L3 away in the +X direction from the position of the point Pxmax on the X axis.

The CAM 20 sets a line segment 77R at the position of the new maximum value Xmax. The line segment 77R extends from the position the distance L2 away from the plate thickness line MTL1 to the side edge of the 90-degree plane. The line segment 77R does not interfere with the development view AD52. The CAM 20 sets a line segment 77Rv extending from the end of the line segment 77R on the plate thickness line MTL1 side to the right profile line A52R in the −X direction as indicated by a dashed arrow.

As illustrated in (b) of FIG. 29, the CAM 20 sets the processing area Ar62 (indicated by hatching) surrounded by the line segments 77L and 77Lv set in (a) of FIG. 29 and the left profile line A52L and the processing area Ar62 (indicated by hatching) surrounded by the line segments 77R and 77Rv and the right profile line A52R as the notch regions to form notches from the side edge of the 180-degree plane toward the 90-degree plane.

Figure 30:
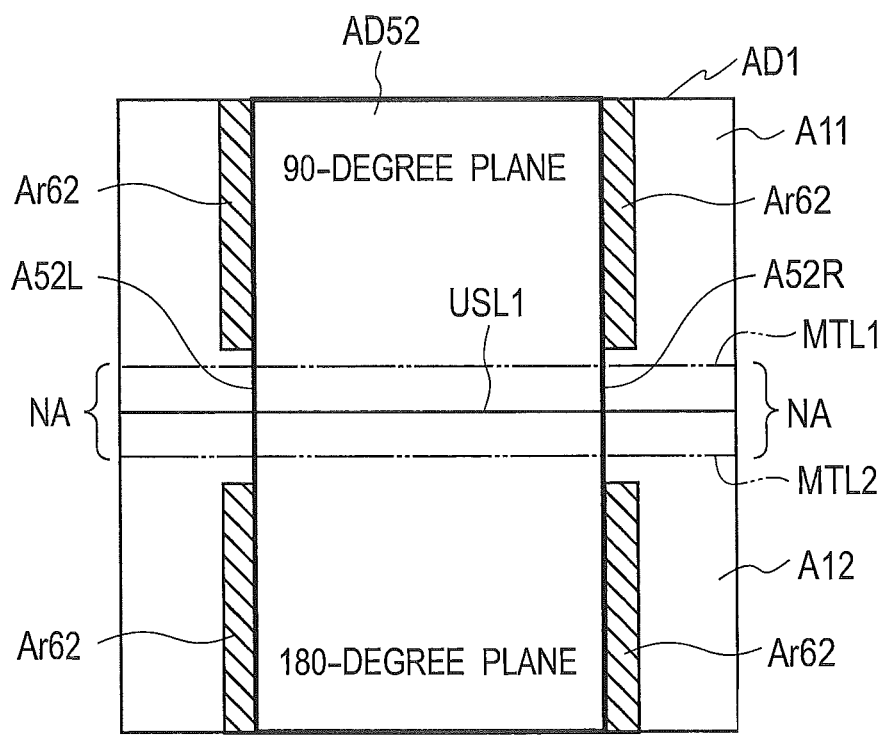
FIG. 30 is a diagram collectively illustrating the notch regions set in the development view of the product by the setting methods described in FIGS. 28 and 29.

To summarize the aforementioned processes, as illustrated in FIG. 30, for the development view AD52, the CAM 20 sets the processing areas Ar62 in the 90 and 180-degree planes as the notch regions adjacent to the right and left profile lines A52R and A52L.

When the processing areas Ar62 are set in the 90 and 180-degree planes as illustrated in FIG. 30, the range indicated by NA does not include any allocation of trajectories for laser beam processing.

Accordingly, the CAM 20 changes the allocation without allocating the notches in some of the processing areas Ar62. Allocations sometimes need to be changed because of the sections not including any allocation besides the cases of cross-sectional cutting. Change of the allocations is described later in detail.

In (a) of FIG. 31, a development view CD57 of a product formed by cross-sectionally cutting the channel C1 is allocated in the development view CD1 of the channel C1 unprocessed. The left profile line of the development view CD57 is indicated by C57L, and the right profile line is indicated by C57R.

As illustrated in (a) of FIG. 31, the CAM 20 calculates the point Pxmin at which the left profile line C57L has the minimum value Xmin on the X axis within each of the evaluation regions Re90 and Re270. The CAM 20 calculates the point Pxmax at which the right profile line C57R has the maximum value Xmax on the X axis within each of the evaluation regions Re90 and Re270.

Next, in the 180-degree plane, the CAM 20 sets a new minimum value Xmin to the position of (Xmin−L3), which is a predetermined distance L3 away in the −X direction from the position of the point Pxmin on the X axis.

The CAM 20 sets a line segment 78L at the position of the new minimum value Xmin so as to connect the positions the distance L2 away from the plate thickness lines MTL2 and MTL3. The line segment 78L does not interfere with the development view CD57. The CAM 20 sets line segments 78Lv extending from both ends of the line segment 78L to the left profile line C57L in the +X direction as indicated by dashed arrows.

In the 180-degree plane, the CAM 20 sets a new maximum value Xmax to the position of (Xmax+L3), which is a predetermined distance L3 away in the +X direction from the position of the point Pxmax on the X axis.

The CAM 20 sets a line segment 78R at the position of the new maximum value Xmax so as to connect the positions the distance L2 away from the plate thickness lines MTL2 and MTL3. The line segment 78R does not interfere with the development view CD57. The CAM 20 sets line segments 78Rv from both ends of the line segment 78R to the right profile line C57R in the −X direction as indicated by dashed arrows.

As illustrated in (b) of FIG. 31, the CAM 20 sets the processing area Ar61 (indicated by hatching) surrounded by the line segments 78L and 78Lv set in (a) of FIG. 31 and the left profile line C57L and the processing area Ar61 (indicated by hatching) surrounded by the line segments 78R and 78Rv and the right profile line C57R as hole regions formed in the 180-degree plane.

Next, as illustrated in (a) of FIG. 32, the CAM 20 calculates the point Pxmin at which the left profile line C57L has the minimum value Xmin on the X axis in the evaluation region Re180. The CAM 20 calculates the point Pxmax at which the right profile line C57R has the maximum value Xmax on the X axis in the evaluation region Re180.

In the 90-degree plane, the CAM 20 sets a new minimum value Xmin to the position of (Xmin−L3), which is the distance L3 away in the −X direction from the position of the point Pxmin on the X axis.

The CAM 20 sets a line segment 79L at the position of the new minimum value Xmin. The line segment 79L extends from the position the distance L2 away from the plate thickness line MTL1 to the side edge of the 90-degree plane.

In the 90-degree plane, the CAM 20 sets a new maximum value Xmax to the position of (Xmax+L3), which is the distance L3 away in the +X direction from the position of the point Pxmax on the X axis. The line segment 79R extends from the position the distance L2 away from the plate thickness line MTL1 to the side edge of the 90-degree plane.

The line segments 79L and 79R do not interfere with the development diagram CD57. The CAM 20 sets a line segment 79Lv extending from the end of the line segment 79L on the plate thickness line MTL1 side to the left profile line C57L in the +X direction as indicated by a dashed arrow and sets a line segment 79Rv extending from the end of the line segment 79R on the plate thickness line MTL1 side to the right profile line C57R in the −X direction as indicated by a dashed arrow.

As illustrated in (b) of FIG. 32, the CAM 20 sets the processing area Ar62 (indicated by hatching) surrounded by the line segments 79L and 79Lv set in (a) of FIG. 32 and the left profile line C57L and the processing area Ar62 (indicated by hatching) surrounded by the line segments 79R and 79Rv and the right profile line C57R as notch regions to form notches from the side edge of the 90-degree plane toward the 180-degree plane.

Subsequently, as illustrated in (a) of FIG. 33, the CAM 20 calculates the point Pxmin at which the left profile line C57L has the minimum value Xmin on the X axis within the evaluation region Re180. The CAM 20 calculates the point Pxmax at which the right profile line C57R has the maximum value Xmax on the X axis within the evaluation region Re180.

Next, in the 270-degree plane, the CAM 20 sets a new minimum value Xmin to the position of (Xmin−L3), which is the distance L3 in the −X direction away from the position of the point Pxmin on the X axis.

The CAM 20 sets a line segment 80L at the position of the new minimum value Xmin. The line segment 80L extends from the position the distance L2 away from the plate thickness line MTL4 to the side edge of the 270-degree plane. The line segment 80L does not interfere with the development view CD57. The CAM 20 sets a line segment 80Lv extending from the end of the line segment 80L on the plate thickness line MTL4 side to the left profile line C57L in the +X direction as indicated by a dashed arrow.

In the 270-degree plane, the CAM 20 sets a new maximum value Xmax to the position of (Xmax+L3), which is the distance L3 away in the +X direction from the position of the point Pxmax on the X axis.

The CAM 20 sets a line segment 80R at the position of the new maximum value Xmax. The line segment 80R extends from the position the distance L2 away from the plate thickness line MTL4 to the side edge of the 270-degree plane. The line segment 80R does not interfere with the development view CD57. The CAM 20 sets a line segment 80Rv extending from the end of the line segment 80R on the plate thickness line MTL4 side to the right profile line C57R in the −X direction as indicated by a dashed arrow.

As illustrated in (b) of FIG. 33, the CAM 20 sets the processing area Ar62 (indicated by hatching) surrounded by the line segments 80L and 80Lv set in (a) of FIG. 33 and the left profile line C57L and the processing area Ar62 (indicated by hatching) surrounded by the line segments 80R and 80Rv and the right profile line C57R as notch regions to form notches from the side edge of the 270-degree plane toward the 180-degree plane.

Figure 34:
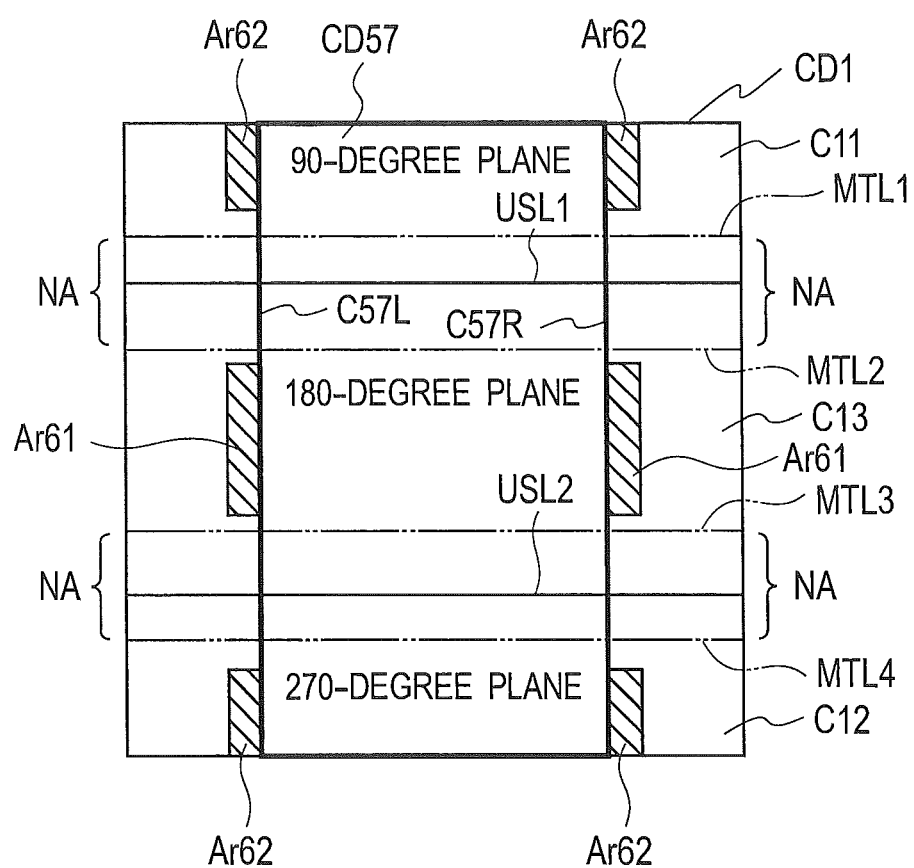
FIG. 34 is a diagram collectively illustrating the hole and notch regions set in the development view of the product by the setting methods described in FIGS. 31 to 34.

To summarize the aforementioned processes, as illustrated in FIG. 34, the CAM 20 sets in the development view CD57, the processing areas Ar62 as the notch regions adjacent to the respective right and left profile lines C57R and C57L in the 90 and 270-degree planes and sets the processing areas Ar61 as the hole regions adjacent to the right and left profile lines C57R and C57L in the 180-degree plane.

In FIG. 34, when the processing areas Ar62 are set in the 90 and 270-degree planes and the processing areas Ar61 are set in the 180-degree plane, the ranges indicated by NA do not include any allocation of trajectories for laser beam processing. The CAM 20 therefore changes the allocation without allocating the holes in the processing areas Ar62.

Next, using FIGS. 35 to 41, a description is given of the way the trajectories for laser beam processing are allocated in the development view of a product including the hole or notch regions set as described above. The allocation, processing order, and modification and change of the allocation, when there is a section not including any allocation, are also described using FIGS. 35 to 41.

In FIGS. 35 to 41, product profile lines to be cut by the laser beam are indicated by dashed lines, and the trajectories of the laser beam are illustrated slightly offset from the profile lines for convenience. D1 in FIGS. 35 to 41 indicate margins at the start and end of projection of the laser beam described in FIGS. 4 and 5.

FIG. 35 illustrates the allocation and processing order for producing the product A51 illustrated in (a) of FIG. 13. For comparison with the allocation and processing order according to the embodiments, (a) of FIG. 35 shows processing in a normal processing order described in FIG. 4 based on the conventional allocations not including any notch regions.

The CAM 20 allocates a trajectory Ls1 in the 90-degree and allocates a trajectory Ls2 in the 180-degree. The CAM 20 allocates a trajectory Ls3 in the 90-degree and allocates a trajectory Ls4 in the 180-degree. However, the laser beam machine 40 cannot perform normal processing with the trajectories Ls1 to Ls4 of (a) of FIG. 35.

In the embodiments, therefore, the CAM 20 allocates the trajectory Ls1 to form the notch 62 in the 180-degree plane and then allocates the normal trajectory Ls2 in the 90-degree plane in this order as illustrated in (b) of FIG. 35 based on the processing areas Ar62 set as illustrated in FIG. 19.

The CAM 20 allocates the trajectory Ls3 to form the notch in the 90-degree plane and then allocates the normal trajectory Ls4 in the 180-degree plane in this order as illustrated in (b) of FIG. 35 based on the processing areas Ar62 set as illustrated in FIG. 19.

The CAM 20 creates a processing program including allocation to form the notches 62 as illustrated in (b) of FIG. 35 and performing the processing in the following order: the trajectories Ls1, Ls2, Ls3, and then Ls4 illustrated in (b) of FIG. 35. The NC device 30 processes the angle A1 based on the created processing program, and the laser beam machine 40 can thereby normally produce the product A51.

FIG. 36 shows a case of processing the angle A1 into a product represented by the development view AD53. In the example illustrated in FIG. 36, notch regions are allocated in both the 90 and 180-degree planes, and the range indicated by NA does not include any allocation.

According to the method of setting the notch regions based on the aforementioned logic, the CAM 20 allocates the trajectories Ls1 to Ls4 to form the notches 62 in the angle A1, and the range indicated by NA does not include any allocation as illustrated in (a) of FIG. 36.

Accordingly, as illustrated in (b) of FIG. 36, the CAM 20 changes the trajectories Ls2 and Ls4 to form the notches 62 in the 180-degree plane to normal allocation. By changing the trajectories Ls2 and Ls4 to the normal allocation, the right and left profiles of the product are cut in the 180-degree and the plate thickness region.

(a) of FIG. 37 shows a state where the trajectories Ls1 to Ls4 are allocated based on the processing areas Ar62 set in the 90 and 180-degree planes at cross-sectional cutting. In this state, the range indicated by NA does not include any allocation.

The CAM 20 therefore changes the trajectories Ls2 and Ls4 to form the notches 62 in the 180-degree plane to normal allocation as illustrated in (b) of FIG. 37. By changing the trajectories Ls2 and Ls4 to the normal allocation, the right and left profiles of the product are cut in the 180-degree plane and the plate thickness region.

FIG. 38 illustrates the allocation and processing order to produce the product C56 illustrated in (a) of FIG. 20. For comparison with the allocation and processing order according to the embodiments, (a) of FIG. 38 shows a case of processing in the normal processing order described in FIG. 5 based on the conventional allocation not including the hole and notch regions.

The CAM 20 allocates the trajectory Ls1 in the 90-degree, the trajectory Ls2 in the 270-degree, and the trajectory Ls3 in the 180-degree. The CAM 20 allocates the trajectory Ls4 in the 90-degree, the trajectory Ls5 in the 270-degree, and the trajectory Ls6 in the 180-degree. However, the laser beam machine 40 cannot perform normal processing with the trajectories Ls1 to Ls6 of (a) of FIG. 38.

In the embodiments, based on the processing areas Ar61 set as illustrated in FIG. 27, the CAM 20 allocates the trajectory Ls1 to form the hole 61 in the 180-degree plane, then allocates the normal trajectory Ls2 in the 270-degree plane, and allocates the normal trajectory Ls3 in the 90-degree plane in this order as illustrated in (b) of FIG. 38.

Based on the processing areas Ar62 set as illustrated in FIG. 27, the CAM 20 allocates the trajectory Ls4 to form the notch 62 in the 90-degree plane, allocates the trajectory Ls5 to form the notch 62 in the 270-degree plane, and allocates the normal trajectory Ls6 in the 180-degree plane in this order as illustrated in (b) of FIG. 38.

The CAM 20 creates a processing program including the allocation to form the holes 61 and notches 62 as illustrated in (b) of FIG. 38 and performing the processing in the following order: the trajectory Ls1, Ls2, . . . , and then Ls6 illustrated in (b) of FIG. 38. The NC device 30 processes the channel C1 based on the created processing program. The laser beam machine 40 can thereby normally produce the product C56.

FIG. 39 shows a case of processing the channel C1 into a product represented by a development view CD61. According to the method of setting the hole and notch regions based on the aforementioned logic, as illustrated in (a) of FIG. 39, the CAM 20 allocates the trajectories Ls1 and Ls4 to form the notches in the 90 and 270-degree planes and allocates the trajectories Ls2 and Ls5 to form the holes 61 in the 180-degree plane.

The CAM 20 allocates the trajectories Ls1 to Ls6 in the channel C1 in this order, and the range indicated by NA does not include any allocation.

Accordingly, as illustrated in (b) of FIG. 39, the CAM 20 brings the position of the edge in the −X direction of the notch region in the 270-degree plane in line with the position of the edge in the −X direction, of the hole region (located at the left profile line).

The CAM 20 thereby modifies the allocation so that the trajectory Ls1 to form the notch 62 increases in width up to the edge in the −X direction, of the hole 61 located along the left profile line.

The CAM 20 replaces the hole region located at the left profile line in the 180-degree plane with a notch region provided across the 180-degree plane and the plate thickness region between the plate thickness lines MTL3 and MTL4.

The CAM 20 therefore replaces the trajectory Ls2 to form the hole 61 in the 180-degree plane with the trajectory Ls2 to form the notch 62. The notch 62 by the trajectory Ls2 is connected to the notch 62 by the trajectory Ls1.

The CAM 20 brings the position of the edge in the +X direction, of the notch region in the 90-degree plane in line with the position of the edge in the +X direction, of the hole region located along the right profile line. The CAM 20 thereby modifies the allocation so that the trajectory Ls4 for forming the notch 62 increases in width up to the edge in the +X direction, of the hole 61 located along the right profile line.

The CAM 20 replaces the hole region located along the right profile line in the 180-degree plane with the notch region set across the 180-degree plane and the plate thickness region between the plate thickness lines MTL1 and MTL2. The CAM 20 therefore replaces the trajectory Ls5 to form the hole 61 in the 180-degree plane with the trajectory Ls5 to form the notch 62. The notch 62 by the trajectory Ls5 is connected to the notch 62 by the trajectory Ls4.

The CAM 20 creates a processing program to perform the processing in the following order: the trajectory Ls1, Ls2, and then Ls6 illustrated in (b) of FIG. 39 based on the allocation where the notches 62 in the 90 and 270-degrees are increased in width and the holes 61 in the 180-degree are replaced with the notches 62 connected to the notches 62 in the 90 and 270-degrees.

The NC device 30 processes the channel C1 based on the created processing program. The laser beam machine 40 can thereby normally produce the product.

FIG. 40 shows a case of processing the channel C1 into the product represented by a development view CD62. According to the method of setting the hole and notch regions based on the aforementioned logic, as illustrated in (a) of FIG. 40, the CAM 20 allocates the trajectories Ls1, Ls2, Ls4, and Ls5 to form the notches 62 in the 90 and 270-degree planes and allocates the trajectories Ls3 and Ls6 to form the holes 61 in the 180-degree plane.

The CAM 20 allocates the trajectories Ls1 to Ls6 for the channel C1 in this order, and the range indicated by NA does not include any allocation.

As illustrated in (b) of FIG. 40, the CAM 20 changes the trajectories Ls3 and Ls6 to form the holes 61 in the 180-degree plane to normal allocation along the right and left profile lines across the plate thickness region between the plate thickness lines MTL1 and MTL2, the 180-degree plane, and the plate thickness region between the plate thickness lines MTL3 and MTL4.

The CAM 20 creates a processing program in which allocation to form the holes 61 in the 180-degree plane is replaced with normal allocation and the processing is performed in the following order: the trajectory Ls1, Ls2, . . . , and then Ls6 as illustrated in (b) of FIG. 40. The NC device 30 processes the channel C1 based on the created processing program. The laser beam machine 40 can thereby normally produce the product.

(a) of FIG. 41 illustrates a state where, in cross-sectional cutting of the channel C1, as described in FIG. 34, the trajectories Ls1, Ls2, Ls4, and Ls5 to form the notches 62 in the 90 and 270-degree planes are allocated and the trajectories Ls3 and LS6 to form the holes 61 in the 180-degree plane are allocated. In this state, the range indicated by NA does not include any allocation.

Accordingly, as illustrated in (b) of FIG. 41, the CAM 20 changes the trajectories Ls3 and Ls6 to form the holes 61 in the 180-degree plane to normal allocation across the plate thickness region between the plate thickness lines MTL1 and MTL2, the 180-degree plane, and the plate thickness region between the plate thickness lines MTL3 and MTL4.

Figure 43:
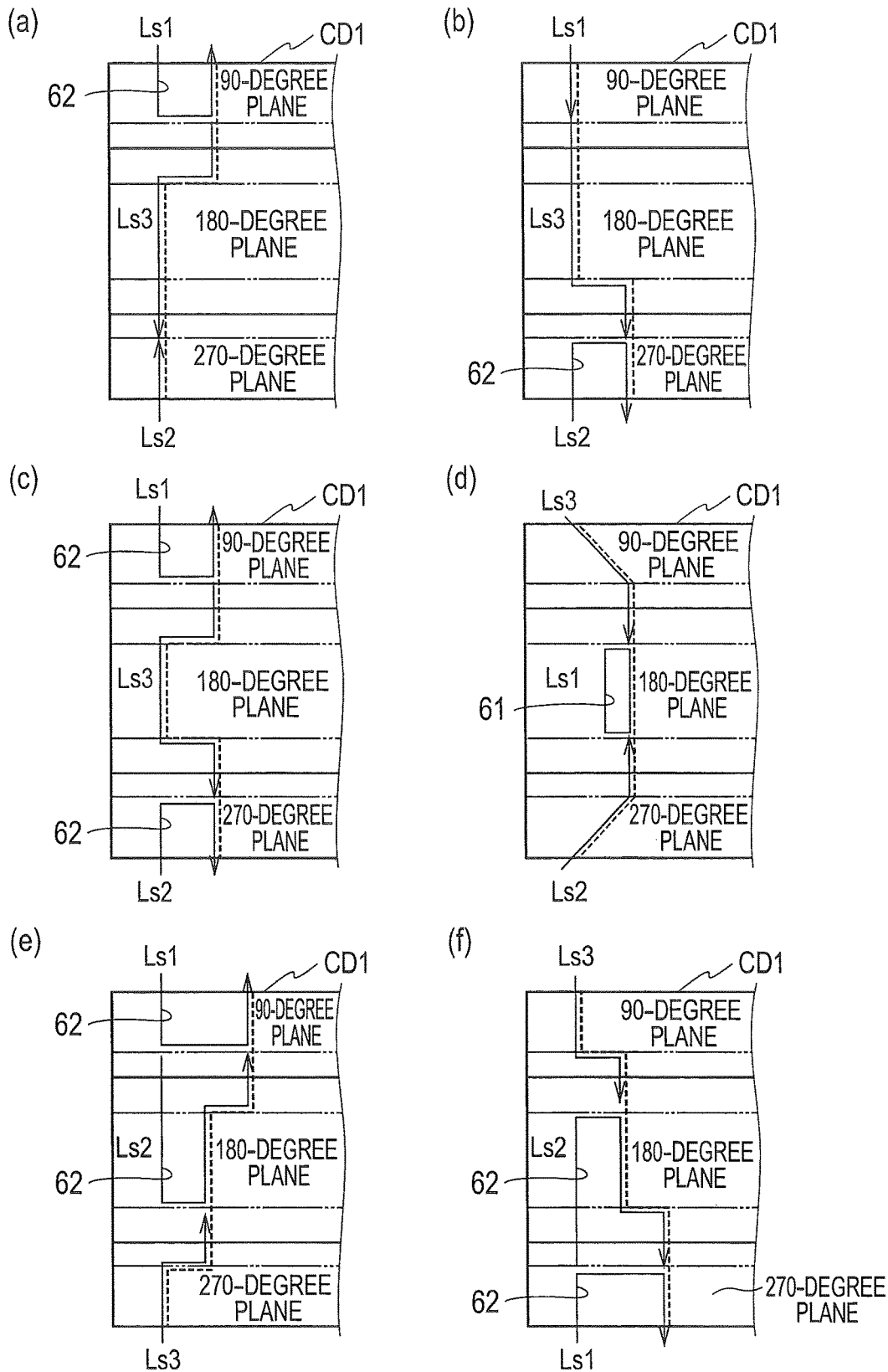
FIG. 43 is a diagram illustrating some patterns of the allocation and processing order when the steel material is a channel.

Herein, the patterns of the allocation and processing order for the angle A1 and channel C1 are collectively illustrated in FIGS. 42 and 43. FIGS. 42 and 43 illustrate only left profiles of products. The same applies to the right profiles.

(a) of FIG. 42 illustrates a case where the notch 62 is formed in the 90-degree plane of the angle A1. The CAM 20 allocates the trajectory Ls1 to form the notch in the 90-degree plane and allocates the normal trajectory Ls2 along the profile in the 180-degree plane. (b) of FIG. 42 illustrates a case where the notch is formed in the 180-degree plane of the angle A1.

The CAM 20 allocates the trajectory Ls1 to form a notch in the 180-degree plane and allocates the normal trajectory Ls2 along the profile in the 90-degree plane.

(a) of FIG. 43 illustrates a case where the notch 62 is formed only in the 90-degree plane of the channel C1. The CAM 20 allocates the trajectory Ls1 to form the notch in the 90-degree plane, allocates the normal trajectory Ls2 along the profile in the 270-degree plane, and allocates the normal trajectory Ls3 along the profile in the 180-degree plane.

(b) of FIG. 43 illustrates a case where the notch 62 is formed only in the 270-degree plane of the channel C1. The CAM 20 allocates the normal trajectory Ls1 along the profile in the 90-degree plane, allocates the trajectory Ls2 to form the notch in the 270-degree plane, and allocates the normal trajectory Ls3 along the profile in the 180-degree plane.

(c) of FIG. 43 illustrates a case where the notches 62 are formed in the 90 and 270-degree planes of the channel C1. The CAM 20 allocates the trajectory Ls1 to form the notch in the 90-degree plane, allocates the trajectory Ls2 to form the notch in the 270-degree plane, and allocates the normal trajectory Ls3 along the profile in the 180-degree plane.

(d) of FIG. 43 illustrates a case where the hole 61 is formed in the 180-degree plane of the channel C1. The CAM 20 allocates the trajectory Ls1 to form the hole 61 in the 180-degree plane, allocates the normal trajectory Ls2 along the profile in the 270-degree plane, and allocates the normal trajectory Ls3 along the profile in the 90-degree plane.

(e) of FIG. 43 illustrates a case where the notches 62 in the 90 and 180-degree planes are formed by replacing the allocation of the hole 61 set in the 180-degree plane of the channel C1 with allocation of the notch 62. The CAM 20 allocates the trajectory Ls1 to form the notch in the 90-degree plane, allocates the trajectory Ls2 to form the notch in the 180-degree plane, and allocates the normal trajectory Ls3 along the profile in the 270-degree plane.

(f) of FIG. 43 illustrates a case where the notches 62 in the 180 and 270-degree plane are formed by replacing the allocation of the hole 61 set in the 180-degree plane of the channel C1 with allocation of the notch 62. The CAM 20 allocates the trajectory Ls1 to form the notch in the 270-degree plane, allocates the trajectory Ls2 to form the notch in the 180-degree plane, and allocates the normal trajectory Ls3 along the profile in the 90-degree plane.

Using flowcharts shown in FIGS. 44 to 50 and tables in FIGS. 51 and 52 showing classification of cases, a description is given of processes executed by the CAM 20 which specifically implement the laser processing method and laser processing program creation device of the aforementioned embodiments.

Figure 44:
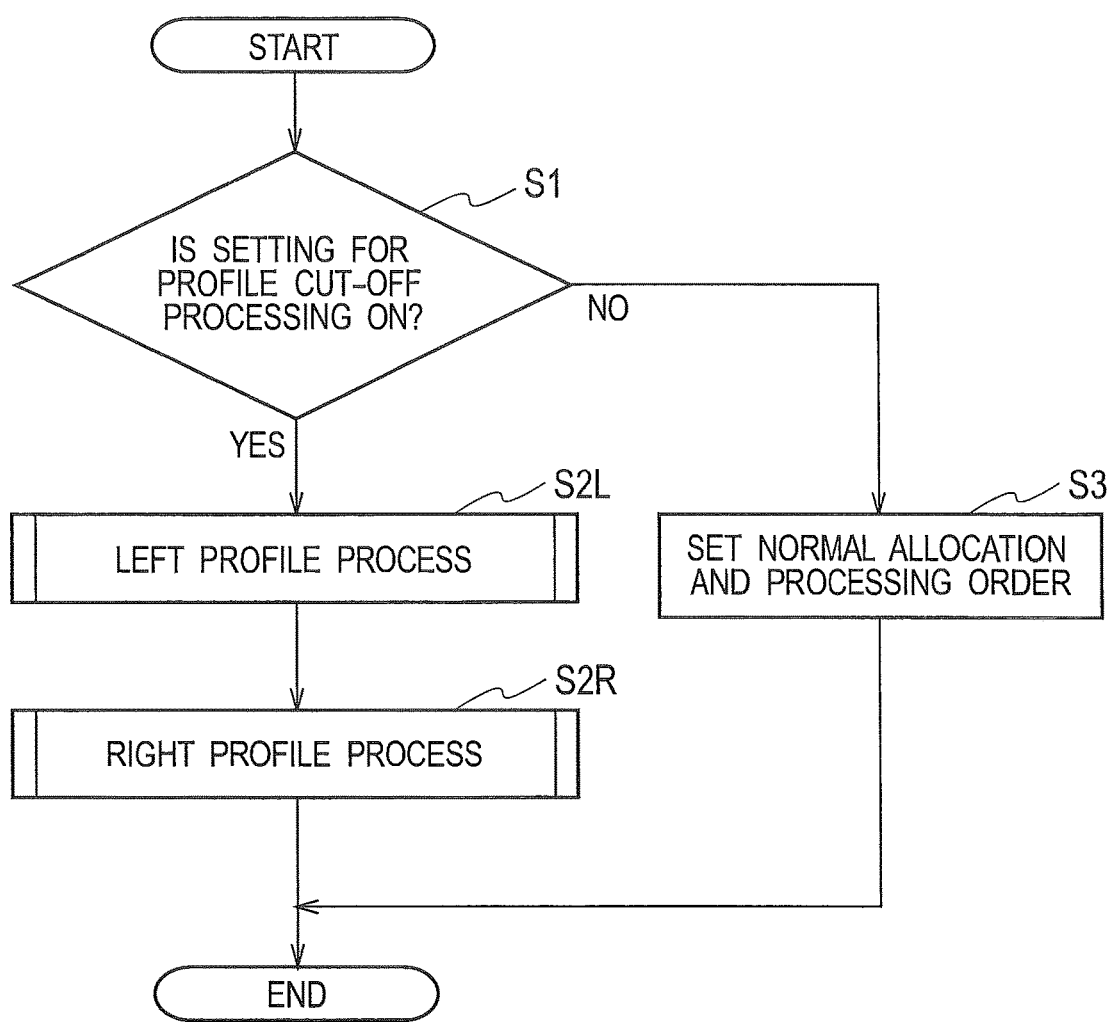
FIG. 44 is a flowchart showing an entire process executed by the laser processing method and laser processing program creation device of at least one embodiment.

In FIG. 44, the CAM 20 starts the process to create the laser processing program and then determines in step S1 whether the setting of profile cut-off processing is on. When the setting of profile cut-off processing is not on (NO), in step S3, the CAM 20 sets normal allocation along the product profile and sets the normal processing order described in FIGS. 4 and 5, thus terminating the process.

When the setting of profile cut-off processing is on, normal cut-off processing can be performed. However, forming the holes 61 or notches 62 reduces the yield of products of the angle A1 or channel C1. The step S1 is provided because the setting of profile cut-off processing sometimes needs to be turned off from the viewpoint of increasing the yield.

When the setting for profile cut-off processing is on (YES), the CAM 20 executes processing for the left profile in step S2L and executes processing for the right profile in the step S2R, thus terminating the process.

Figure 45:
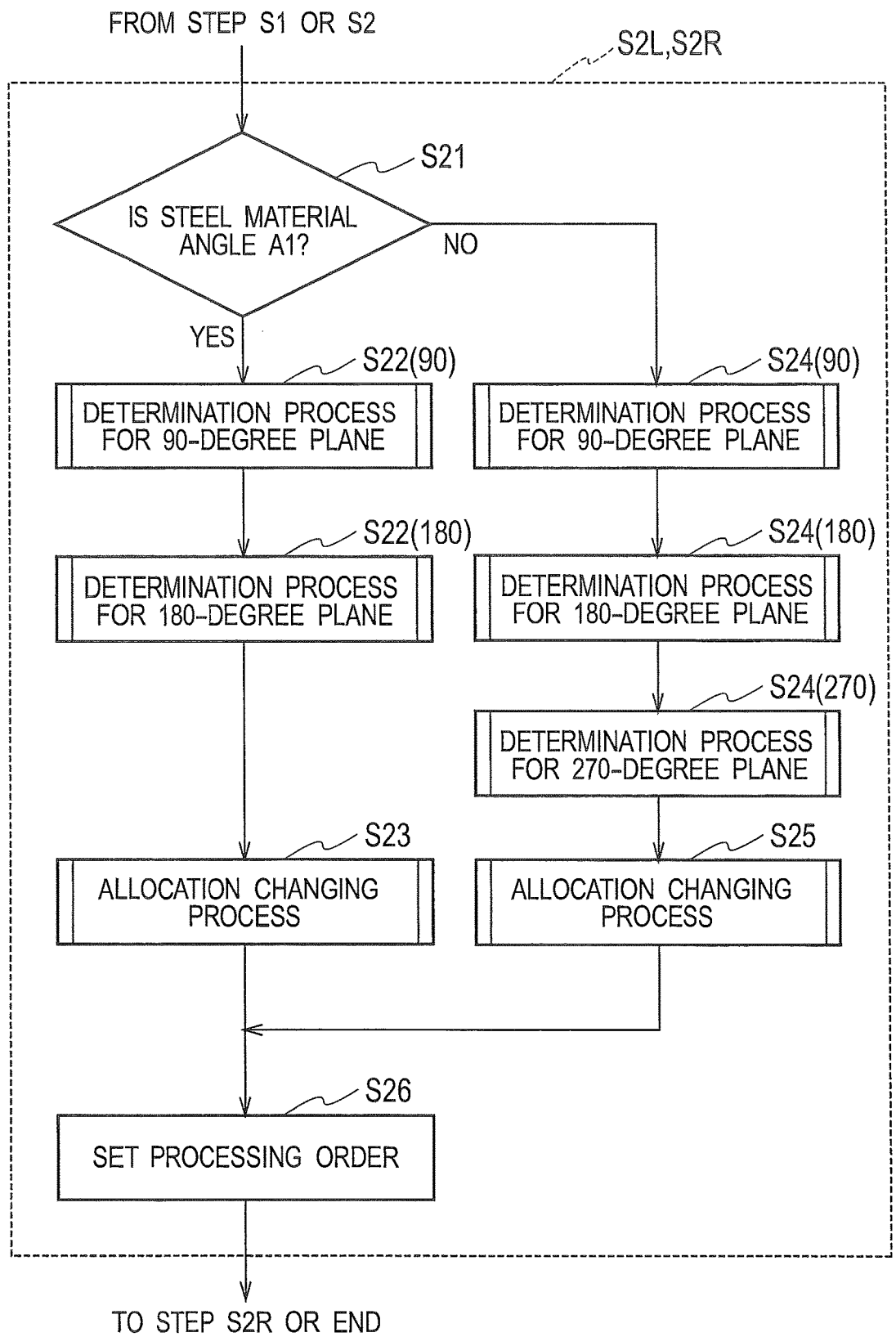
FIG. 45 is a flowchart showing specific processes in the steps S2L, S2R of FIG. 44.

FIG. 45 shows specific processing of the steps S2L and S2R of FIG. 44. When the FIG. 45 shows the step S2L, the CAM 20 moves the procedure from the step S1 of FIG. 44 to the step S21 of FIG. 45. When the FIG. 45 shows the step S2R, the CAM 20 moves the procedure from the step S2L of FIG. 44 to the step S21 of FIG. 45.

In FIG. 45, the CAM 20 determines in the step S21 whether the steel material is the angle A1. When the steel material is the angle A1 (YES), the CAM 20 executes determination process for the 90-degree plane in step S22 (90) and executes determination process for the 180-degree plane in step S22(180).

Based on the results of determination in the steps S22(90) and S22(180), in step S23, the CAM 20 determines whether it is necessary to change the allocation. When it is necessary to change the allocation, the CAM 20 executes the allocation changing process and moves the procedure to step S26.

The steps 22(90) and S22(180) differ from each other in that the target planes at determination are the 90 and the 180-degree planes, respectively. The specific determination processes thereof are the same as described later.

When the steel material is not the angle A1 in the step S21 (NO), the steel material is the channel C1. The CAM 20 executes the determination process for the 90-degree plane in step S24(90), executes the determination process for the 180-degree process in step S24(180), and executes the determination process for the 270-degree process in step S24(270).

The CAM 20 determines whether it is necessary to change the allocation in step S25. When it is necessary to change the allocation, the CAM 20 executes the allocation changing process and moves the procedure to the step S26.

The steps 24(90), S24(180), and S24(270) differ from one another only in that the target planes at determination are the 90, 180, and 270-degree planes, respectively. The specific determination processes thereof are the same as described later.

When completing the allocation changing process performed as needed in the step S23 or S25, the CAM 20 sets the processing order in the step S26. When FIG. 45 shows the step S2L, the CAM 20 moves the procedure from the step S26 to the step S2R of FIG. 44. When FIG. 45 shows the step S2R, the CAM 20 terminates the processing after the step S26.

Figure 46A:
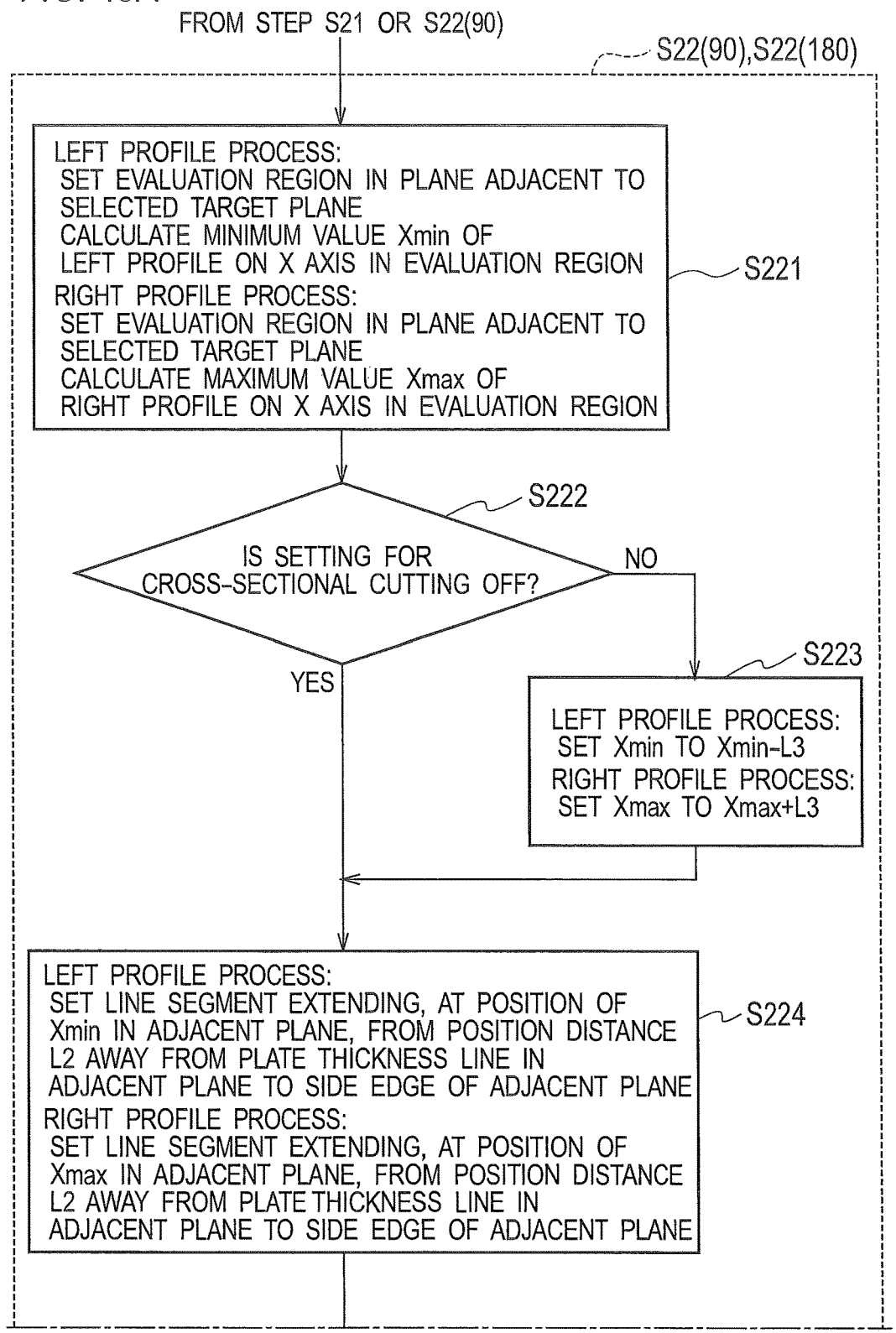
FIG. 46A is a flowchart showing a part of specific processing of step S22(90) or S22(180) of FIG. 45.
Figure 46B:
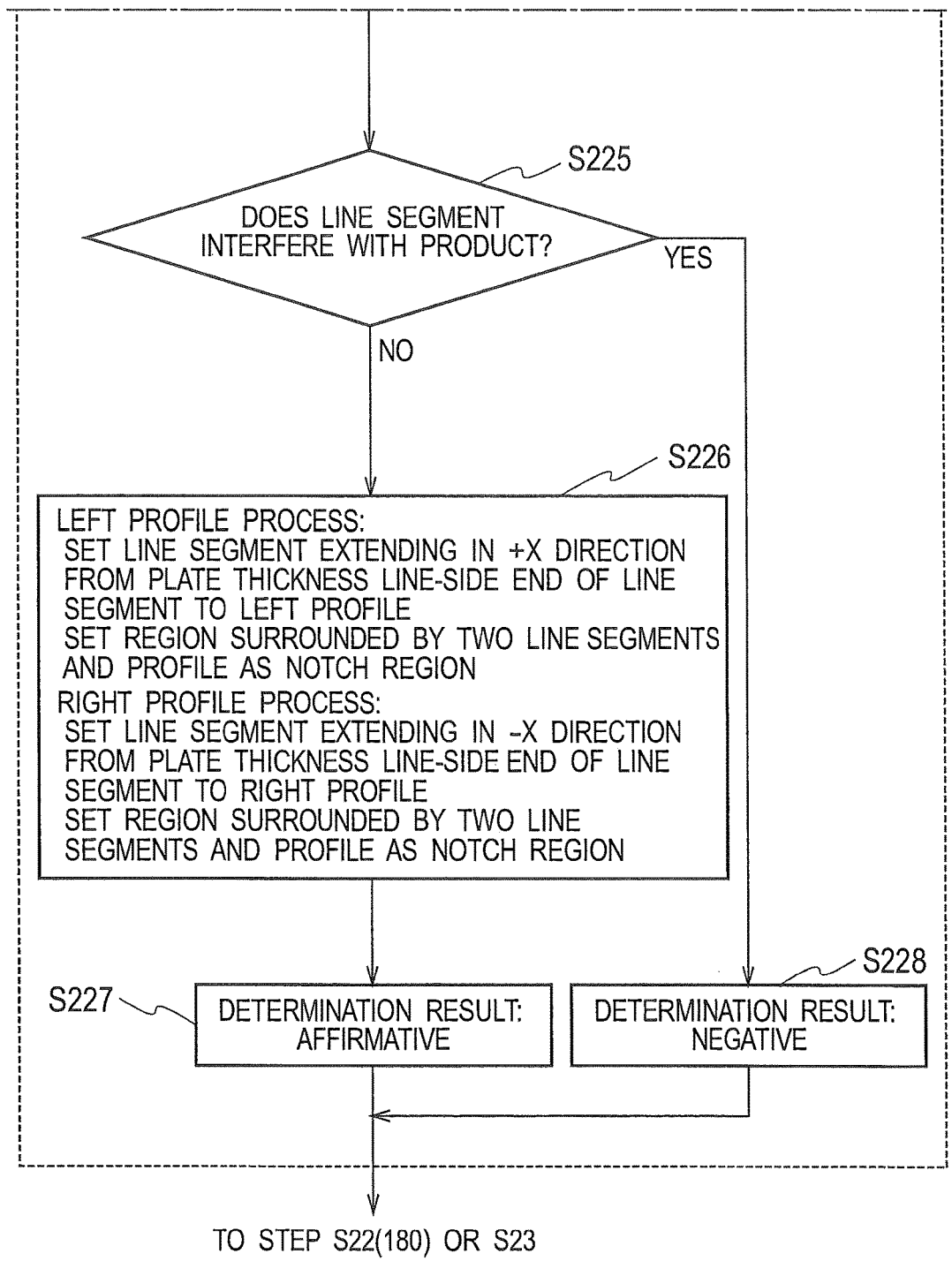
FIG. 46B is a flowchart showing the other part of the specific processing of the step S22(90) or S22(180) of FIG. 45.

FIGS. 46A and 46B show specific processing of the steps S22(90) and S22(180) in FIG. 45.

When FIGS. 46A and 46B show the step S22(90), the CAM 20 moves the procedure from the step S21 of FIG. 45 to step S221 of FIG. 46A. When FIGS. 46A and 46B show the step S22(180), the CAM 20 moves the procedure from the step S22(90) of FIG. 45 to the step S221 of FIG. 46A.

In FIG. 46A, in the step S221 of the left profile process, the CAM 20 sets the evaluation region (Re180 or Re90) in the plane (the 180 or 90-degree plane) adjacent to the selected target plane (the 90 or 180-degree plane) and calculates the minimum value Xmin of the left profile on the X axis within the evaluation region.

In the step S221 of the right profile process, the CAM 20 sets the evaluation region (Re180 or Re90) in the plane (the 180 or 90-degree plane) adjacent to the selected target plane (the 90 or 180-degree plane) and calculates the maximum value Xmax of the right profile on the X axis within the evaluation region.

In the step S22(90), the CAM 20 sets as the evaluation region Re180, the region between the development auxiliary line USL1 and the extended auxiliary line EAL2 set at the distance L1 from the plate thickness line MTL2 in the 180-degree plane. In the step S22(180), the CAM 20 sets as the evaluation region Re90, the region between the development auxiliary line USL1 and the extended auxiliary line EAL1 set at the distance L1 from the plate thickness line MTL1 in the 90-degree plane.

In the step S222, the CAM 20 determines whether the setting to cover cross-sectional cutting as one variation of cut-off processing is off. When the setting is not off (No), that is, when the cross-sectional cutting is covered as one variation of cut-off processing, the CAM 20 moves the procedure to step S223. The CAM 20 sets Xmin to Xmin−L3 in the left profile process and sets Xmax to Xmax+L3 in the right profile process. The CAM 20 then moves the procedure to step S224.

When the setting is off in the step S222 (YES), that is, when the cross-sectional cutting is not covered as one variation of cut-off processing, the CAM 20 moves the procedure to the step S224.

In the step S224 of the left profile process, the CAM 20 sets a line segment at the position of Xmin in the adjacent plane so that the line segment extends from the position the distance L2 away from the plate thickness line (MTL2 or MTL1) in the adjacent plane to the side edge of the adjacent plane. In the step S224 of the right profile process, the CAM 20 sets a line segment at the position of Xmax in the adjacent plane so that the line segment extends from the position the distance L2 away from the plate thickness line (MTL2 or MTL1) in the adjacent plane to the side edge of the adjacent plane.

In step S225 of FIG. 46B, the CAM 20 determines whether the line segment set in the step S224 interferes with the product. When the line segment interferes with the product (YES), the CAM 20 sets the determination result to "negative" in the step S228. The result of "negative" indicates that the notches 62 is not formed.

When the line segment does not interfere with the product (NO), the CAM 20 moves the procedure to the step S226. In the step S226 of the left profile process, the CAM 20 sets a line segment extending in the +X direction from the end of the line segment on the plate thickness line (MTL2 or MTL1) side to the left profile. The CAM 20 sets the region surrounded by the two line segments and the profile as a notch region. In the step S226 of the right profile process, the CAM 20 sets a line segment extending in the −X direction from the end of the line segment on the plate thickness line (MTL2 or MTL1) side to the right profile. The CAM 20 sets the region surrounded by the two line segments and the profile as a notch region.

The CAM 20 sets the determination result to "affirmative" in the step S227. The result "affirmative" indicates that the notch 62 is formed.

When FIGS. 46A and 46B show the step S22(90), the CAM 20 moves the procedure from the step S227 or S228 to the step S22(180) of FIG. 45. When FIGS. 46A and 46B show the step S22(180), the CAM 20 moves the procedure from the step S227 or S228 to the step S23 of FIG. 45.

Figure 47A:
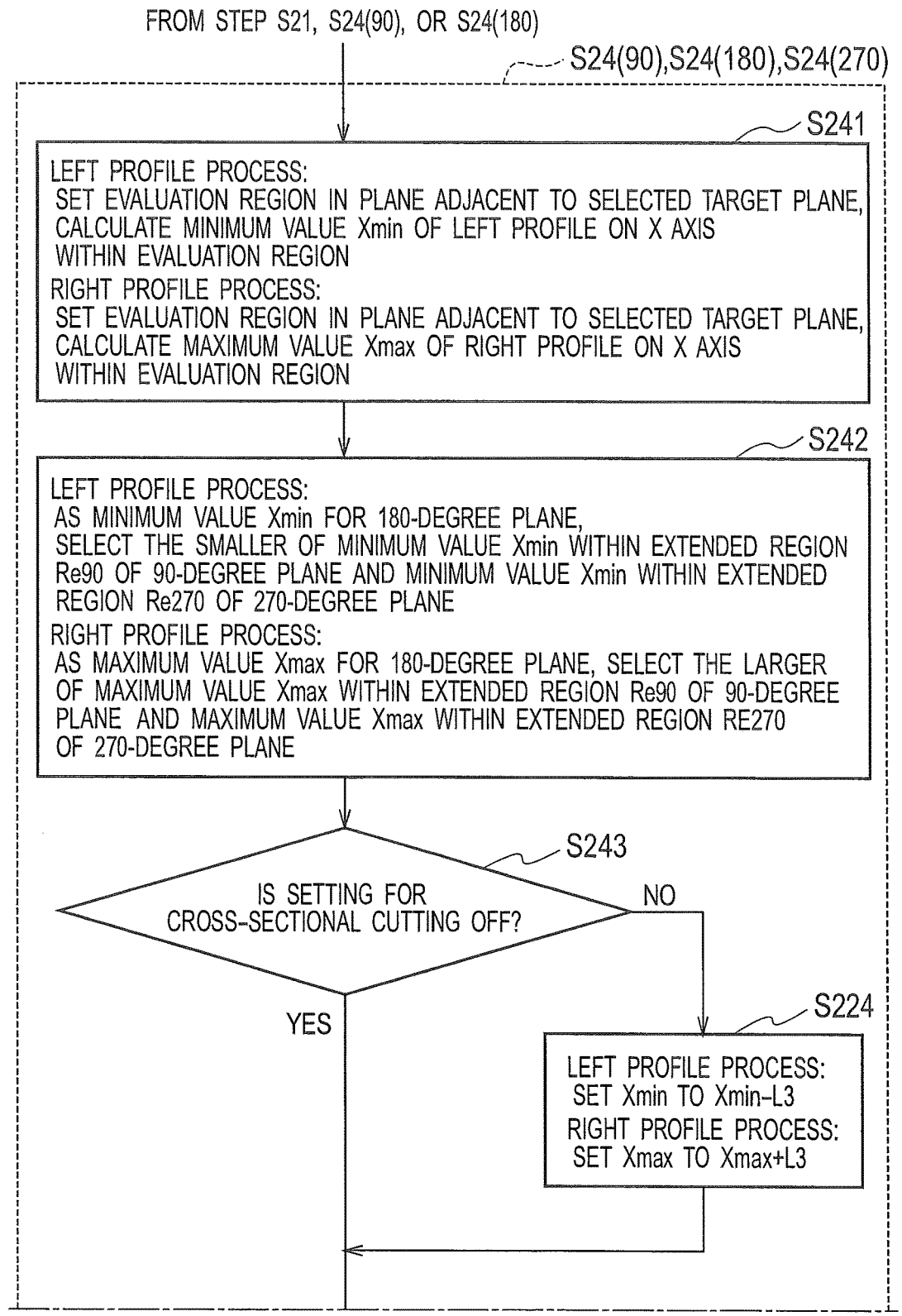
FIG. 47A is a flowchart showing a part of specific processing of step S24(90), S24(180), or S24(270) of FIG. 45.
Figure 47B:
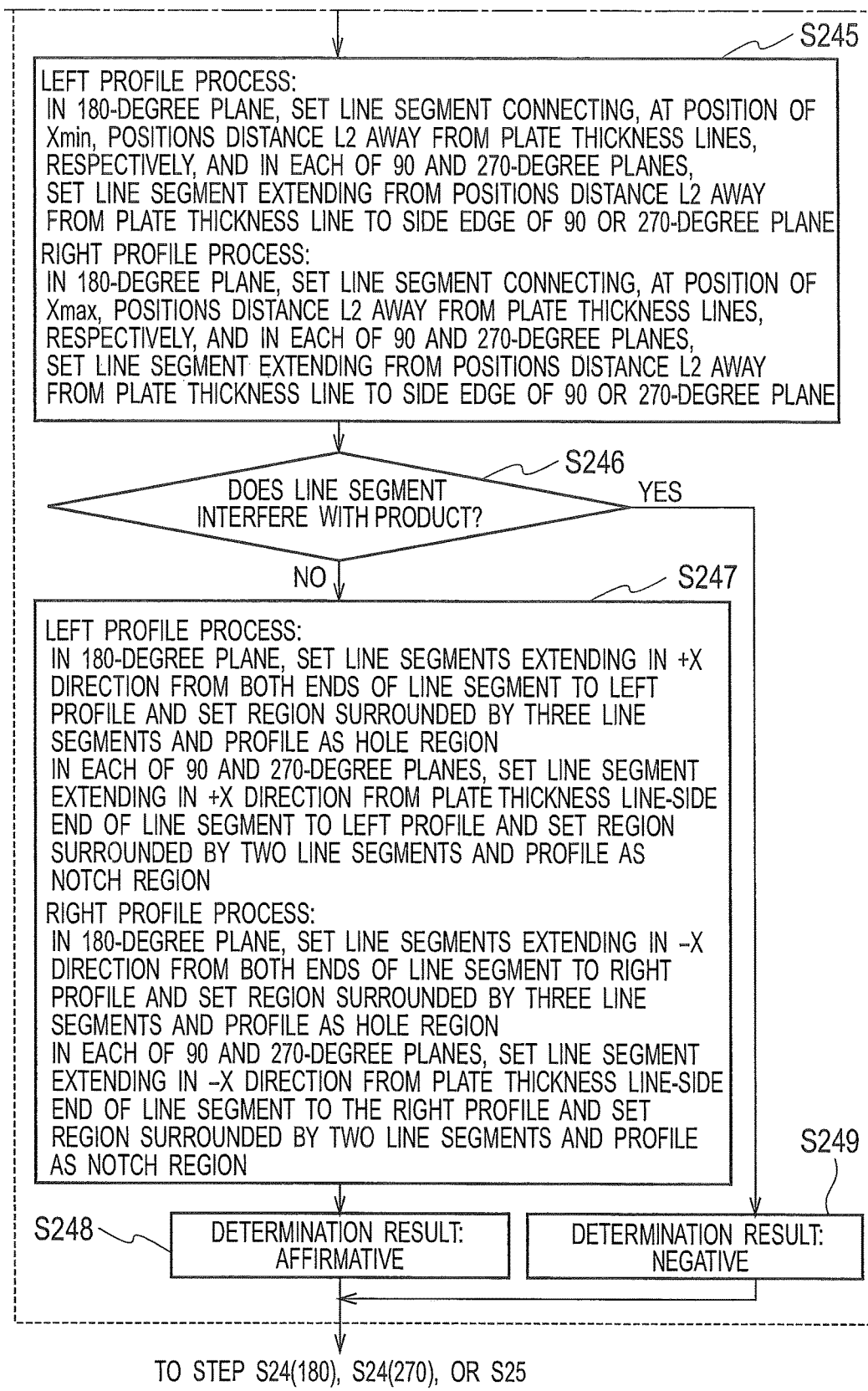
FIG. 47B is a flowchart showing the other part of the specific processing of step S24(90), S24(180), or S24(270) of FIG. 45.

FIGS. 47A and 47B show specific processing of the steps S24(90), S24(180), and S24(270) of FIG. 45.

When FIGS. 47A and 47B show the step S24(90), the CAM 20 moves the procedure from the step S21 of FIG. 45 to the step S241 of FIG. 47A. When FIGS. 47A and 47B show the step S24(180), the CAM 20 moves the procedure from the step S24(90) of FIG. 45 to the step S241 of FIG. 47A. When FIGS. 47A and 47B show the step S24(270), the CAM 20 moves the procedure from the step S24(180) of FIG. 45 to the step S241 of FIG. 47A.

In FIG. 47A, in the step S241 of the left profile process, the CAM 20 sets the evaluation region in the plane adjacent to the selected target plane and calculates the minimum value Xmin of the left profile on the X axis within the evaluation region. When the 90-degree plane is the target plane, the 180-degree plane is the adjacent plane. When the 180-degree plane is the target plane, each of the 90 and 270-degree planes are the adjacent planes. When the 270-degree plane is the target plane, the 180-degree plane is the adjacent plane.

In the step S241 of the right profile process, the CAM 20 sets the evaluation region in the adjacent plane adjacent to the selected target plane and calculates the maximum value Xmax of the right profile on the X axis within the evaluation region.

In the step S24(90), the CAM 20 sets as the first evaluation region Re180, the region between the development auxiliary line USL1 and the extended auxiliary line EAL13 set at the distance L1 from the plate thickness line MTL2 within the 180-degree plane. In the step S24(180), the CAM 20 sets as the evaluation region Re90, the region between the development auxiliary line USL1 and the extended auxiliary line EAL11 set at the distance L1 from the plate thickness line MTL1 in the 90-degree plane and sets as the evaluation region Re270, as the region between the development auxiliary line USL2 and the extended auxiliary line EAL12 set at the distance L1 from the plate thickness line MTL4 in the 270-degree plane.

In the step S24(270), the CAM 20 sets as the second evaluation region Re180, the region between the development auxiliary line USL2 and the extended auxiliary line EAL14 set at the distance L1 from the plate thickness line MTL3 in the 180-degree plane.

In step S242, as the minimum value Xmin for the 180-degree plane, the CAM 20 selects the smaller one of the minimum value Xmin within the evaluation region Re90 of the 90-degree plane and the minimum value Xmin within the evaluation region Re270 of the 270-degree plane. As the maximum value Xmax for the 180-degree plane, the CAM 20 selects the larger one of the maximum value Xmax within the evaluation region Re90 of the 90-degree plane and the maximum value Xmax within the evaluation region Re270 of the 270-degree plane.

In the step S243, the CAM 20 determines whether the setting to cover cross-sectional cutting as one variation of cut-off processing is off. When the setting is not off (NO), the CAM 20 sets Xmin to Xmin−L3 in the step S244 of the left profile process and sets Xmax to Xmax+L3 in the right profile process. The CAM 20 then moves the procedure to the step S245.

When the setting is off in the step S243 (YES), the CAM 20 moves the procedure to step S245 of FIG. 47B.

In the step S245 of the left profile process, the CAM 20 sets a line segment connecting, at the position of Xmin in the 180-degree plane, the positions the distance L2 away from the plate thickness lines (MTL2 and MTL3), respectively. In each of the 90 and 270-degree planes, the CAM 20 sets a line segment extending from the position the distance L2 away from the plate thickness line (MTL1 or MTL4) to the side edge of the 90 or 270-degree plane.

In the step S245 of the right profile process, the CAM 20 sets a line segment connecting, at the position of Xmax in the 180-degree plane, the positions the distance L2 away from the plate thickness line (MTL2 and MTL3), respectively. In each of the 90 and 270-degree planes, the CAM 20 sets a line segment extending from the position the distance L2 away from the plate thickness line (MTL1 or MTL4) to the side edge of the 90 or 270-degree plane.

The CAM 20 determines in step S246 whether each line segment set in the step S245 interferes with the product. When the line segment interferes with the product (YES), the CAM 20 sets the determination result to "negative" in step S249. When the determination result is "negative", the holes 61 and notches 62 are not formed.

When the line segment does not interfere with the product in the step S246 (NO), the CAM 20 moves the procedure to step S247. In the step S247 of the left profile process, the CAM 20 sets line segments extending in the +X direction from both ends of the line segment to the left profile in the 180-degree plane and sets the region surrounded by the three line segments and the profile as the hole region.

In the step S247 for the left profile process, the CAM 20 sets a line segment extending in the +X direction from the end of the line segment on the plate thickness line (MTL1 or MTL4) side to the left profile in each of the 90 and 270-degree planes and sets the region surrounded by the two line segments and the profile as the notch region.

In the right profile process, the CAM 20 sets line segments extending in the −X direction from both ends of the line segment to the right profile in the 180-degree plane and sets the region surrounded by the three line segments and the profile as the hole region. In the right profile process, the CAM 20 sets a line segment extending in the −X direction from the end of the line segment on the plate thickness line (MTL1 or MTL4) side to the right profile in each of the 90 and 270-degree planes and sets the region surrounded by the two line segments and the profile as the notch region.

The CAM 20 sets the determination result to "affirmative" in the step S248. The result "affirmative" indicates that the holes 61 or notches 62 (or 63) are formed.

When FIGS. 47A and 47B show the step S24(90), the CAM 20 moves the procedure from the steps S248, S249 to the step S24(180) of FIG. 45. When FIGS. 47A and 47B show the step S24(180), the CAM 20 moves the procedure from the steps S248, S249 to the step S24(270)23 of FIG. 45.

When FIGS. 47A and 47B show the step S24(270), the CAM 20 moves the procedure from the steps S248, S249 to step S25 of FIG. 45.

Returning to FIG. 45, in the step S23 including the processing performed when the steel material is the angle A1, the CAM 20 determines whether it is necessary to change the allocation. When it is necessary to change the allocation, the CAM 20 executes the allocation changing process.

Figure 48:
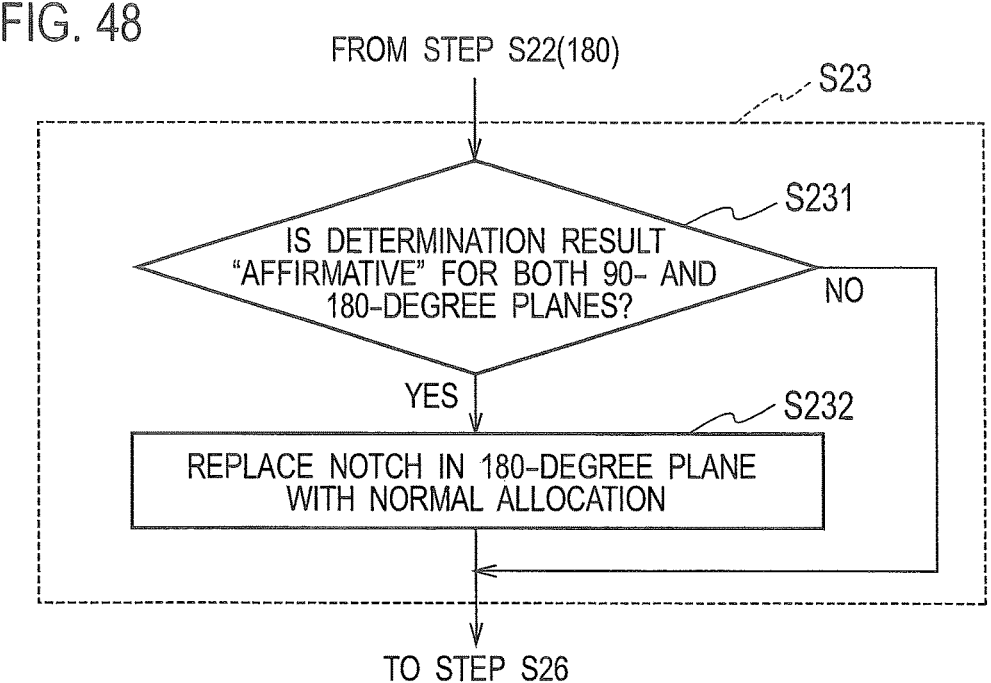
FIG. 48 is a flowchart specifically showing a process of step S23 of FIG. 45.

FIG. 48 shows specific processing of the step S23. In the step S23 of FIG. 48, the CAM 20 determines whether both of the determination results for the 90 and 180-degree planes are "affirmative". When the both determination results are not "affirmative" (NO), the CAM 20 does not change the allocation and moves the procedure to the step S26 directly.

When the both determination results are "affirmative" (YES), the CAM 20 changes the notch in the 180-degree plane to normal allocation and then moves the procedure to the step S26.

In the step S25 including the processing performed when the steel material is the channel C1, the CAM 20 determines whether it is necessary to change the allocation. When it is necessary to change the allocation, the CAM 20 executes the allocation changing process.

Figure 49:
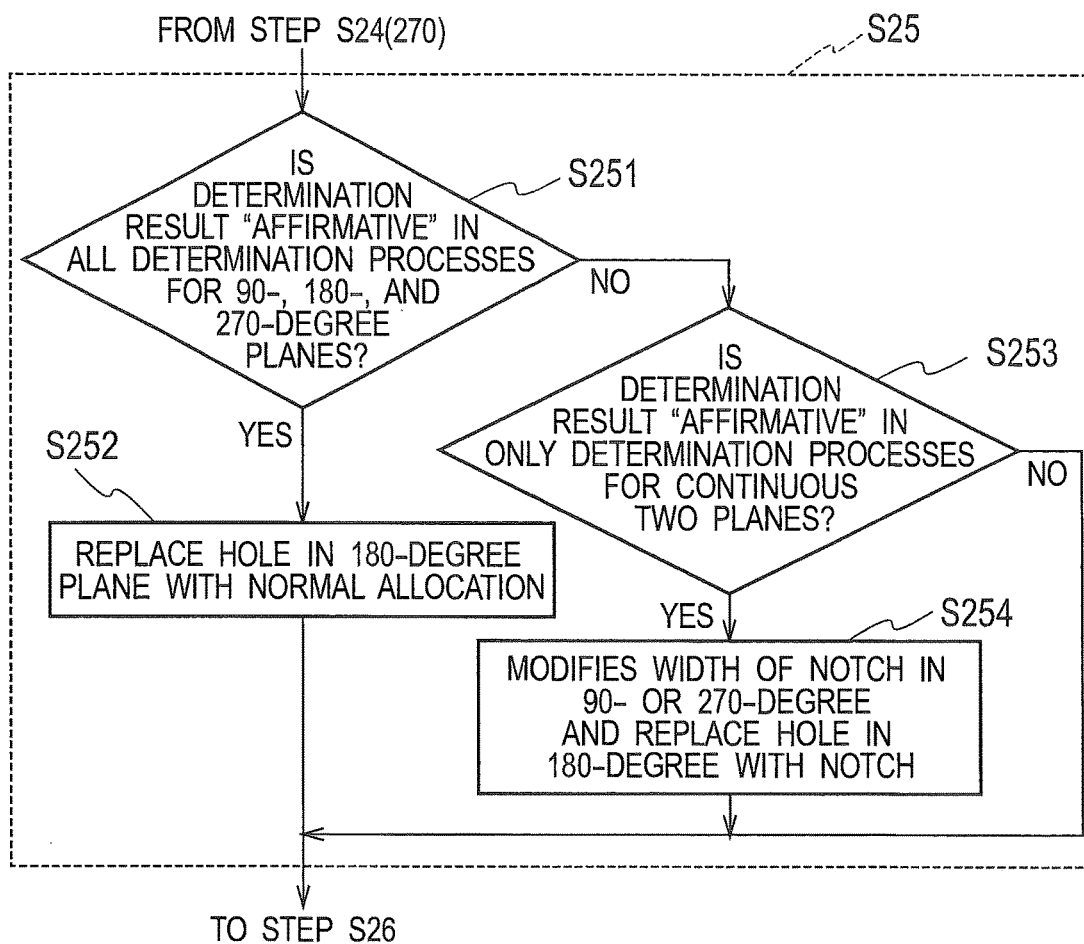
FIG. 49 is a flowchart specifically showing a process of step S25 of FIG. 45.

FIG. 49 shows a specific procedure in the step S25. In step S251 of FIG. 49, the CAM 20 determines whether the determination results from all of the determination processes for the 90, 180, and 270-degree planes are "affirmative". When the all determination results are "affirmative" (YES), the CAM 20 replaces the hole in the 180-degree plane with normal allocation in step S252 and moves the procedure to the step S26.

When the determination result is not "affirmative" in any one of the determination processes (NO), the CAM 20 then determines whether the determination results are "affirmative" in the determination processes for two continuous planes in step S253. The two continuous planes are the 90 and 180-degree planes or the 180 and 270-degree planes.

When the determination results are "affirmative" in the determination processes for two continuous planes (YES), in step S254, the CAM 20 modifies the width of the notch in the 90 or 270-degree plane so that the edge of the notch in the −X or +X direction is brought in line with the edge of the hole in the −X or +X direction and replaces the hole in the 180-degee lane with the notch. The CAM 20 then moves the procedure to step S26. When the determination result is not "affirmative" in each of the determination processes for the two continuous planes (NO), the CAM 20 moves the procedure to the step S26 directly.

When the allocation changing process is completed in the step S23 or S25 performed as needed, the CAM 20 sets the processing order in the step S26.

FIG. 50 shows specific processing to set the processing order in the step S26. The CAM 20 determines whether the steel material is the angle A1 in step S2601. When the steel material is the angle A1 (YES), the CAM 20 determines whether one of the planes includes allocation of a notch in step S2602. When one of the planes includes allocation of a notch (YES), the CAM 20 sets the processing order in step S2603 as follows: the plane including the notch is processed first, followed by the plane not including a notch.

When the one plane does not include allocation of a notch (NO) in the step S2602, none of the planes include allocation of a notch. In this case, the CAM 20 sets the processing order in the step S2604 as follows: first the 90-degree plane is processed, followed by the 180-degree plane.

When the steel material is not the angle A1 in the step S2601 (NO), the steel material is the channel C1. The CAM 20 sets the processing order for the channel C1 as the steel material in step S2605 and the subsequent steps. In the step S2605, the CAM 20 determines whether the allocation of the 180-degree plane is normal allocation. When the allocation of the 180-degree plane is normal allocation (YES), in step S2606, the CAM 20 sets the processing order as follows: the 90, 270and then 180-degree planes in order.

When the allocation of the 180-degree plane is not normal allocation (NO), the 180-degree plane includes allocation of a hole or notch. The CAM 20 determines whether the 180-degree plane includes allocation of a hole in step S2607. When the 180-degree plane includes allocation of a hole (YES), in step S2608, the CAM 20 sets the processing order to the 180, 90, and then 270-degree planes in order.

When the 180-degree plane does not include allocation of a hole in the step S267 (NO), the 180-degree plane includes allocation of a notch. In step S2609, the CAM 20 determines whether the allocation of the 90-degree plane includes a notch. When the 90-degree plane includes allocation of a notch (YES), in step S2610, the CAM 20 sets the processing order as follows: the 90, 180, and then 270-degree planes in order.

When the 90-degree plane does not include allocation of a notch (NO), in step S2611, the CAM 20 sets the processing order as follows: the 90, 180, and then 270-degree planes in order.

According to the laser processing method and laser processing program creation device of the embodiments described using FIGS. 44 to 50, the allocation and processing order are determined for the angle A1 by classifying the processing into Cases 1 to 4 shown in FIG. 51.

According to the laser processing method and laser processing program creation device of the embodiments, the allocation and processing order are determined for the cases of the channel C1 which are classified into Cases 1 to 8 shown in FIG. 52.

Cases 1 to 3 in FIG. 51 correspond to the cases illustrated in FIG. 36, (a) of FIG. 42, and (b) of FIG. 42, respectively. Case 4 in FIG. 51 corresponds to normal allocation described in FIG. 4.

Cases 1 to 7 in FIG. 52 correspond to the cases illustrated in FIG. 40, the right profile illustrated in FIG. 39, the left profile illustrated in FIG. 39, (c) of FIG. 43, (a) of FIG. 43, (b) of FIG. 43, and (d) of FIG. 43, respectively. Case 8 in FIG. 52 corresponds to normal allocation described in FIG. 5.

As described above, according to the embodiments, it is possible to normally or easily perform processing which cannot be performed normally with the conventional method illustrated in FIGS. 6 to 9 or is difficult to perform.

The present invention is not limited to the embodiments described above and can be variously changed without departing from the scope of the invention. As for the materials to be processed by the laser processing method and laser processing program creation device of the embodiments, the types of metal are not limited.

INDUSTRIAL APPLICABILITY

The present invention is applicable to laser beam processing to cut off angles or channels and a laser processing program creation device which creates a processing program to cut off angles or channels.

The invention claimed is:

1. A laser processing method using an angle or a channel as a material to be processed, the angle or channel being composed of a plurality of planes and having a predetermined plate thickness, and cutting the material with a laser beam in a direction intersecting an axis about which the material is rotated to form a product having a predetermined shape, the method comprising:
   for a development view representing the plurality of planes developed into a plane, setting an outer corner between the planes adjacent to each other as a development auxiliary line and setting ranges corresponding to plate thicknesses in the planes of the material as plate thickness regions between the development auxiliary line and a pair of plate thickness lines sandwiching the development auxiliary line;
   sequentially selecting each of the plurality of planes as a target plane and setting a region in an adjacent plane adjacent to the target plane as an evaluation region, the region in the adjacent plane including at least a range surrounded by the development auxiliary line and the plate thickness line located in the adjacent plane;
   calculating the position of the extremity of a profile of the product in the axial direction in the evaluation region;
   setting a first line segment m the target plane, the first line segment passing through the calculated position of the extremity and extending in the direction orthogonal to the axis;
   determining whether the first line segment interferes with the product;
   in one of the plurality of target planes where the first line segment does not interfere with the product, locating a processing area to form a notch or a hole in a region between the first line segment and the profile of the product;
   in the target plane where the processing area is located, allocating a trajectory for laser beam cutting to form a notch or a hole in the processing area and forming a notch or a hole in the material; and
   in the target plane where the processing area is not located, allocating a trajectory for laser beam cutting to cut the material along the profile of the product and cutting the material along the trajectory of the profile of the product.

2. The laser processing method according to claim 1, wherein
   the material is an angle having a first plane and a second plane as the plurality of planes,
   when the first or second plane where the first line segment does not interfere with the product is the target plane, the processing area is located in a range of the first or second plane surrounded by the first line segment, a second line segment, the profile of the product, and a side edge of the material, the second line segment extending from an end of the first line segment to the profile of the product in the axial direction, and the processing area is set as a notch region to form a notch extending from the side edge of the material.

3. The laser processing method according to claim 2, wherein
   when the notch region is set in each of the first and second planes and no trajectory for laser beam cutting is allocated in the plate thickness region, the allocation in one of the first and second planes is replaced with an allocation to cut the material along the profile of the product, and the one of the first and second planes and the plate thickness region are cut based on the allocation to cut the material along the profile of the product.

4. The laser processing method according to claim 1, wherein
   the material is a channel which includes first, second, and third planes as the plurality of planes, the second plane being sandwiched by the first and third planes,
   when the second plane where the first line segment does not interfere with the product is the target plane, the processing area is located in a range of the second plane surrounded by the first line segment, two second line segments, and the profile of the product, the second line segments extending from both ends of the first line segment to the profile of the product in the axial direction, and the processing area is set as a hole region to form a hole, and
   when the first or third plane where the first line segment does not interfere with the product is the target plane, the processing area is located in a range of the first or third plane surrounded by the first line segment, a second line segment, the profile of the product, and a side edge of the material, the second line segment extending from an end of the first line segment to the profile of the product in the axial direction, and the processing area is set as a notch region to form a notch extending from the side edge.

5. The laser processing method according to claim 4, wherein
   when the hole region is set in the second plane, the notch region is set in each of the first and third planes, and any trajectory for laser beam cutting is not allocated in first and second plate thickness regions which are provided across the first and second planes and across the second and third planes, respectively, the allocation in the second plane is replaced with an allocation to cut the material along the profile of the product, and
   the second plane and the first and second plate thickness regions are cut in accordance with the allocation to cut the material along the profile of the product.

6. The laser processing method according to claim 4, wherein when the hole region is set in the second plane, the notch region is set in one of the first and third planes, and any trajectory for laser beam cutting is not allocated in the plate thickness region provided across the second plane and the plane where the notch region is set, the allocation in the second plane is replaced with the allocation to form a notch,
   the notch region is modified so that an edge of the notch region in the axial direction is brought in line with an edge of the hole region in the axial direction,
   a first notch is formed in the plane where the notch region is set, by the allocation based on the modified notch region, and
   in the second plane and the plate thickness region, a second notch connected to the first notch is formed by the replaced allocation to form the notch.

7. The laser processing method according to claim 1, wherein
   an extended auxiliary line is set at a first distance from the plate thickness line in the adjacent plane in the direction away from the development auxiliary line, and
   a range surrounded by the development auxiliary line and the extended auxiliary line is set as the evaluation region.

8. The laser processing method according to claim 7, wherein the first distance is set to a distance in accordance with the radius of the curve formed in an inner corner formed by the planes adjacent to each other.

9. The laser processing method according to claim 2, wherein the end of the first line segment is at a second distance away from the plate thickness line in each target plane.

10. The laser processing method according to claim 1, wherein in the process of cross-sectional cutting that cuts the material in the direction orthogonal to the axis, the position a third distance outward from the extremity of the profile of the product in the axial direction in the evaluation region is considered as the position of the extremity in the axial direction.

11. A laser processing program creation apparatus, which creates allocation data as a laser processing program to form a product having a predetermined shape by using an angle or a channel as a material to be processed, the angle or channel being composed of a plurality of planes and having a predetermined plate thickness, and cutting the material with a laser beam in a direction intersecting an axis about which the material is rotated, the apparatus comprising:
- a plate thickness region setter configured to set an outer corner between the planes adjacent to each other as a development auxiliary line and set ranges corresponding to plate thicknesses in the planes of the material as plate thickness regions between the development auxiliary line and a pair of plate thickness lines sandwiching the development auxiliary line for a development view representing the plurality of planes developed in a plane;
- an evaluation region setter configured to sequentially select each of the plurality of planes as a target plane and set a region in an adjacent plane adjacent to the target plane as an evaluation region, the region in the adjacent plane including at least a range surrounded by the development auxiliary line and the plate thickness line located in the adjacent plane;
- a position calculator configured to calculate the position of the extremity of the profile of the product in the axial direction in the evaluation region;
- a line segment setter configured to set a first line segment in the target plane, the first line segment passing through the calculated position of the extremity and extending in the direction orthogonal to the axis;
- a determiner configured to determine whether the first line segment interferes with the product;
- a processing area setter configured to locate a processing area to form a notch or a hole in a region between the first line segment and the profile of the product in one of the plurality of target planes where the first line segment does not interfere with the product; and
- an allocation data creator configured to create allocation data to, in the target plane where the processing area is located, allocate a trajectory for laser beam cutting to form a notch or a hole in the processing area and to, in the target plane where the processing area is not located, allocate a trajectory for laser beam cutting to cut the material along the trajectory of the profile of the product.

12. The laser processing program creation apparatus according to claim 11, wherein
the material is an angle having a first plane and a second plane as the plurality of planes, and
when the first or second plane where the first line segment does not interfere with the product is the target plane, the processing area setter locates the processing area in a range of the first or second plane surrounded by the first line segment, a second line segment, the profile of the product, and a side edge of the material, the second line segment extending from an end of the first line segment to the profile of the product in the axial direction and sets the processing area as a notch region to form a notch extending from the side edge of the material.

13. The laser processing program creation apparatus according to claim 12, further comprising a changer configured to, when the notch region is set in each of the first and second planes and any trajectory for laser beam cutting is not allocated in the plate thickness region, replace the allocation in one of the first and second planes with allocation to cut the material along the profile of the product.

14. The laser processing program creation apparatus according to claim 11, wherein
the material is a channel which includes first, second, and third planes as the plurality of planes, the second plane being sandwiched by the first and third planes, and
the processing area setter,
when the second plane where the first line segment does not interfere with the product is the target plane, locates the processing area in a range of the second plane surrounded by the first line segment, two second line segments, and the profile of the product, the second line segments extending from both ends of the first line segment to the profile of the product in the axial direction, and sets the processing area as a hole region to form a hole, and
when the first or third plane where the first line segment does not interfere with the product is the target plane, locates the processing area in a range of the first or third plane surrounded by the first line segment, a second line segment, the profile of the product, and a side edge of the material, the second line segment extending from the end of the first line segment to the profile of the product in the axial direction, and sets the processing area as a notch region to form a notch extending from the side edge.

15. The laser processing program creation apparatus according to claim 14, further comprising
a changer configured to, when the hole region is set in the second plane, the notch region is set in each of the first and third planes, and any trajectory for laser beam cutting is not allocated in first and second plate thickness regions which are provided across the first and second planes and across the second and third planes, respectively, replace the allocation in the second plane with the allocation to cut the material along the profile of the product.

16. The laser processing program creation apparatus according to claim 14, further comprising:
a changer configured to, when the hole region is set in the second plane, the notch region is set in one of the first and third planes, and any trajectory for laser beam cutting is not allocated in the plate thickness region provided across the second plane and the plane where the notch region is set, replace the allocation in the second plane with the allocation to form a notch, and
a modifier which modifies the notch region to bring the edge of the notch region in the axial direction in line with the edge of the hole region in the axial direction.

17. The laser processing program creation apparatus according to claim 11, wherein
the evaluation region setter sets an extended auxiliary line at a first distance from the plate thickness line in the adjacent plane in the direction away from the development auxiliary line and sets the range surrounded by the development auxiliary line and the extended auxiliary line as the evaluation region.

18. The laser processing program creation apparatus according to claim 17, wherein the evaluation region setter sets the first distance to a distance in accordance with the radius of the curve formed in an inner corner formed by the planes adjacent to each other.

19. The laser processing program creation apparatus according to claim 12, wherein the line segment setter locates the end of the first line segment at a second distance away from the plate thickness line in each target plane.

20. The laser processing program creation apparatus according to claim 11, wherein in the process of creating allocation data to perform cross-sectional cutting that cuts the material in the direction orthogonal to the axis, the position calculator considers the position a third distance outward from the extremity of the profile of the product in the axial direction in the evaluation region as the position of the extremity in the axial direction.

* * * * *